US010089380B2

(12) United States Patent
Choi et al.

(10) Patent No.: US 10,089,380 B2
(45) Date of Patent: Oct. 2, 2018

(54) METHOD AND APPARATUS FOR OPERATING ELECTRONIC DEVICE

(71) Applicant: Samsung Electronics Co., Ltd., Gyeonggi-do (KR)

(72) Inventors: Yeonsun Choi, Gyeonggi-do (KR); Hyunkyoung Kim, Seoul (KR); Yohan Lee, Gyeonggi-do (KR); Sunok Kim, Busan (KR); Sangwoo Lee, Gyeonggi-do (KR); Kyoungmook Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 286 days.

(21) Appl. No.: 14/584,022

(22) Filed: Dec. 29, 2014

(65) Prior Publication Data

US 2015/0193522 A1 Jul. 9, 2015

Related U.S. Application Data

(60) Provisional application No. 61/924,298, filed on Jan. 7, 2014.

(30) Foreign Application Priority Data

Jul. 14, 2014 (KR) .......................... 10-2014-0088562

(51) Int. Cl.
*G06F 17/30* (2006.01)
*H04L 29/08* (2006.01)
(Continued)

(52) U.S. Cl.
CPC ... *G06F 17/30598* (2013.01); *G06Q 10/1091* (2013.01); *H04L 67/22* (2013.01);
(Continued)

(58) Field of Classification Search
None
See application file for complete search history.

(56) References Cited

U.S. PATENT DOCUMENTS 6,151,604 A * 11/2000 Wlaschin .......... G06F 17/30315
707/741
6,163,775 A * 12/2000 Wlaschin .......... G06F 17/30315
(Continued)

FOREIGN PATENT DOCUMENTS

| KR | 10-2012-0097396 A | 9/2012 |
| WO | 2006/070253 A2 | 7/2006 |

OTHER PUBLICATIONS

Luca Costabello & Laurent Walter Goix, Time Based Context Cluster Analysis for Automatic Blog Generation, 2007, pp. 1-8, WWW2008, Apr. 21-25, 2008, Beijing China.
(Continued)

*Primary Examiner* — Wilson Lee
(74) *Attorney, Agent, or Firm* — Cha & Reiter, LLC

(57) ABSTRACT

A method is provided comprising: generating, by an electronic device, at least one context information log associated with content stored in a memory; grouping the content into a plurality of groups based on the at least one context information log; adding the plurality of groups to a first list, wherein each of the plurality of groups is associated with a respective time-out period; generating a first screen based on the first list, the first screen including a first group from the plurality; detecting an input to the first screen that selects the first group and in response, adding the first group to a second list; wherein the first group is removed from the first list when the respective time-out period of the first group expires, and the first group persists in the second list after the respective time-out period of the first group expires.

20 Claims, 43 Drawing Sheets

(51) Int. Cl.
  *H04M 1/725*    (2006.01)
  *G06Q 10/10*    (2012.01)
  *H04W 4/02*     (2018.01)
  *H04L 12/58*    (2006.01)

(52) U.S. Cl.
  CPC ......... *H04M 1/72522* (2013.01); *H04L 51/34* (2013.01); *H04L 67/18* (2013.01); *H04M 2250/60* (2013.01); *H04W 4/02* (2013.01)

(56) References Cited

U.S. PATENT DOCUMENTS

| | | | | |
|---|---|---|---|---|
| 8,850,251 | B1* | 9/2014 | Maeng | G06F 1/3206 713/300 |
| 9,079,317 | B2* | 7/2015 | Preisinger | B25J 13/06 |
| 2001/0026285 | A1* | 10/2001 | Toffolo | G09G 3/007 345/620 |
| 2004/0153675 | A1* | 8/2004 | Dorn | G06F 21/6218 726/5 |
| 2006/0148528 | A1 | 7/2006 | Jung et al. | |
| 2008/0022061 | A1* | 1/2008 | Ito | G11B 20/00086 711/162 |
| 2009/0216435 | A1* | 8/2009 | Zheng | G06F 17/3087 701/533 |
| 2009/0234529 | A1* | 9/2009 | Sampedro Diaz | G06F 9/4443 701/31.4 |
| 2010/0210359 | A1* | 8/2010 | Krzeslo | A63F 13/10 463/31 |
| 2012/0233531 | A1 | 9/2012 | Ma et al. | |
| 2015/0089407 | A1* | 3/2015 | Suzuki | G06F 3/0482 715/763 |

OTHER PUBLICATIONS

Dian Tjondronegoro & Tat-Seng Chua, Transforming Mobile Personal Life Log into Autobiographical Multimedia eChronicles, Advances in Mobile Computing & Multimedia, ACM, 2 Penn Plaza, Suite 701, New York, New York 10121-0701 U.S., Dec. 3, 2012, pp. 57-63, XP058029757.

* cited by examiner

FIG. 4

| ... | ... | ... |
|---|---|---|
| 2013-08-02 10:00 | Arrived at Home | Home |
| 2013-08-02 09:30 | Listen Track3 | GPS: 123,656 |
| 2013-08-02 09:25 | Listen Track2 | GPS: 123,556 |
| 2013-08-02 09:20 | Listen Track1 | GPS: 123,456 |
| 2013-08-02 09:00 | Departure from Work | work |
| 2013-08-02 08:00 | Arrived at work | work |
| 2013-08-02 07:01 | Departure from home | Home |
| ... | ... | ... |

410 (highlighting the "Arrived at Home" row)

METHOD AND APPARATUS FOR OPERATING ELECTRONIC DEVICE

CLAIM OF PRIORITY

This application claims the benefit under 35 U.S.C. § 119(e) of a U.S. Provisional application filed on Jan. 7, 2014 in the U.S. Patent and Trademark Office and assigned Ser. No. 61/924,298, and under 35 U.S.C. § 119(a) of a Korean patent application filed on Jul. 14, 2014 in the Korean Intellectual Property Office and assigned Serial No. 10-2014-0088562, the entire disclosure of each of which is hereby incorporated by reference.

BACKGROUND

1. Field of the Disclosure

The present disclosure relates generally to a method and an apparatus for storing and managing data in an electronic device.

2. Description of the Prior Art

According to the development of mobile communication technologies, electronic devices are used as personal communication devices. In the electronic devices, various additional services such as data communication, video reproduction, audio reproduction, messenger, schedule management, and alarm functions as well as voice communication are provided, and various programs through which the additional services can be used are provided.

The electronic device can process various types of inputs through various input methods or various input means, and transmit/receive data through various communication methods. The electronic device can perform various functions such as a call function, a message function, a function of taking a picture, a function of taking a video, a function of reproducing media, a Social Network Service (SNS) function, a function of managing health, a game function, a function of viewing and listening to a broadcast, and a scrapbook function. The electronic device can perform various records, or generate or download various contents while executing such a function.

Records or contents collected by the electronic device may be managed according to each application, and the electronic device may execute the corresponding application to display the records, contents, or information related thereto. For example, a telephone record is stored in and managed by a call log application, an SMS and Multimedia Messaging Service (MMS) records are stored in and managed by a message application, and a picture is stored in and managed by an album application. For example, records of telephone conversations may be recorded and stored in a call log. When a user desires to view the records of telephone conversations, the user may identify it through a telephone number stored in the call log.

SUMMARY

According to one aspect of the disclosure, a method is provided comprising: generating, by an electronic device, at least one context information log associated with content stored in a memory; grouping the content into a plurality of groups based on the at least one context information log; adding the plurality of groups to a first list, wherein each of the plurality of groups is associated with a respective time-out period; generating a first screen based on the first list, the first screen including a first group from the plurality; detecting an input to the first screen that selects the first group and in response, adding the first group to a second list; wherein the first group is removed from the first list when the respective time-out period of the first group expires, and the first group persists in the second list after the respective time-out period of the first group expires.

According to another aspect of the disclosure, an electronic device is provided comprising a memory and a controller configured to: generate at least one context information log, the context information log being associated with content that is stored in the memory; group the content into a plurality of groups based on the context information log; add the plurality of groups to a first list, wherein each of the plurality of groups is associated with a respective time-out period; generate a first screen based on the first list, the first list including a first group from the plurality; detect an input to the first screen that selects the first group and in response, include the first group in a second list in response to the input; wherein the first group is removed from the first list when the respective time-out period of the first group expires, and the first group persists in the second list after the respective time-out period of the first group expires.

BRIEF DESCRIPTION OF THE DRAWINGS

The above features and advantages of the present disclosure will be more apparent from the following detailed description in conjunction with the accompanying drawings, in which:

FIG. 4 illustrates an example of data (logs) collected by an electronic device 100 according to various embodiments of the present disclosure;

DETAILED DESCRIPTION

Figure 1:
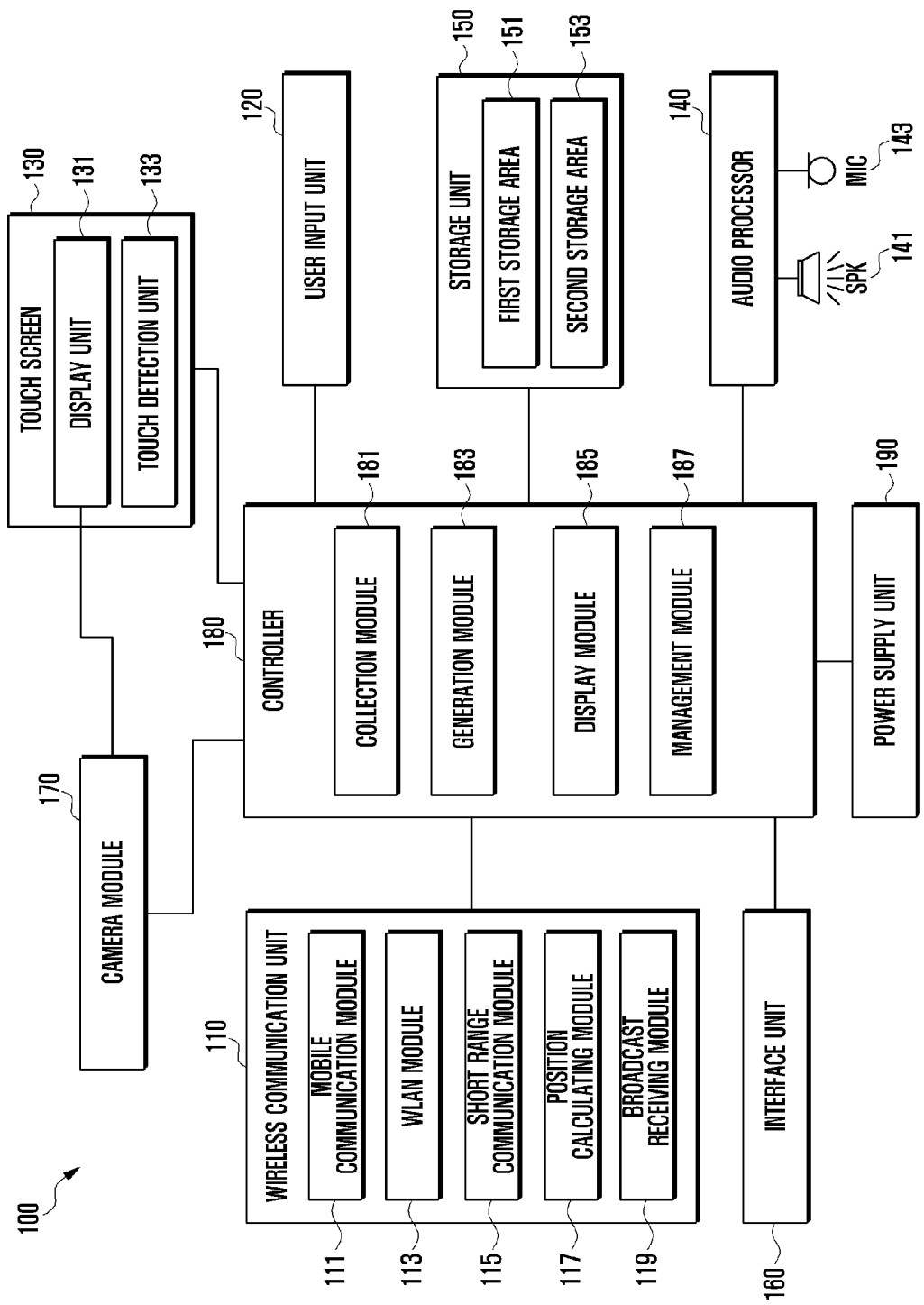
FIG. 1 is a block diagram schematically illustrating a configuration of an electronic device according to various embodiments of the present disclosure.

Various embodiments of the present disclosure will be described in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed, but the present disclosure should be construed to cover all modifications, equivalents, and alternatives falling within the spirit and scope of the various embodiments of the present disclosure. In the description of the drawings, identical or similar reference numerals are used to designate identical or similar elements.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present disclosure, the expression "or" includes any or all combinations of words enumerated together. For example, the expression "A or B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the corresponding elements. The expressions may be used to distinguish a component element from another component element. For example, a first user device and a second user device indicate different user devices although both of them are user devices. For example, a first element may be termed a second element, and similarly, a second element may be termed a first element without departing from the scope of various embodiments of the present disclosure.

It should be noted that if it is described that one component element is "coupled" or "connected' to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to embodiments of the present disclosure may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device may be a smart home appliance with a communication function. The smart home appliance as an example of the electronic device may include at least one of a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the entity may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an in-vehicle infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a store.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the above-mentioned devices.

Hereinafter, an electronic device and a method of controlling an operation thereof according to various embodiments will be described with reference to the accompanying drawings. In various embodiments, the term "user" may indicate a person using an electronic device or a device (for example, an artificial intelligence electronic device) using an electronic device. The configurations of the electronic device according to various embodiments of the present disclosure and the method of controlling the operation thereof are not restricted by or limited to contents which will be described below and therefore, it should be noted that they may be applied to various embodiments based on the embodiments which will be described below. In embodiments of the present disclosure described below, a hardware approach will be described as an example. However, since the embodiments of the present disclosure include a technology using both hardware and software, the present disclosure does not exclude a software-based approach.

FIG. 1 is a block diagram schematically illustrating a configuration of an electronic device 100 according to various embodiments of the present disclosure.

Referring to FIG. 1, the electronic device 100 according to various embodiments of the present disclosure may include a wireless communication unit 110, a user input unit 120, a touch screen 130, an audio processor 140, a storage unit 150, an interface unit 160, a camera module 170, a controller 180, and a power supply unit 190. In various embodiments of the present disclosure, the components of the electronic device 100 illustrated in FIG. 1 are not necessary, so that the electronic device 100 may have more components or less components in comparison with the components illustrated FIG. 1.

The wireless communication unit 110 may include one or more modules which enable wireless communication between the electronic device 100 and a wireless communication system or between the electronic device 100 and another electronic device. For example, the wireless communication unit 110 may include a mobile communication module 111, a Wireless Local Area Network (WLAN) module 113, a short range communication module 115, a position calculating module 117, and a broadcast receiving module 119.

The mobile communication module 111 may transmit/receive a wireless signal to/from at least one of a base station, an external electronic device, and various servers (for example, an integration server, a provider server, a content server, an Internet server, a cloud server, and the like) over a mobile communication network. The wireless signal may include a voice call signal, video call signal, or various types of data according to the transmission/reception of text/multimedia messages.

The mobile communication module 111 may receive one or more pieces of data (for example, logs, contents, various messages, mail, images, videos, weather information, position information, time information and the like). According to an embodiment, the mobile communication module 111 may be connected to at least one of another electronic device and a server which are connected to the electronic device 100 through a network (for example, mobile communication), so as to acquire (receive) various types of data. The mobile communication module 111 may transmit various types of data required for operations of the electronic device 100 according to various embodiments of the present disclosure to the outside (for example, a server, another electronic device or the like) in response to a user request.

The WLAN module 113 may be a module for forming wireless Internet access and a WLAN link with another electronic device. The WLAN module 113 may be installed inside or outside the electronic device 100. As wireless Internet technologies, WLAN (Wi-Fi), Wireless Broadband (WiBro), World Interoperability for Microwave Access (WiMax), High Speed Downlink Packet Access (HSDPA), millimeter Wave (mmWave) or the like may be used.

The WLAN module 113 may transmit one or more pieces of data selected by the user to the outside or receive the data from the outside. According to an embodiment, the WLAN module 113 may acquire (receive) various types of data from at least one of another electronic device and a server which are connected to the electronic device 100 through a network (for example, wireless Internet). The WLAN module 113 may transmit various types of data required for operating an image of the electronic device according to embodiments of the present disclosure to the outside (for example, a server) or receive the data from the outside in response to a user input. The WLAN module 113 may transmit or receive various types of data corresponding to user's selection to/from another electronic device when a WLAN link with another electronic device is formed. The WLAN module 113 may always remain in a turned-on state or may be turned on according to a user's configuration or input.

The short range communication module 115 may correspond to a module for performing short range communication. Bluetooth, Bluetooth Low Energy (BLE), Radio Frequency Identification (RFID), Infrared Data Association (IrDA), Ultra Wideband (UWB), ZigBee, Near Field Communication (NFC), or the like may be used as a short range communication technology.

The short range communication module 115 may receive one or more pieces of data. According to an embodiment, the short range communication module 115 may acquire data from another electronic device connected to the electronic device 100 through a network (for example, short range communication). The short range communication module 115 may transmit or receive data corresponding to user's selection to/from another electronic device when short range communication with another electronic device is connected. The short range communication module 115 may always remain in a turned-on state or may be turned on according to a user's configuration or input.

The position calculating module 117 is a module for acquiring a position of the electronic device 100, and may include a Global Position System (GPS) module as a representative example. The position calculating module 117 may calculate three dimensional information on a current position according to latitude, longitude, and altitude, by calculating information on a distance away from three or more base stations and accurate time information, and then applying trigonometry to the calculated information. Alternatively, the position calculating module 117 may calculate position information by continuously receiving position information of the electronic device 100 from three or more satellites in real time. The position information of the electronic device 100 may be obtained by various methods.

The broadcast receiving module 119 may receive a broadcast signal (for example, a TV broadcast signal, a radio broadcast signal, a data broadcast signal, and the like) and/or broadcast related information (for example, information associated with a broadcast channel, a broadcast program, or a broadcast service provider) from an external broadcast management server through a broadcast channel (for example, a satellite broadcast channel, a terrestrial broadcast channel, or the like).

The user input unit 120 may generate input data for controlling the operation of the electronic device 100 in response to a user input. The user input unit 120 may include a keypad, a dome switch, a touch pad (resistive type/capacitive type), a jog/shuttle, and a sensor to detect various inputs by the user. The sensor according to various embodiments of the present disclosure may include a voice recognition sensor, an infrared sensor, an acceleration sensor, a gyro sensor, a terrestrial magnetism sensor, an illuminance sensor, a color sensor, an image sensor, a temperature sensor, a proximity sensor, a motion recognition sensor, and a pressure sensor.

The user input unit 120 may be implemented in the form of buttons located outside the electronic device 100 or some or all of the user input unit 120 may be implemented in the form of touch panel. The user input unit 120 may receive a user input for initiating the operation of the electronic device 100 according to various embodiments of the present disclosure and generate an input signal according to the user input. For example, the user input unit 120 may receive various user inputs to execute a particular application, input (make or insert) data, change a position of the electronic device 100, display contents, and transmit or receive data, and may generate an input signal according to the user input.

The touch screen 130 is an input/output means for simultaneously performing an input function and a display function, and may include a display unit 131 and a touch detection unit 133. In various embodiments of the present disclosure, the touch screen 130 may display various screens according to the operation of the electronic device 100 through the display unit 131. The various screens may include, for example, a messenger screen, a call screen, a game screen, a video reproduction screen, a gallery screen, a webpage screen, and a home screen. When an event (for example, a touch event, a hovering event, or an air gesture event) based on at least one of touch, hovering, or air gesture is input from a user through the touch detection unit 133 while a particular screen is displayed through the display unit 131, the touch screen 130 may transmit an input signal according to the event to the controller 180. The controller 180 may distinguish the received events and control an operation according to the distinguished event.

The display unit 131 may display (output) various pieces of information processed by the electronic device 100. For example, when the electronic device 100 is in a call mode, the display unit 131 may display a call related User Interface (UI) or Graphical User Interface (GUI). When the electronic device 100 is in a video call mode or a photography mode, the display unit 131 may display a photographed or/and received image and a UI and GUI related to the operation of the corresponding mode. The display unit 131 may display data, contents, or a content group related to the use of the electronic device 100. The display unit 131 may display various application execution screens corresponding to executed applications. Examples of the various screens of the display unit 131 according to the present disclosure will be described below.

The display unit 131 may support a screen display in a landscape mode according to a rotation direction (or an orientation) of the electronic device 100, a screen display according a portrait mode, and a screen display according to a change between the landscape mode and the portrait mode. The display unit 131 may include at least one of a Liquid Crystal Display (LCD), a Thin Film Transistor-LCD (TFT-LCD), a Light Emitting Diode (LED), an Organic LED (OLED), an Active Matrix OLED (AMOLED), a flexible display, a bended display, and a 3D display. Some of the displays may be implemented as transparent displays configured in a transparent or photo-transparent type.

The touch detection unit 133 may be placed on the display unit 131 and may detect a user input contacting or approaching a surface of the touch screen 130 (for example, single-touch, multi-touch, hovering, or air gesture input based on at least one of tap, drag, sweep, flick, drag & drop, drawing gesture (for example, writing), gesture (for example, writing)). When a user input is detected on the surface of the touch screen 130, the touch detection unit 133 may detect a coordinate where the user input is detected and transmit the detected coordinate to the controller 180. The touch detection unit 133 may detect a touch event or proximity event generated by the user, generate a signal according to the detected touch event or proximity event, and transmit the generated signal to the controller 180. The controller 180 may control execution of a function corresponding to an area where the touch event or the proximity event is generated by the signal transmitted from the touch detection unit 133.

The touch detection unit 133 may receive a user input for initiating the operation related to the use of the electronic device 100 and generate an input signal according to the user input in various embodiments of the present disclosure.

The touch detection unit 133 may be configured to convert a change in pressure applied to a specific portion of the display unit 131 or a change in electrostatic capacitance generated at a specific portion of the display unit 131 into an electric input signal. The touch detection unit 133 may detect not only a position and an area where an input means (for example, a user's finger or an electronic pen) touches or approaches the surface of the display unit 131 but also pressure of the touch according to an applied touch scheme. When there is a touch or proximity input for the touch detection unit 133, a signal(s) corresponding to the touch input may be transferred to a touch controller (not illustrated). The touch controller (not illustrated) may process the signal(s), and then transmit corresponding data to the controller 180. Accordingly, the controller 180 may identify which area of the touch screen 130 is touched or approached, and process execution of a function corresponding to the touch or proximity.

The audio processor 140 may transmit, to a speaker (SPK) 141, an audio signal input from the controller 180, and may perform a function of transferring an audio signal such as a voice input from a microphone (MIC) 143 to the controller 180. The audio processor 140 may convert voice/sound data into an audible sound to output the audible sound through the speaker 141 under a control of the controller 180, and may convert an audio signal such as a voice received from the microphone 143 into a digital signal to transfer the digital signal to the controller 180. The audio processor 140 may output an audio signal corresponding to a user input according to audio processing information (for example, an effect sound, a music file or the like) inserted into data.

The speaker 141 may output audio data received from the wireless communication unit 110 or stored in the storage unit 150. The speaker 141 may output sound signals related to functions (for example, functions of collecting data, displaying contents, sending a message, displaying an image, making a phone call, taking a picture, and reproducing a media file) performed by the electronic device 100.

The microphone 143 may receive an external sound signal and process the received sound signal to be electric voice data. In a call mode, the voice data processed through the microphone 143 may be converted into data which can be transmitted to the outside through the mobile communication module 111 and then output. Various noise removal algorithms for removing noise generated in a process of receiving an external sound signal may be implemented for the microphone 143.

The storage unit 150 may store one or more programs executed by the controller 180 and perform a function of temporarily storing input/output data. The input/output data may include, for example, logs, contents, messenger data (for example, conversation data), contact information (for example, landline or mobile phone numbers), messages, media files (for example, audio, video, image files).

The one or more programs may include data collected in connection with the use of the electronic device 100 and one or more contents generated based on at least some of the data (based on collected data or other data) stored in the storage unit 120. The storage unit 120 may store one or more pieces of condition information configured to display the one or more contents.

In various embodiments of the present disclosure, the storage unit 120 may include a first storage area 151 and a second storage area 153. The first storage area 151 may store contents generated based on at least some of the data collected in connection with the use of the electronic device 100. The contents stored in the first storage area 151 may be stored for a predetermined time (for example, based on time, day, week, or year). When the predetermined time passes, the contents may be removed from the first storage area 151.

The second storage area 153 may store contents corresponding to a user input (for example, a meaningful input) among the contents stored in the first storage area 151. In various embodiments of the present disclosure, the user input (meaningful input) may include at least one of commands of adding, editing, deleting, modifying the arrangement of, adding comments to, sharing, exporting, or directly storing the contents. According to various embodiments of the present disclosure, the contents generated based on at least some of the collected data and stored in the first storage area 151 may be moved to the second storage area 153 from the first storage area 151 in response to the user input (meaningful input). The contents stored in the second storage area 153 may be stored before a direct deletion command by the user.

In various embodiments of the present disclosure, the contents may be combined with tag information corresponding to an input attribute of the user input and stored in the storage unit 150. In various embodiments of the present disclosure, the tag information may be provided for a secondary function and service. For example, when the user shares particular contents through an SNS, a tag such as "shared" or information related thereto may be combined with the particular contents and then stored. By using the "shared" tag or the information related thereto, the electronic device 100 may provide a function of recommending (displaying) the particular contents, so as to allow the user to remember a memory about the past one year later. Alternatively, when the user comments on the particular contents related to a particular place, a "comment" tag or information related thereto may be combined with the particular contents and then stored. When the user is located in the particular place in the future, the electronic device 100 may provide a function of recommending (displaying) the particular contents, so as to allow the user to remember a memory about the past by using the "comment" tag or the information related thereto.

The storage unit 150 may also store use frequency (for example, application use frequency, content use frequency or the like), importance, and priority according to the operation of the electronic device 100. The storage unit 150 may store data related to various patterns of vibration data and sound data output in response to a touch input or a proximity input on the touch screen 130. The storage unit 150 may continuously or temporarily store an Operating System (OS) of the electronic device 100, a program related to an input and display control operation using the touch screen 130, a program related to a control operation of various functions of the electronic device 100, and various pieces of data generated by the operations of the programs.

The storage unit 150 may include at least one type of storage medium of a flash memory type memory, a hard disk type memory, a micro type memory, a card type memory (for example, a Secure Digital (SD) card, an eXtream Digital (XD) card, or the like), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk. The electronic device 100 may also operate in relation to a web storage performing a storage function of the storage unit 150 on the Internet.

The interface unit 160 may serve as an interface between the electronic device 100 and all external devices connected to the electronic device 100. The interface unit 160 may receive data from an external device, receive power and transmit the power to respective components within the electronic device 100, or allow data within the electronic device 100 to be transmitted to the external device. For example, the interface unit 160 may include a wired/wireless headset port, an external charger port, a wired/wireless data port, a memory card port, a port for connecting a device provided with an identification module, an audio input/output port, a video input/output port, an earphone port, and the like.

The camera module 170 corresponds to a component supporting a photography function of the electronic device 100. The camera module 170 may support photographing an image (a still image or a dynamic image) of the subject. The camera module 170 may photograph a predetermined subject according to a control of the controller 180 and transmit photographed data to the display unit 131 and the controller 180. The camera module 170 may include an image sensor (or a camera sensor) (not illustrated) for converting an input photo signal into an electric signal and an image signal processing unit (not illustrated) for converting the electric signal input from the image sensor into a digital image data. The image sensor may include a sensor using a Charge-Coupled Device (CCD) or a Complementary Metal-Oxide-Semiconductor (CMOS). The camera module 170 may support an image processing function for supporting photography according to various photography options (for example, zooming, screen ratio, an effect (for example, sketch, mono, sepia, vintage, mosaic, frame, and the like) in accordance with a user's setting.

The controller 180 may control a general operation of the electronic device 100. For example, the controller 180 may perform a control related to voice communication, data communication, video communication, and the like. The controller 180 may process an operation corresponding to the collection of data (for example, logs generated according to the use of the electronic device 100) related to the use of the electronic device 100. According to an embodiment, the controller 180 may collect data related to the execution of the functions of the electronic device 100, collect data related to a geographical position of the electronic device 100 which changes according to the movement of the user from a particular place to another place, collect data related to the reception of data from an external electronic device (for example, the server 230 or the electronic device 220), or collect data related to shared or transmission of various pieces of data (for example, pictures, messages, emails, and data according to the use of SNS) of the electronic device 100 to an external electronic device.

The controller 180 may generate one or more contents based on at least some of the data and process an operation related to the storage of the contents in the storage unit 150. According to an embodiment, the controller 180 may generate one or more contents based on collected data or other data. For example, the controller 180 may generate one or more contents based on at least some of the data, and generate a content group (log content group) in which at least some of the one or more contents are grouped, and store the generated content group.

The controller 180 may process an operation related to displays of the one or more contents according to a preset condition. The preset condition may include, for example, various pieces of context information (for example, position, time, attribute and the like) under which the one or more contents are generated, and an exposure period (for example, a week) of the contents.

The controller 180 may process an operation related to the management of the contents according to the exposure period of the contents and a user input. According to an embodiment, the controller 180 may delete the corresponding contents when the exposure period (for example, a predetermined time) of the contents passes, and store the corresponding contents based on a user input made before the exposure period of the contents passes.

The controller 180 may insert at least one of time information and position information into data (for example, logs) related to the use of the electronic device 100 by the user and store the data, and may generate the data as visual contents based on at least some of the corresponding data. The controller 180 may configure a content group according to each particular topic (for example, time, place, schedule, or function) based on at least some of the collected data or the generated visual contents.

The controller 180 may be implemented by one or more processors that control the operation of the electronic device 100 according to the present disclosure by executing one or more programs stored in the storage unit 150. For example, the controller 180 may include a collection module 181, a generation module 183, a display module 185, and a management module 187.

The collection module 181 may collect data related to the use of the electronic device 100.

The generation module 183 may generate one or more contents based on at least some of the data collected through the collection module 181.

The display module 185 may display the one or more contents generated through the generation module 183 according to a preset condition. The display module 185 may expose and display the one or more contents for a predetermined time when a predetermined period passes or in response to the collected data.

The management module 187 may make a control to expose the one or more contents generated through the generation module 183 for a predetermined time according to a preset condition and manage the temporary or permanent storage of the corresponding contents in response to a user input (for example, a meaningful input). When the predetermined time passes, the management module 187 may delete the one or more contents and store the one or more contents based on a user input made before the predetermined time passes.

In various embodiments of the present disclosure, detailed operations of the controller 180 for controlling the electronic device 100 will be described.

The controller 180 according to embodiments of the present disclosure may control various operations related to general functions of the electronic device as well as the above described functions. For example, the controller 180 may control an operation and a screen display of a particular application when the application is executed. Further, the controller 180 may receive input signals corresponding to various touch events or proximity event inputs supported by a touch-based or proximity-based input interface (for example, the touch screen 130) and may control an operation of functions according to the received input signals. Moreover, the controller 180 may also control transmission/reception of various types of data based on wired communication or wireless communication.

The power supply unit 190 may receive external power and internal power and may supply the power required for an operation of the components under the control of the controller 180. In an embodiment of the present disclosure, the power supply unit 190 may supply or block (on/off) power to the display unit 131 under a control of the controller 180.

The aforementioned electronic device 100 according to the various embodiments of the present disclosure may include all devices using an Application Processor (AP), a Graphic Processing unit (GPU), and a Central Processing Unit (CPU), such as all information communication devices, all multimedia devices, and all application devices thereof, which support the functions of the present disclosure.

Further, various embodiments of the present disclosure may be implemented in a recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

The recording medium may include a computer-readable recording medium which records a program for executing an operation of collecting data related to the use of the electronic device 100, an operation of generating one or more contents based on at least some of the data, and an operation of displaying the one or more contents according to a preset condition.

In some cases, the embodiments described in the present specification may be implemented by the controller 180 itself. Furthermore, according to the software implementation, the embodiments such as processes and functions described in the present specification may also be implemented by separate software modules. The software modules may perform one or more functions and operations described in the present specification.

Figure 2:
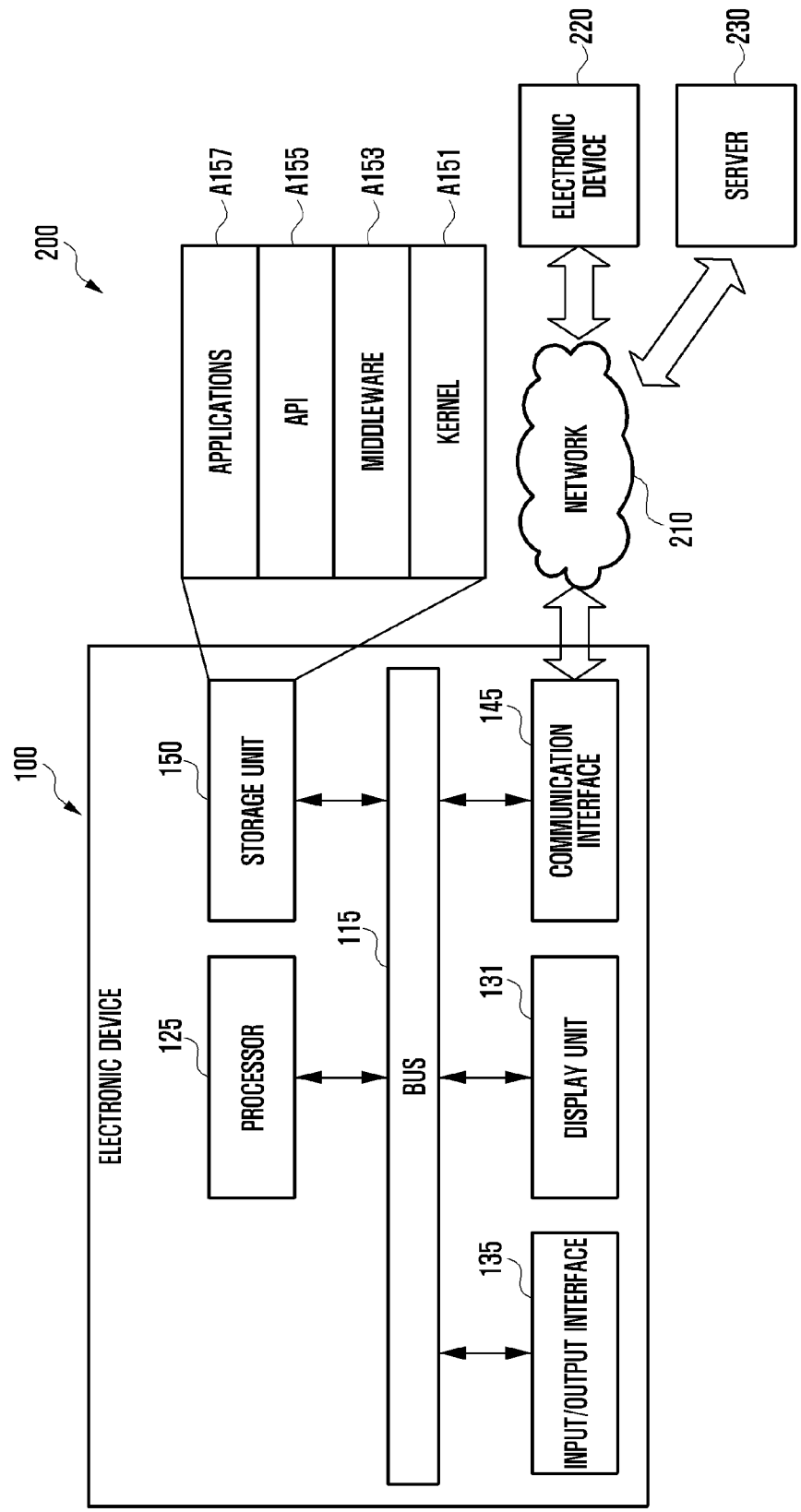
FIG. 2 illustrates a network environment including an electronic device according to various embodiments of the present disclosure.

FIG. 2 is a block diagram illustrating a configuration of an electronic device according to an embodiment of the present disclosure.

Referring to FIG. 2, the electronic device 100 may include a bus 115, a processor 125, a memory 130, an input/output interface 135, a display module 131, a communication module 145, and other similar and/or suitable components.

The bus 115 may be a circuit which interconnects the above-described elements and delivers a communication (e.g., a control message) between the above-described elements.

The processor 125 may receive commands from the above-described other elements (e.g., the memory 150, an input/output interface 135, the display module 131, the communication module 145, etc.) through the bus 115, may interpret the received commands, and may execute calculation or data processing according to the interpreted commands.

The memory 150 may store commands or data received from the processor 125 or other elements (e.g., an input/output interface 135, the display module 131, the communication module 135, etc.) or generated by the processor 125 or the other elements. The memory 150 may include programming modules, such as a kernel A151, middleware A153, an Application Programming Interface (API) A155, an application A157, and the like. Each of the above-described programming modules may be implemented in software, firmware, hardware, or a combination of two or more thereof.

The kernel A151 may control or manage system resources (e.g., the bus 115, the processor 125, the memory 150, etc.) used to execute operations or functions implemented by other programming modules (e.g., the middleware A153, the API A155, and the application A157). Also, the kernel A151 may provide an interface capable of accessing and controlling or managing the individual elements of the electronic device 100 by using the middleware A153, the API A155, or the application A157.

The middleware A153 may serve to go between the API A155 or the application A157 and the kernel A153 in such a manner that the API A155 or the application A157 communicates with the kernel A151 and exchanges data therewith. Also, in relation to work requests received from one or more applications A157 and/or the middleware A153, for example, may perform load balancing of the work requests by using a method of assigning a priority, in which system resources (e.g., the bus 115, the processor 125, the memory 150, etc.) of the electronic device 100 can be used, to at least one of the one or more applications A157.

The API A155 is an interface through which the application A157 is capable of controlling a function provided by the kernel A151 or the middleware A153, and may include, for example, at least one interface or function for file control, window control, image processing, character control, or the like.

The input/output interface 135, for example, may receive a command or data as input from a user, and may deliver the received command or data to the processor 125 or the memory 150 through the bus 115. The display module 131 may display a video, an image, data, or the like to the user.

According to various embodiments, the applications A157 may include a Short Message Service (SMS)/Multimedia Message Service (MMS) application, an e-mail application, a calendar application, an alarm application, a health care application (for example, an application for measuring an amount of exercise or blood sugar), and an environmental information application (for example, an application for providing an atmospheric pressure, humidity, temperature, and the like). Additionally or alternately, the applications A157 may include an application related to an information exchange between the electronic device 100 and an external electronic device (for example, an electronic device 220). The application related to the information exchange may include, for example, a notification relay application for transmitting specific information to the external electronic device, or a device management application for managing the external electronic device.

For example, the notification relay application may include a function of transferring, to the external electronic device (for example, the electronic device 220), notification information generated from other applications of the electronic device 100 (for example, an SMS/MMS application, an e-mail application, a health management application, an environmental information application, and the like). Additionally or alternatively, the notification relay application may receive notification information from, for example, an external electronic device (for example, the electronic device 220), and provide the same to a user. The device management application, for example, may manage (for example, install, delete, or update) at least some functions (for example, turning an external electronic device (or some elements of the external electronic device) on or off or adjusting the brightness (or resolution) of a display) of an external electronic device (for example, the electronic device 220) that communicates with the electronic device 100, applications performed in the external electronic device, or services (for example, a phone call service, or a messaging service) provided from the external electronic device.

According to various embodiments, the applications A157 may include an application designated according to a property (for example, a kind of the electronic device) of the external electronic device (for example, the electronic device 100). For example, when the external electronic device is an MP3 player, the applications A157 may include an application related to the reproduction of music. Similarly, when the external electronic device is a mobile medical appliance, the applications A157 may include an application related to health care. According to an embodiment, the applications A157 may include at least one of an application designated to the electronic device 100 and an application received from the external electronic device (for example, a server 230 or the electronic device 220).

The input/output interface 135 may transfer an instruction or data input from a user through an input/output device (for example, a sensor, a keyboard, or a touch screen) to the processor 125, the storage unit 150, and the communication interface 145 through, for example, the bus 115. For example, the input/output interface 135 may provide the processor 125 with data on a user's touch input through the touch screen. Also, the input/output interface 135 may output a command or data received from the processor 125, the storage unit 150, and the communication interface 145, for example, through the bus 115, to an input/output device (for example, a speaker or display). For example, the input/output interface 135 may output voice data processed through the processor 125 to a user through a speaker 141.

The display unit 131 may display various pieces of information (for example, multimedia data or text data) to a user.

The communication interface 145 may connect communication between the electronic device 100 and the external electronic device (for example, the electronic device 220 or the server 230). For example, the communication interface 145 may be connected to a network 210 through wireless or wired communication to communicate with the external device. The wireless communication may include at least one of, for example, a Wireless Fidelity (Wi-Fi), a Bluetooth (BT), a Near Field Communication (NFC), a Global Positioning System (GPS) and a cellular communication (for example, an LTE, an LTE-A, a CDMA, a WCDMA, a UMTS, a WiBro, a GSM or the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the network 210 may be a communication network. The communication network may include at least one of a computer network, the Internet, the Internet of things, and a telephone network. According to an embodiment, a protocol (for example, a transport layer protocol, data link layer protocol, or a physical layer protocol) for communication between the electronic device 100 and the external device may be supported by at least one of the applications A157, the API A155, the middleware A153, the kernel A151, and the communication interface 145.

According to an embodiment, the server 230 may support driving of the electronic device 100 by conducting at least one operation among operations (or functions) performed by the electronic device 100.

According to an embodiment, in the electronic device 100, information acquired by the input/output interface 135 or the communication interface 145 may be stored in the storage 150 by the processor 125. Additionally or alternatively, logs (not shown) left by the user through the applications A157 may be stored in the storage unit 150.

As described above, the electronic device 100 according to various embodiments of the present disclosure may include the collection module 181 for collecting data related to the use of the electronic device 100, the generation module 183 for generating one or more contents based on at least some of the collected data, and the display module 185 for displaying the one or more contents according to a preset condition. Additionally or alternatively, the electronic device 100 according to various embodiments of the present disclosure may include the management module 187 for managing to expose the one or more contents generated through the generation module 183 for a predetermined time according to the preset condition.

Figure 3:
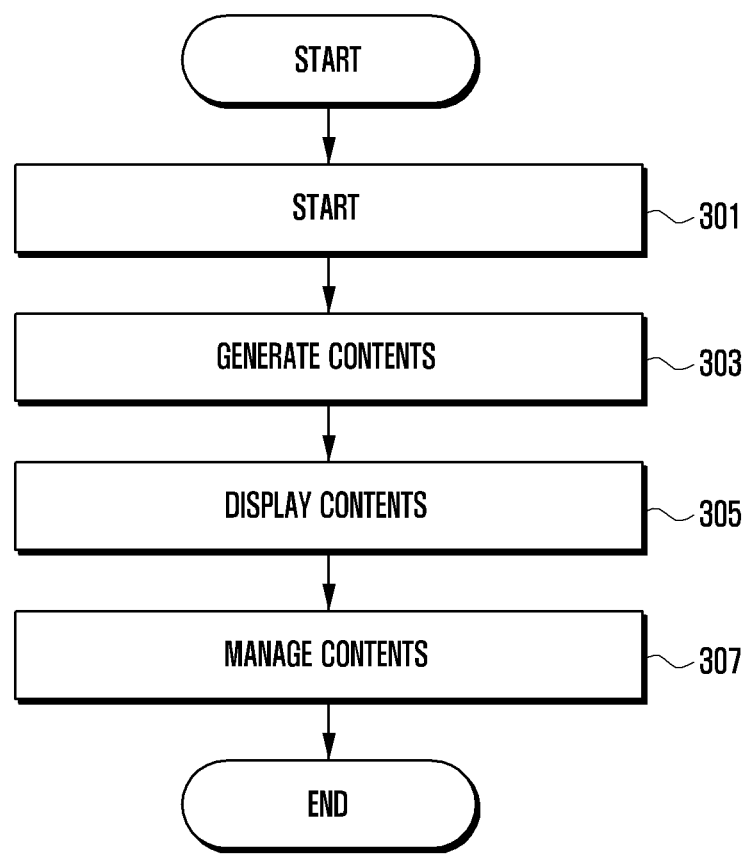
FIG. 3 illustrates the operation of an electronic device according to various embodiments of the present disclosure.

FIG. 3 illustrates the operation of the electronic device 100 according to various embodiments of the present disclosure.

Referring to FIG. 3, in step 301, the controller 180 may collect data related to the use of the electronic device 100 (for example, logs generated according to the use of the electronic device 100). For example, the controller 180 may collect data related to the execution of the functions of the electronic device 100, collect data related to a geographical position of the electronic device 100 which changes according to the movement of the user from a particular place to another place, collect data related to the reception of data from an external electronic device (for example, the server 230 or the electronic device 220), or collect data related to shared or transmission of various pieces of data (for example, pictures, messages, emails, and data according to the use of SNS) of the electronic device 100 to an external electronic device.

In step 303, the controller 180 may generate one or more contents based on at least some of the data. According to an embodiment, the controller 180 may generate one or more contents based on at least some of the data and generate one or more contents grouped based on at least some of the one or more contents.

In step 305, the controller 180 may display the contents according to a preset condition. The condition may include, for example, various pieces of context information (for example, position, time, attribute and the like) under which the one or more contents are generated, and an exposure period (for example, a week) of the contents.

In step 307, the controller 180 may manage contents. According to an embodiment, the controller 100 may delete the corresponding contents when a predetermined time (for example, a week) passes with respect to the contents, and store the corresponding contents based on a user input made before the predetermined time.

Figure 5:
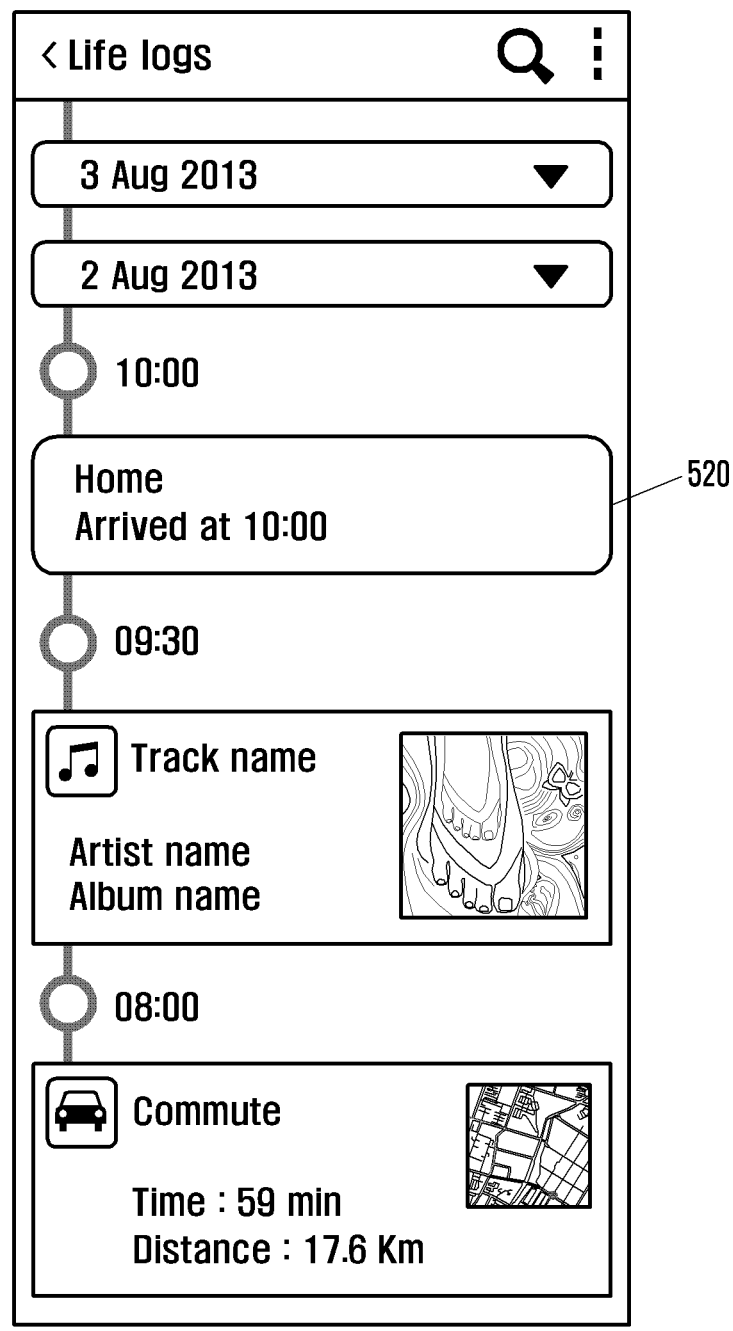
FIG. 5 illustrates an example of contents generated by an electronic device according to various embodiments of the present disclosure.

FIG. 4 illustrates an example of data (logs) collected by the electronic device 100 according to various embodiments of the present disclosure. FIG. 5 illustrates an example of contents generated by the electronic device 100 according to various embodiments of the present disclosure.

According to various embodiments, the electronic device 100 may store one or more pieces of log data (for example, log data 410) including data such as time information or position information corresponding to the time and position in which the user uses the electronic device 100. According to an embodiment, the electronic device 100 may generate the corresponding log data 410 as visual type log contents 520, and may summarize the log data 410 or the log contents 520 according to each topic (for example, time, place, schedule, or function) to configure a log content group (for example, a group 610 in FIG. 6).

According to an embodiment, the electronic device 100 may store log records including time information and position information corresponding to the use of the electronic device 100 by the user, and generate the corresponding log data 410 as visual contents (log contents) 520.

According to an embodiment, the electronic device 100 may periodically or aperiodically store the log data 410 in a Data Base (DB) by a log collection engine (for example, the collection module 181), and the corresponding log data 410 may include at least one of the time information and the position information.

According to an embodiment, the electronic device 100 may make the log data 410 or the log contents 520 as an objects according to each situation (for example, time or place) in which the log is generated or each function, and may perform a visualization operation for grouping or combining a plurality of logs into one when a preset condition is satisfied. For example, the electronic device 100 may visualize call logs or message logs in card form, group and visualize played sound source lists in card form, and combine a log corresponding to departure from a particular area and a log corresponding to arrival at another area and visualize a movement route as one log card, and then arrange and display the logs on the screen according to the order of time or place.

Figure 6:
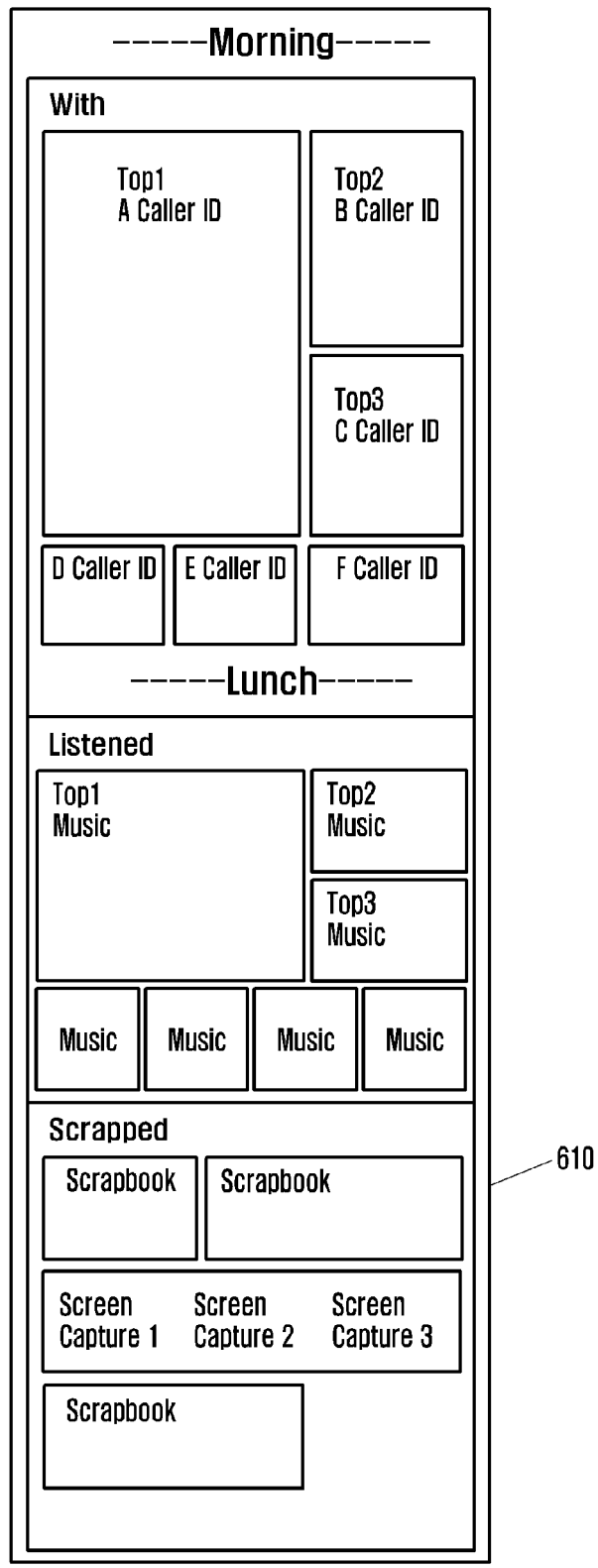
FIG. 6 illustrates an example of a log content group according to various embodiments of the present disclosure.

FIG. 6 illustrates an example of a log content group according to various embodiments of the present disclosure.

According to various embodiments, the electronic device 100 may collect the log data 410 or the log contents 520 in the unit of particular time or places, and summarize the collected data (for example, the log data 410 or the log contents 520) according to each topic (for example, time, place, schedule, or function) to configure the log content group 610.

For example, as illustrated in the example of FIG. 6, the electronic device 100 may collect logs for one day (particular time), separate the collected data according to the time unit such as morning and lunch, and group records of transmission and reception of calls, messages, or emails with a particular person based on a "With" function among the logs corresponding to each time unit (for example, morning or lunch).

According to various embodiments, instead of the title "With" for each function, sound sources which have been played may be grouped and displayed by "Listened" and contents which have been scrapped may be grouped and displayed by "Scrapped".

As described above, the content group 610 may be constructed by configuring the groups in the unit of one day (particular time) and arranging the groups according to time and function.

According to various embodiments, the corresponding log content group 610 may be exposed to the screen for a predetermined time, and may be deleted when a predetermined time passes.

According to an embodiment, as illustrated in the example of FIG. 6, the log content group 610 which is automatically generated may be exposed to the screen for a predetermined time. That is, the log content group 610 may have a characteristic of volatile data. For example, the log content group 610 may be exposed to the user through a particular menu screen for a week (seven days), and may be automatically removed from the electronic device 100 when a predetermined time (a week) passes.

Whenever the log data 410 or the log contents 520 of the log content group 610 are generated, the corresponding data may be updated. For example, in a case where it is assumed that the log content group 610 is configured based on days, whenever log data is generated each day, the corresponding data may be updated in the log content group 610 corresponding to that day. When that day passes, the corresponding log content group 610 may be deleted. Thus, the log content group 610 may be exposed to the user for a week.

Figure 7:
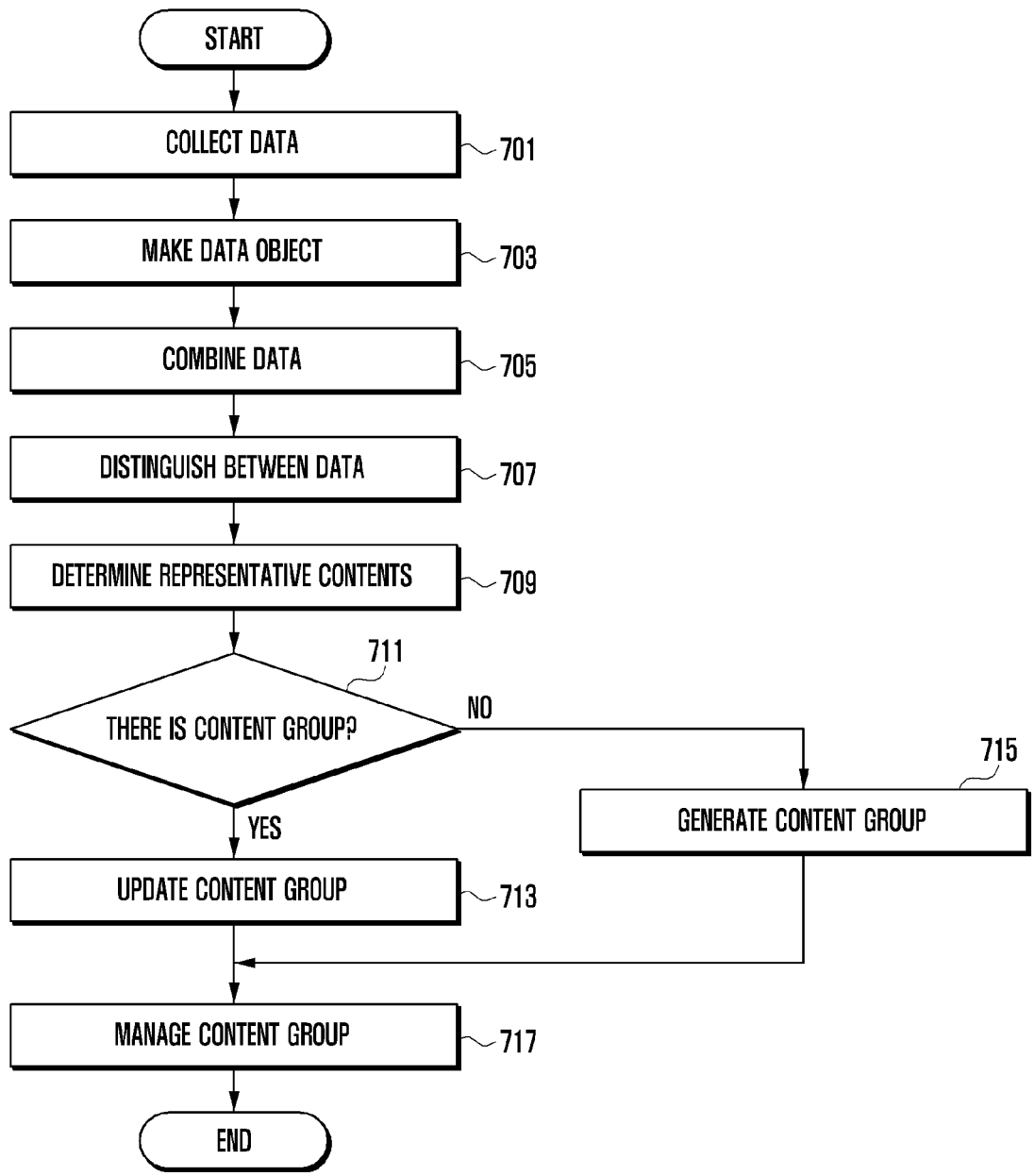
FIG. 7 illustrates an operation of an electronic device according to various embodiments of the present disclosure.

FIG. 7 illustrates the operation of the electronic device 100 according to various embodiments of the present disclosure.

Referring to FIG. 7, in step 701, the controller 180 may collect data related to the use of the electronic device 100 (for example, logs generated according to the use of the electronic device 100). According to an embodiment, the controller 180 may periodically or aperiodically collect data by a log collection engine (for example, the collection module 181) and manage the collected data in a database. The collected data may include at least one of time information and position information. According to an embodiment, the controller 180 may collect data in the unit of particular time or particular places.

In step 703, the controller 180 may present the collected data as an object. According to an embodiment, the controller 180 may present the collected data as an object based on each situation (for example, time or place) in which the data is generated or each function. For example, the controller 180 may visualize call log data or message log data in a card form and acquire an object. Alternatively, the controller 180 may group sound source lists related to the use of play and visualize the sound source lists in a card form, to acquire an object. Alternatively, the controller 180 may combine log data leaving a particular region and log data arriving at another region and visualize a movement route as one log card, to acquire an object.

In step 705, the controller 180 may combine the collected data or the object. For example, the collected data or the objects may be combined according to each topic (for example, time, place, schedule, or function). For example, various pieces of data or objects may be combined according to each corresponding topic and configured as one or more contents.

According to various embodiments, an operation of combining data according to each topic may be included in an operation of generating contents based on at least some of the collected data.

In step 707, the controller 180 may distinguish one or more contents according to a preset condition (for example, time, place, schedule, user input, information, event, or function) based on at least some of the contents.

According to an embodiment, the controller 180 may distinguish one or more contents related to a particular time (for example, for one day) under a condition of the unit of particular days, distinguish the contents corresponding to the unit of days under a condition of the time unit such as "Morning", "Lunch", and "Evening", and distinguish records related to contacts such as transmission and reception of calls, messages, or mails among the contents corresponding to the unit of days under a condition of a function unit such as "With".

According to another embodiment, instead of the "With" condition, the contents may be distinguished under a condition of "Listened" in a case of a played sound source, and under a condition of "Scrapped" in a case of scrapped contents.

In step 709, the controller 180 may determine representative contents or representative data (for example, representative text, representative image, representative title or the like) among the contents distinguished under the configured condition.

According to an embodiment, when one or more contents distinguished according to the configured condition are displayed, the controller 180 may make a control to display the one or more contents based on representative contents or representative data. For example, the controller 180 may make a control to generate a group with respect to contents related to the particular time (for example, for a day) according to the particular time condition and display the contents in the unit of groups. When the contents are displayed in the unit of groups, the controller 180 may make a control to display the contents based on the determined representative contents or representative data.

In step 711, the controller 180 may determine whether there is a content group corresponding to contents configured according to the condition (for example, time, place, schedule, user input, information, event, or function). According to an embodiment, when data is collected, the controller 180 may identify whether a content group exists corresponding to the contents in the one or more content groups stored in the storage unit 150 in order to display the one or more contents. For example, the controller 180 may determine whether the content group exists by searching for the content group corresponding to the condition (for example, particular time) in the content groups stored in the storage unit 150.

In step 713, when the content group generated according to the condition (for example, particular time) exists, the controller 180 may update the corresponding content group. According to an embodiment, the controller 180 may re-configure the contents stored in the storage unit 150 based on at least some of the data or the contents. According to an embodiment, the controller 180 may perform an operation of determining representative contents or representative data (for example, representative text, representative image, representative title and the like) based on at least some of data or contents which exist or are to be added when the content group is updated.

In step 715, when there is no content group generated according to the condition (for example, particular time), the controller 180 may generate the content group. According to an embodiment, the controller 180 may generate the content groups distinguished according to the configured conditions based on at least some of the data or the contents.

According to various embodiments, an operation of distinguishing the data according to the configured condition, an operation of determining the representative contents or representative data, an operation of generating the content group according to the condition (for example, particular time), and an operation of updating the content group may be included in the operation of displaying the contents according to the configured condition.

In step 717, the controller 180 may store the content group updated in step 713 or the content group generated in step 715 or manage the corresponding content group. According to an embodiment, the controller 180 may store the corresponding content group in the first storage area 151 of the storage unit 150, manage to expose the corresponding content group for a preset period (for example, a week), and remove the corresponding content group from the first storage area 151 when the preset period passes.

According to an embodiment, when a user input (for example, an input for adding, editing, deleting, modifying arrangement of, adding comments to, sharing, exporting, or directly storing the contents) (meaningful input) for the corresponding content group is detected before a predetermined time for the content group stored in the first storage area 151 passes, the controller 180 may store (for example, move or copy) the corresponding content group in the second storage area 153 from the first storage area 151.

Figure 8:
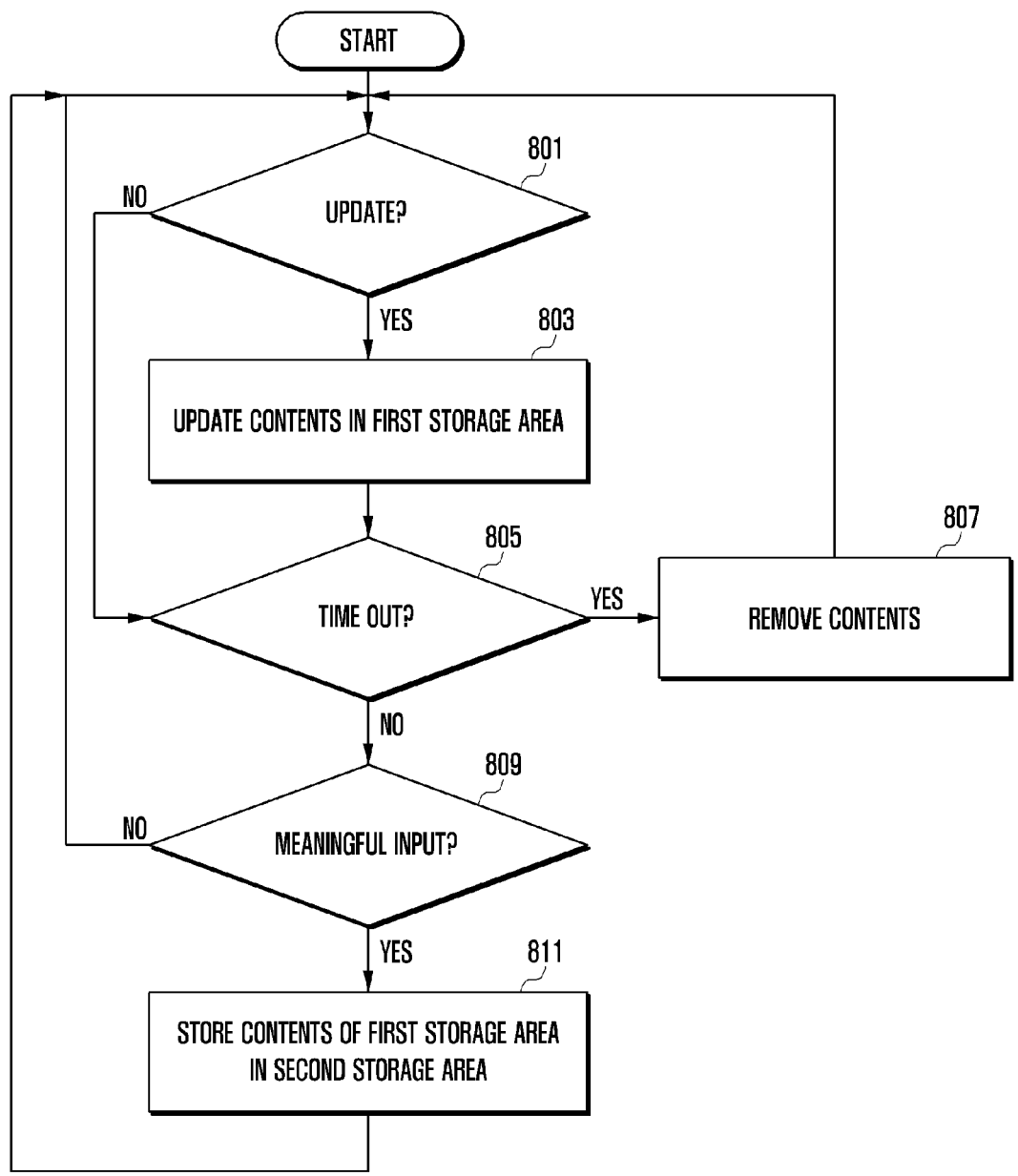
FIG. 8 illustrates an operation of managing contents in an electronic device according to various embodiments of the present disclosure.

FIG. 8 illustrates a content managing operation of the electronic device 100 according to various embodiments of the present disclosure.

Referring to FIG. 8, in step 801, the controller 180 may determine whether there is data (for example, life logs) or contents to be updated by the electronic device 100. According to an embodiment, the controller 180 may determine whether there is additional data collection related to the use of the electronic device 100. For example, the controller 180 may determine whether data or contents are newly generated.

According to various embodiments, the content group may be updated whenever data or contents related to the use of the electronic device are generated. For example, in a case where it is assumed that the content group is configured in the unit of one day, whenever data is generated each day, the corresponding data may be updated in the content group corresponding to that day. When that day passes, the corresponding content group may be deleted. Thus, according to an embodiment, the content group may be exposed to the user for the configured period (for example, a week). In step 801, when the data is not updated, the controller 180 may proceed to step 805 and perform an operation of determining whether a configured period of the contents including the stored existing data or corresponding data times out.

In step 801, when there are data or contents to be updated, for example, when data or contents including the data are generated in the electronic device 100, the controller 180 may proceed to step 803 and update (store) the corresponding data or contents in the first storage area 151. Updating (Storing) step 803 may include an operation of updating (storing) the data or contents in the unit of content groups related to the data or contents.

In step 805, the controller 180 may perform an operation of determining whether a configured period of the data or contents stored in the electronic device 100 times out.

In step 805, when the configured period of the corresponding data or contents times out, the controller 180 may proceed to step 807 and remove the corresponding data or contents from the first storage area 151. For example, the data or contents stored in the first storage area 151 may be exposed to the user through a particular menu screen for a preset period (for example, a week), and automatically removed when the preset period (a week) times out. Removing step 807 may include an operation of removing the data or contents in the unit of content groups related to the data or contents.

In step 805, when the preset period does not time out in the electronic device 100, the controller 180 may proceed to step 809 and determine whether there is a user input (for example, a command for adding, editing, deleting, modifying arrangement of, adding comments to, sharing, exporting, or directly storing the contents) (meaningful input) for the data or contents in the first storage area 151 by the user. The user input (meaningful input) may refer to an intentional input made to continuously manage or remember the corresponding data or contents of the first storage area 151 by the user. According to an embodiment, the user input may include an input based on the command for adding, deleting, modifying arrangement of, adding comments to, sharing, exporting, or directly storing the contents.

In step 809, when there is no user input (meaningful input), the controller 180 may proceed to step 801 and perform the following steps.

In step 809, when the user input (meaningful input) exists, the controller 180 may store (move or copy) the corresponding data or contents in the second storage area 153 from the first storage area 151.

Storing step 811 may include an operation of storing the data or contents in the unit of content groups related to the data or contents. According to an embodiment, it may be assumed that the user views a yesterday summary screen (a content group stored in the first storage area) configured based on at least some of yesterday data (logs) or contents and shares the corresponding content group through an SNS. The controller 180 may process an operation of sharing the corresponding content group through an SNS and determine that there is a user's intention to remember the corresponding content group. Further, the controller 180 may update the corresponding content group exposed only for a week (preset period) in a separate content group list (for example, content group list of the second storage area 153) which is permanently stored.

Figure 9:
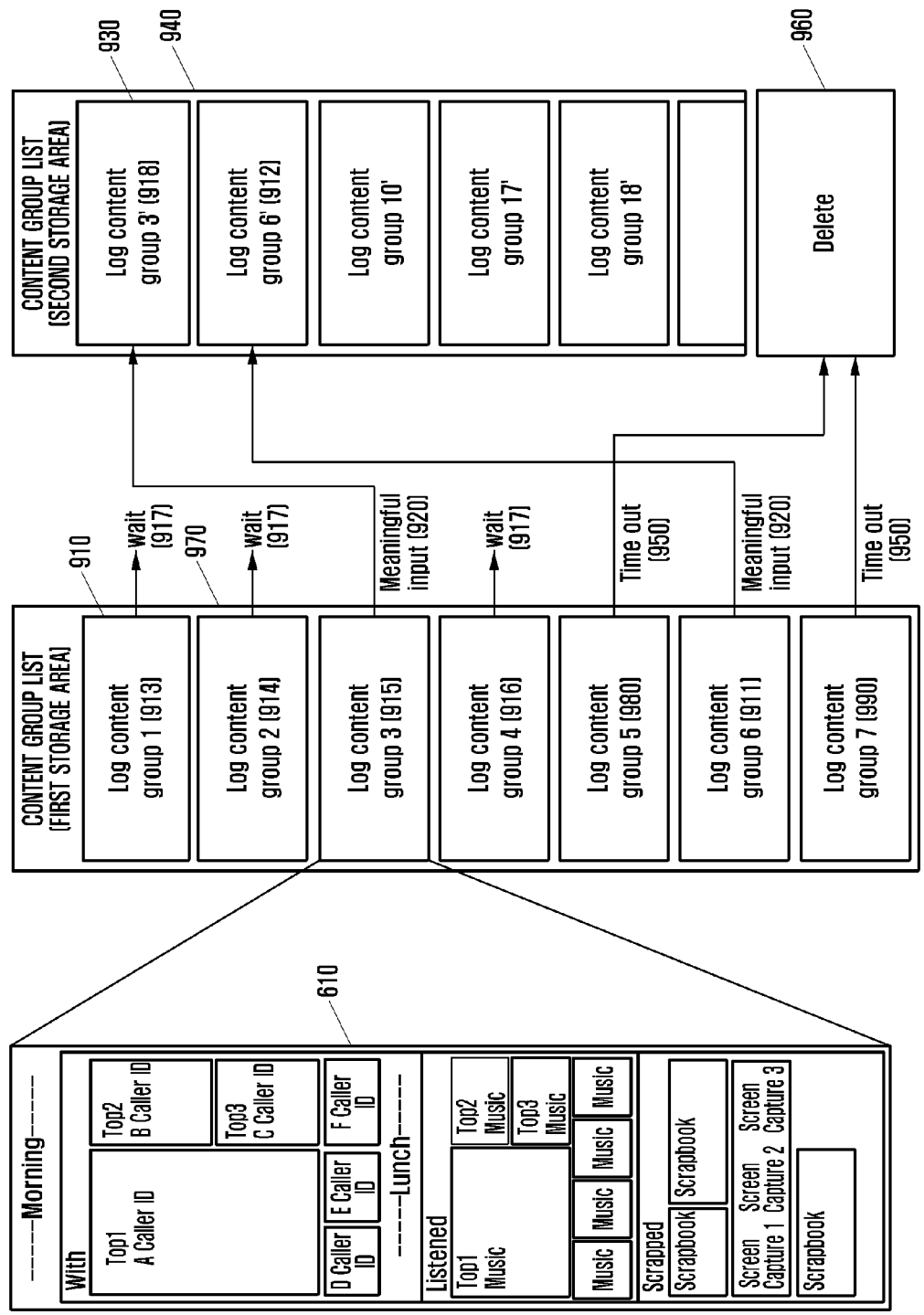
FIG. 9 illustrates a flow of attributes of a content group according to various embodiments of the present disclosure.

FIG. 9 illustrates a flow of a storage area for a content group according to various embodiments of the present disclosure.

According to various embodiment, when the electronic device 100 receives a meaningful input 920 for the corresponding content group 610 stored in the first storage area 151 from the user before a preset period times out, the electronic device 100 may update the corresponding content group 610 in a separate content group list included in the second storage area 153 which permanently stores the contents.

According to various embodiments of the present disclosure, when the electronic device 100 receives the meaningful input 920 from the user before a preset period, during which the automatically generated content group 610 is temporarily exposed and then removed, times out, the content group may be stored as a permanent content group (for example, a content group 930). According to an embodiment, the electronic device 100 may store the content group 610 in the first storage area 151 and store the corresponding content group 610 in the second storage area 153 in response to the meaningful input 920 for the corresponding content group 610.

According to an embodiment, the meaningful input 920 may refer to various user inputs generated using the electronic device 100 according to a user's intention to remember the corresponding content group. In various embodiments of the present disclosure, the user input corresponding to the meaningful input 920 may include at least one of commands of adding, deleting, modifying arrangement of, adding comments to, sharing, exporting, or directly storing the contents.

According to an embodiment, when the user views a content group (for example, content group stored in the first storage area 151 (for example, yesterday summary screen) including yesterday's contents and shares the corresponding content group through an SNS, the electronic device 100 may determine that the user has an intention of remembering the corresponding content group and update the corresponding content group exposed only for a preset period (for example, a week) in a separate content group list 940 (for example, content group list stored in the second storage area 153) which permanently stores the contents.

According to various embodiments, when a preset period times out (for example, step 950), the automatically generated content group may be automatically removed in step 960. When a meaningful input is received from the user before the preset period times out, the corresponding content group may be updated in a separate list 940 which permanently sores the content group as illustrated in step 920.

According to an embodiment, "'Log content group 5" 980 and "Log content group 7" 990 included in a content group list 970 (which may be stored in the first storage area) are content groups of which the preset period times out and correspond to targets 960 to be removed. However, since "Log content group 6" 911 receives the meaningful input 920 from the user before the preset period times out, "Log content group 6" 911 may be updated as permanent data (Log content group 6' 912) in the second storage area 153 (for example, content group list 940 stored in the second storage area 153).

According to an embodiment, a group from "Log content group 1" 913 to "Log content group 4" 916 corresponds to a content group of which a predetermined expiration does not time out, and maintains a wait state 317. Since "Log content group 3" 915 receives the meaningful input 920 from the user, "Log content group 3" 915 may be updated as permanent data (Log content group 3' 918) in the second storage area 153. Since "Log content group 3" 915 receives the meaningful input and its expiration does not time out, "Log content group 3" 915 may be a content group simultaneously existing in both the first storage area 151 and the second storage area 153.

Figure 10:
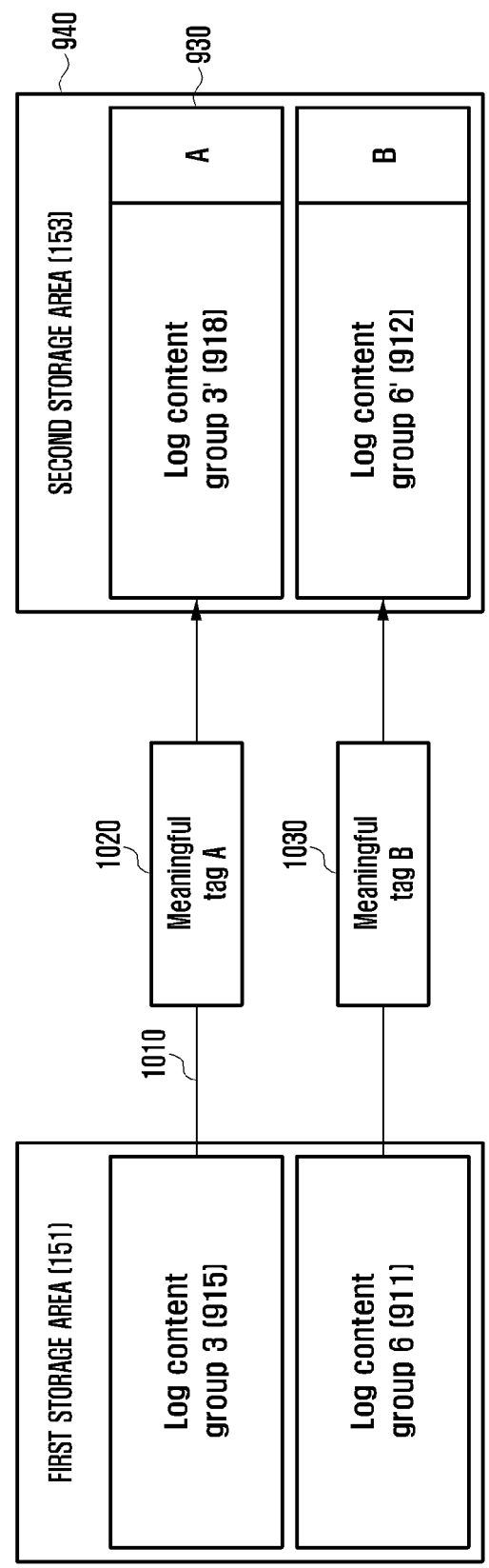
FIG. 10 illustrates an operation of adding tags in an electronic device according to various embodiments of the present disclosure.

FIG. 10 illustrates a tag adding operation of the electronic device 100 according to various embodiments of the present disclosure.

According to an embodiment, the updated second group 930 in the second storage area 153 may be assigned different tags (for example, tag A 1020 and tag B 1030) according to input attributes of the meaningful inputs (for example, step 920 of FIG. 9 and step 1010 of FIG. 10) and may provide secondary functions (services) using the corresponding tags.

The meaningful inputs (for example, step 920 of FIG. 9 and step 1010 of FIG. 10) may include at least one element of commands for adding, deleting, modifying arrangement of, adding comments to, sharing, exporting, or directly storing contents, and may assign different tags (for example, tag A 1020) to the content group (for example, "Log content group 3'" 918) of the second storage area 153 according to the attribute of the meaningful input 1010 based on the update of the content group (for example, "Log content group 3" 315) of the first storage area 151 in the content group list (for example, the content group list 940 of the second storage area 153).

According to an embodiment, when a today summary screen (a content group of the first storage area 151) stored in the first storage area 151 is shared on an SNS, the corresponding summary screen may change to have a permanent attribute and may be updated in the content group list 940 of the second storage area 153, and the corresponding summary screen (a content group of the second storage area 153) may be assigned a tag including information such as "shared". The assigned tag information may provide a secondary function and service.

Figure 11:
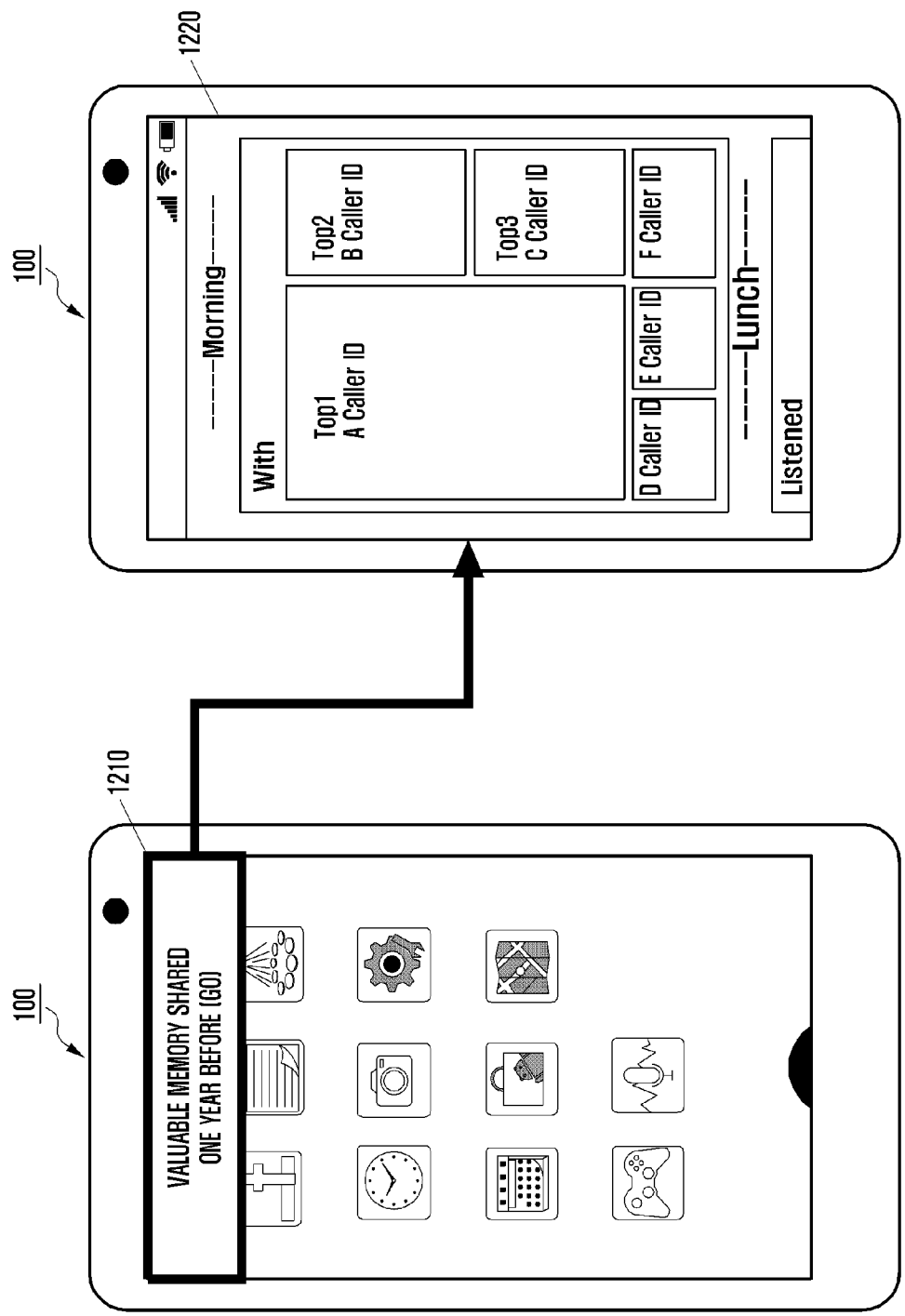
FIG. 11 and FIG. 12 illustrate examples of an operation in which an electronic device provides a service by using a tag according to various embodiments of the present disclosure.
Figure 12:
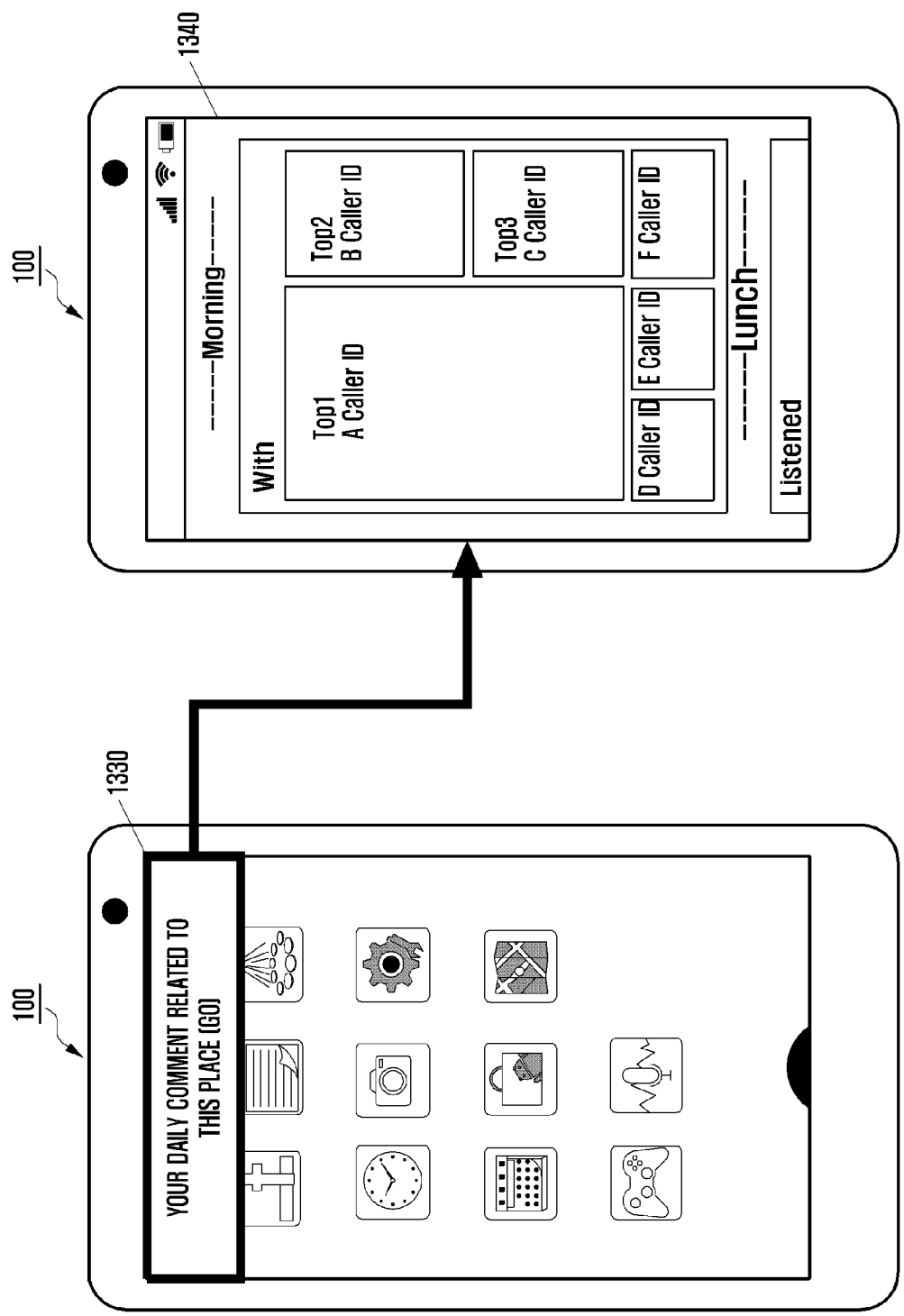

FIGS. 11 and 12 illustrate examples of operations in which the electronic device 100 provides a service by using a tag according to various embodiments of the present disclosure.

According to an embodiment, as illustrated in FIG. 11, when the user shares particular content groups 610 and 1220 on an SNS, a tag such as "shared" or information related to the tag may be used for a recommendation function of allowing the user to remember the past memory one year later.

According to an embodiment, the electronic device 100 may recommend tag information to allow the user to view the content group shared one year ago in a popup form by using a service popup 1210 for content recommendation. Then, when the user selects the corresponding popup 1210, the electronic device may display the content group 1220 shared one year ago on the display unit 131.

According to another embodiment, as illustrated in FIG. 12, when the user leaves a comment in content groups 610 and 1340 related to a particular place, a tag such as "comment" or information related to the tag may be used for a recommendation function of allowing the user to remember the past memory when the user comes back to the corresponding place.

According to an embodiment, the electronic device 100 may recommend tag information to allow the user to view the content group related to the place where the electronic device 100 is currently located by using a service popup 1330 for content recommendation. Then, when the user selects the corresponding popup 1330, the electronic device 100 may display the content group 1340 related to the corresponding place on the display unit 131.

According to various embodiments, when the electronic device 100 provides service popups (for example, the popups 1210 and 1230) for content recommendation, the electronic device 100 may further provide at least one of auditory feedback (for example, an audio output through the speaker 141) and tactile feedback (for example, a vibration output through a vibration module (not shown) in addition to or instead of visual feedback displayed through the display unit 131.

Figure 13:
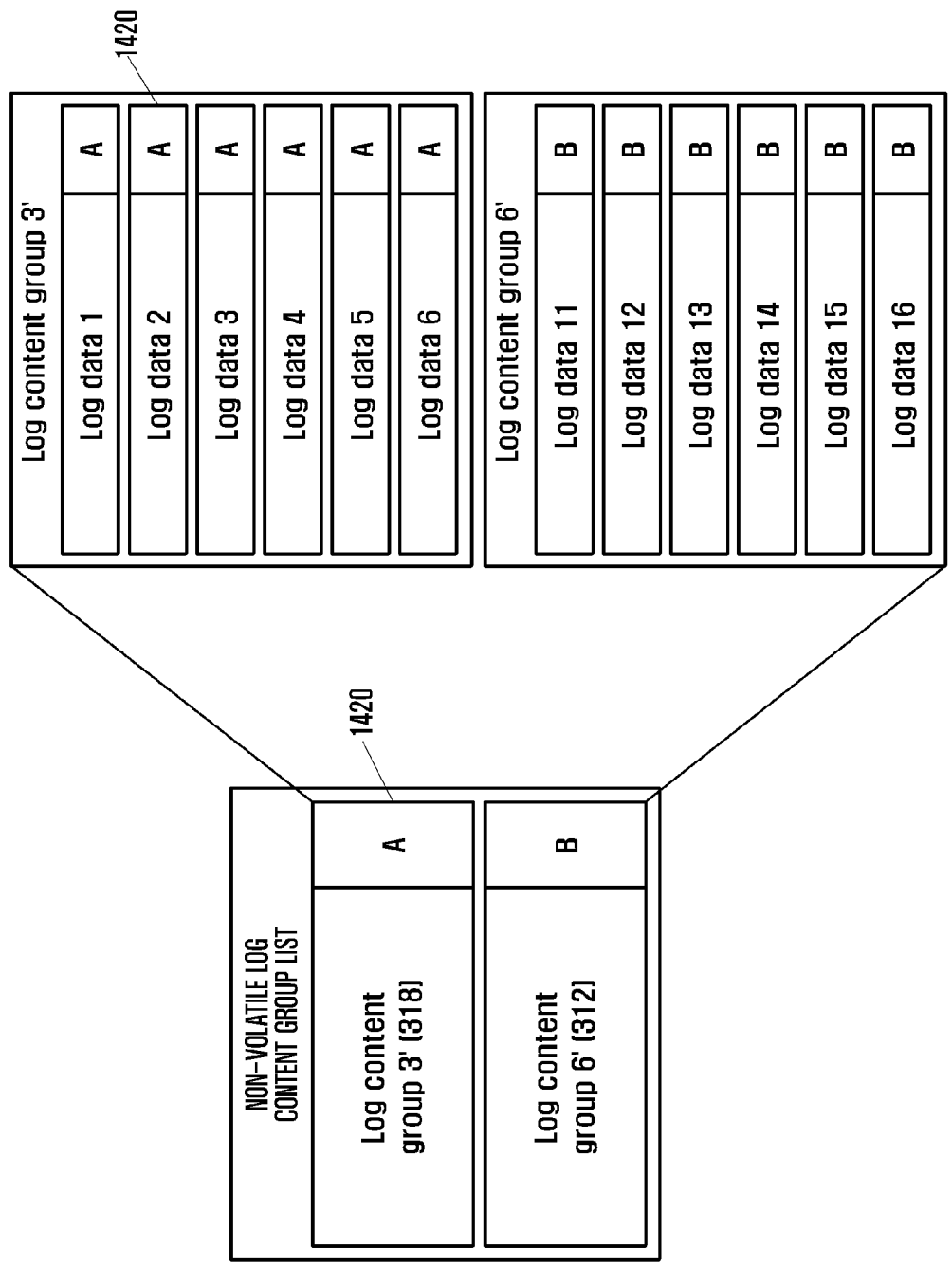
FIG. 13 illustrates an example of a secondary use of a tag by an electronic device according to various embodiments of the present disclosure.

FIG. 13 illustrates an example of a secondary use of a tag by the electronic device 100 according to various embodiments of the present disclosure.

According to an embodiment, the electronic device 100 may assign a tag of the corresponding group to data or contents included in the content group receiving the tag and provide a different level function or service by using the corresponding tag.

For example, a content group (for example, "Log content group 3" 318) receiving a tag may include a plurality of pieces of data or contents (for example, Log data 1 to Log data 6), and may assign a tag such as A1420 to each of the corresponding pieces of data or contents (for example, Log data 1 to Log data 6).

According to an embodiment, when the user shares a content group (for example, a today summary) including photo contents photographed in an airport through a particular application (for example, a life logging program), the corresponding content group may receive a tag including "shared information", and the photo contents (log data), which are photographed in the airport, included in the corresponding group may also receive the corresponding tag. Thereafter, when the user displays the corresponding photo contents in a photo album of the electronic device 100, information indicating that the corresponding photo contents are contents included in the content group shared through the lift logging program may be displayed.

Figure 14:
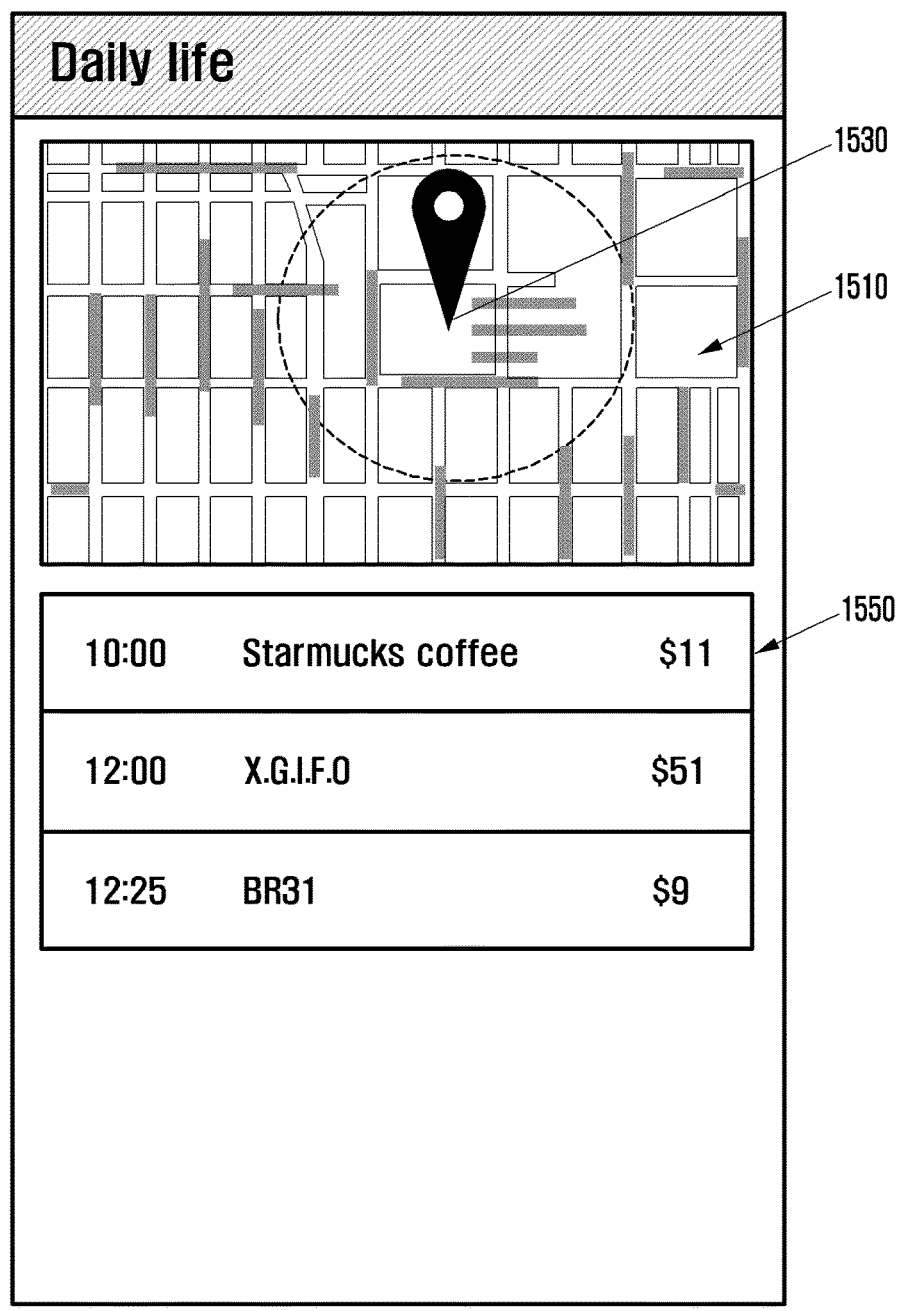
FIG. 14 and FIG. 15 illustrate examples of an operation in an electronic device according to various embodiments of the present disclosure.
Figure 15:
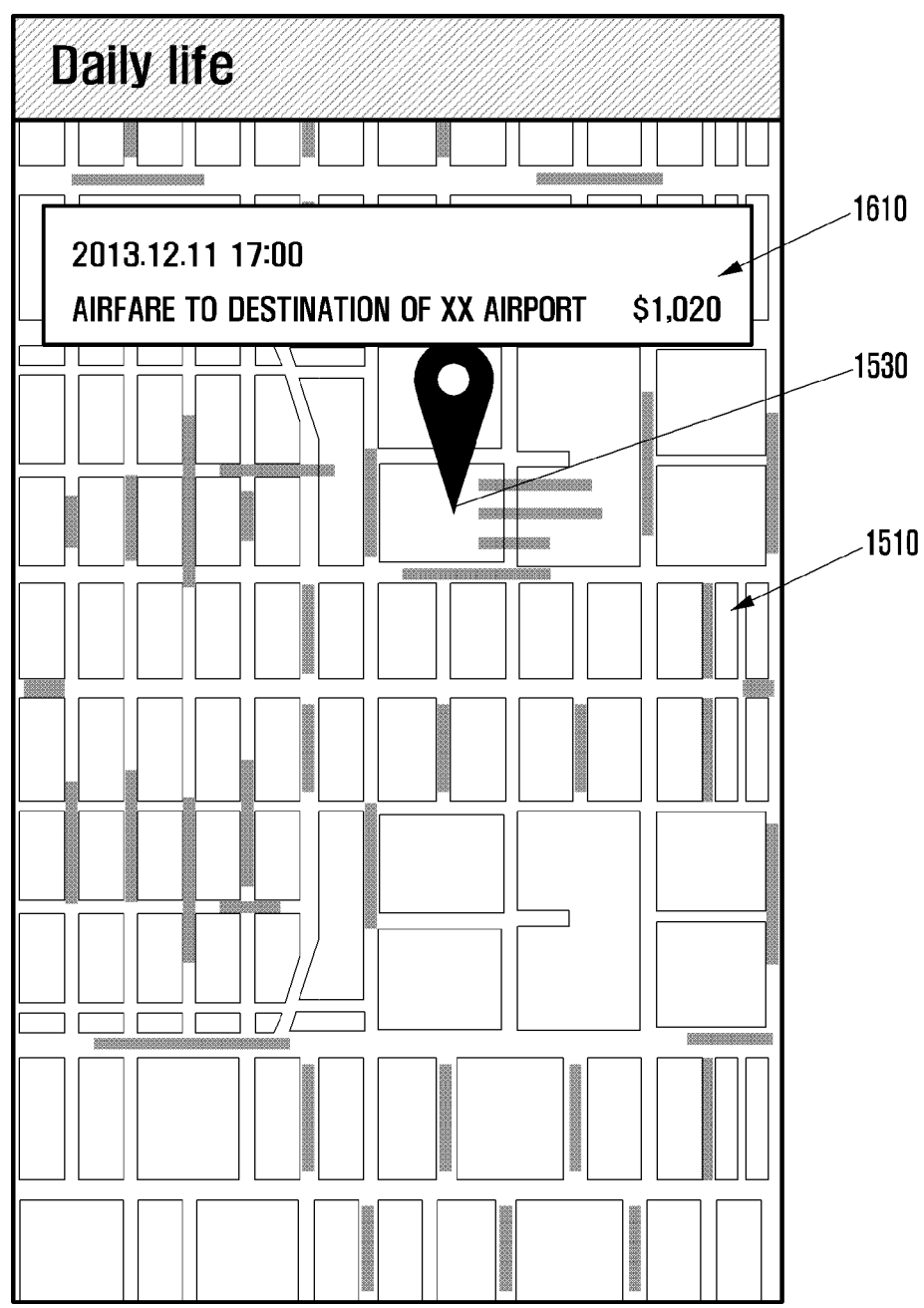

FIGS. 14 and 15 illustrate examples of operations in the electronic device 100 according to various embodiments of the present disclosure.

According to an embodiment, the electronic device 100 may collect and store log data related to the use of the electronic device 100 by the user. For example, the electronic device 100 may collect log data on financial transaction conducted online by the user and store contents related to the log data. Thereafter, the electronic device 100 may display a map 1510 on the screen in response to a request for executing a map function from the user. When the electronic device 100 executes the map function, based on an area 1510 displaying a map or a particular area 1530 focused over the map 1510, the electronic device 100 may extract position information or time information related to the corresponding area.

According to an embodiment, the electronic device 100 may display contents 1550 related to the corresponding position information or time information in a list form in a separate area other than the area displaying the map 1510 as illustrated in the example of FIG. 14. Information including the lists may have a priority based on a proximity relationship between position information on each content and position information of the area 1510 displaying the map or the focused particular area 1530, and display orders of the lists may be determined according to the priority. Alternatively, the information including the lists may have a priority based on time information on each content, and display orders of the lists may be determined according to the priority.

According to an embodiment, as illustrated in the example of FIG. 15, contents (for example, "contents 1610 related to log data related to a position where financial transaction is conducted online") related to log data related to the position information or the time information of the area 1510 displaying the map or the particular area 1530 focused over the map 1510 may be displayed in an area related to the position information of the corresponding contents within (above) the area displaying the map 1510. Additionally or alternatively, even though the position where the financial transaction is conducted is not included in the map 1510, financial transaction information related to a particular area or building included in the corresponding map 1510 may be displayed in the map or recommended. For example, total costs of financial transactions used for traveling in a particular area, such as financial transactions for airfare having a destination of a particular airport and financial transactions for hotel reservations may be calculated, displayed, or recommended based on log data.

Figure 16:
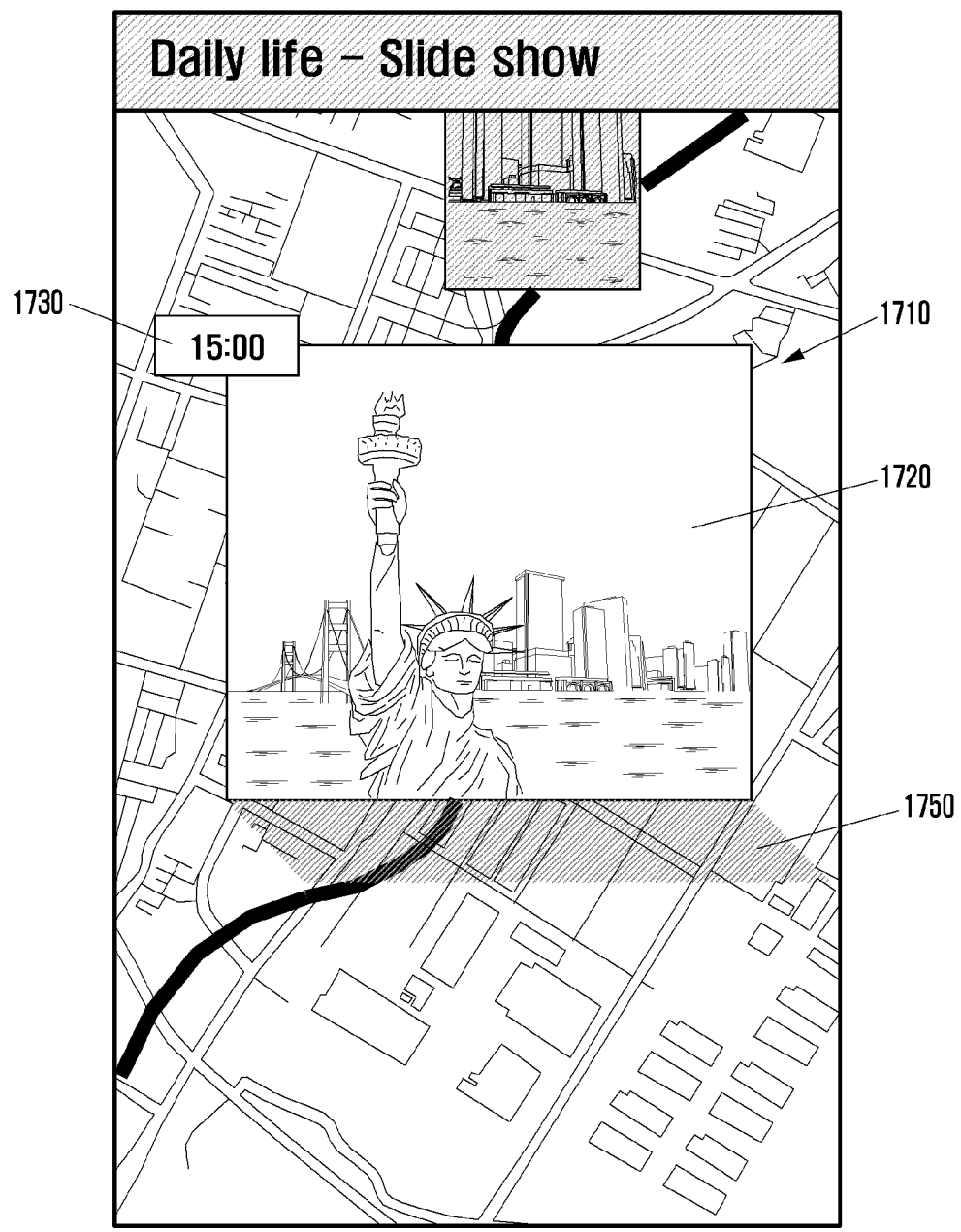
FIG. 16 and FIG. 17 illustrate examples of an operation in an electronic device according to various embodiments of the present disclosure.
Figure 17:
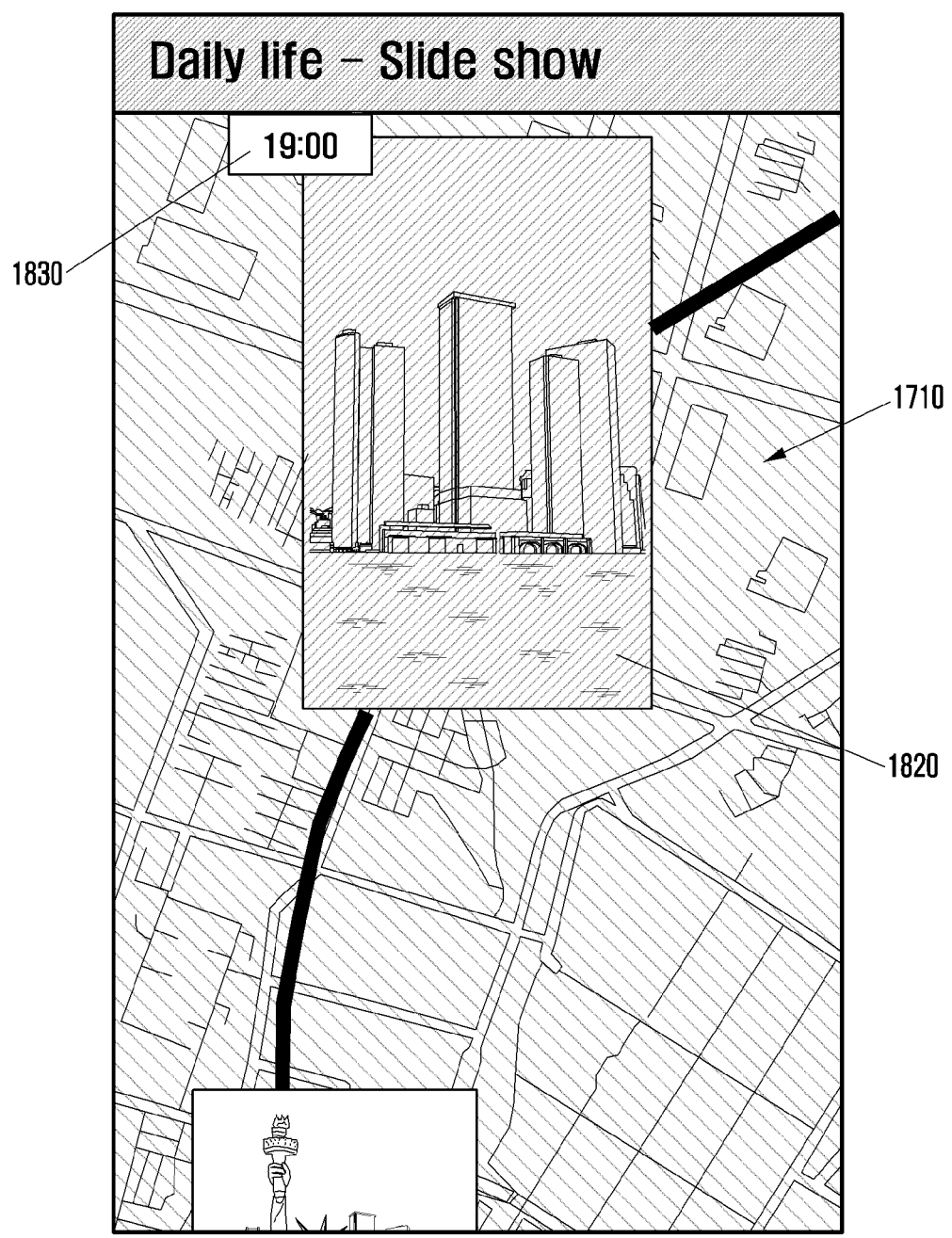

FIGS. 16 and 17 illustrate examples of operations in the electronic device 100 according to various embodiments of the present disclosure.

According to an embodiment, the electronic device 100 may collect a plurality of pieces of log data related to the use of the electronic device 100 by the user and collect context information corresponding to the time when contents related to the pieces of log data are generated. According to an embodiment, the electronic device 100 may chronologically arrange and group the contents according to the time when each of the contents related to the plurality of pieces of log data is generated, and group the contents within the corresponding group based on a position in which the log data or each of the contents is generated. Thereafter, the electronic device 100 may display the corresponding contents in an area of the map related to the position information of the contents, and may generate a slide show displaying the contents with the map contents in the background sequentially or based on a user input. In the slide show, a visual element of the map contents (background) may be changed and displayed based on context information corresponding to the time when the log data or contents are generated.

In various embodiments, the context information may include at least one of time, season, weather, and user's emotions, and the visual element may include at least one of brightness, color, weather, season, position of the sun, day and night, and position and direction of shadow related to the contents.

According to an embodiment, the electronic device 100 may collect a plurality of pieces of log data photographed for a particular period (for example, a day) by the user and store photo contents 1720 and 1820 related to the log data. The photo contents 1720 and 1820 may include position information and time information (for example, 15:00 1730 and 19:00 1830). The electronic device 100 may collect and store a movement route of the user for the particular period, and position information and time information corresponding to the generation of the photo contents. The electronic device 100 may collect context information based on the time information or the position information when the photo contents 1720 and 1820 are generated. Thereafter, when the electronic device 100 displays the photo contents 1720 and 1820 related to the corresponding position information and time information, the electronic device 100 may differently display the visual element of the map contents (background) in accordance with the current photo contents 1720 and 1820 as illustrated in the examples of FIGS. 16 and 17.

For example, the electronic device may display map contents 1710 on the screen in response to a request for executing a map function from the user. When displaying the map contents 1710, the electronic device 100 may display the screen according to an order based on position information or time information.

When displaying particular photo contents (for example, photo contents 1720 photographed at 15:00 in a first area) in the map content 1710, the electronic device 100 may change a visual element (for example, at least one of brightness, color, weather, season, position of the sun, day and night, and position and direction of shadow related to the photo contents 1720) related to the map contents (background) 1710 according to context information (for example, at least one of time, season, weather, and user's emotions) of the photo contents 1720 and display the changed visual element. FIG. 16 illustrates an example in a case where the photo contents 1720 are photographed in the day time (for example, 15:00) in the corresponding area. When displaying the photo contents 1720 on the map content 1710 as main contents, the electronic device 100 may brightly display an image to express the day as the background of the map contents 1710 and also display a position and a direction of a shadow object 1750 related to the photo contents 1720 in the position information indicating a position where the photo contents 1720 are photographed in accordance with corresponding time information.

Further, when displaying particular photo contents (for example, photo contents 1820 photographed at 19:00 in a second area) in the map contents (background), the electronic device may change a visual element of the map contents (background) according to context information of the photo contents 1820 and display the changed visual element. FIG. 17 illustrates an example of a case where the photo contents 1820 are photographed at night (for example, 19:00) in the corresponding area. When displaying the photo contents 1820 on the map contents (background) as main contents, the electronic device 100 may perform switching in accordance with a geographical position change of the map contents (background) and change the image to be dark so as to allow the user to recognize the night time of the map contents (background). Since the photo contents 1820 are photographed at night, the shadow object related to the photo contents 1820 may not be displayed.

As described above, according to an embodiment of the present disclosure, the electronic device 100 may display corresponding photo contents in an area of the map contents 1710 related to position information or time information of each of the photo contents 1720 and 1820 related to a plurality of pieces of log data, and differently change a visual element of the map contents 1710 based on context information corresponding to the time when the corresponding photo contents are generated and display the changed visual element.

According to various embodiments, additionally or alternatively, the electronic device 100 may display a background screen or an avatar together with or independently from the contents 1720 and 1820 related to the log data.

For example, the electronic device 100 may collect log data and may collect context information based on time information (timestamp) or position information of the collected log data. The electronic device 100 may display the contents related to the log data according to a screen order based on the time information or the position information. When particular contents are located at particular coordinates on the screen, the electronic device 100 may change and display state information of an avatar based on the log data related to the corresponding contents, and may switch a visual effect of the background screen based on the state information related to the log data. The state information may include at least one of time, season, weather, and user's emotions, and the visual effect of the background may include at least one of season, weather, position of the sun, day and night, and direction and position of shadow related to the contents.

According to an embodiment, the electronic device 100 may store state information existing within a particular period (for example, a day) based on time information and position information, and may store pieces of log data existing within the particular period based on time information or position information. Further, the electronic device 100 may generate background screen information based on context information corresponding to the time information or the position information related to the log data, and may generate state information of the avatar based on the log data corresponding to the time information or the position information. In addition, the electronic device 100 may combine the generated background information, avatar state information, or the contents related to the log data to generate and store image information (video or slide show).

Thereafter, the electronic device 100 may display the image information in response to a user input. When displaying the image information, the electronic device 100 may display the background information based on the context information, the avatar state information based on the log data, or the contents related to the log data in accordance with the time information or the position information. For example, the contents related to the log data, the avatar state information based on the log data, and the background information based on the context information for a specific period (a day) corresponding to particular time information or position information may be displayed together. Photo contents related to the log data corresponding to the photography in a particular time or position may be displayed on the screen, and an avatar showing an action (state information) of photographing a photo related to the log data corresponding to the photography may be displayed. Additionally or alternatively, a background screen having a visual effect of context information (for example, raining weather) may be displayed based on the context information (for example, raining weather) related to the log data corresponding to the photography.

Figure 18:
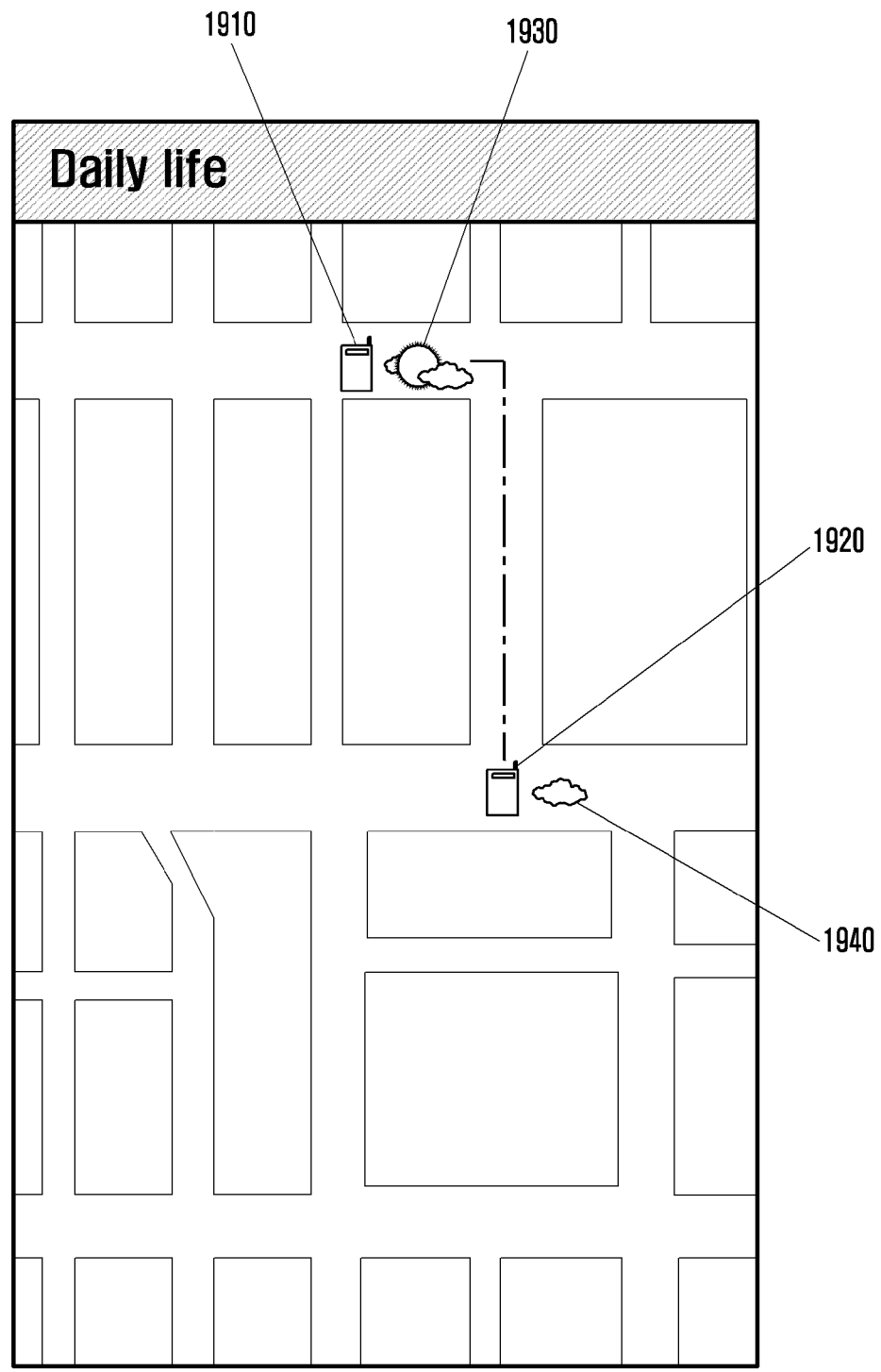
FIG. 18 and FIG. 19 illustrate examples of an operation in an electronic device according to various embodiments of the present disclosure.
Figure 19:
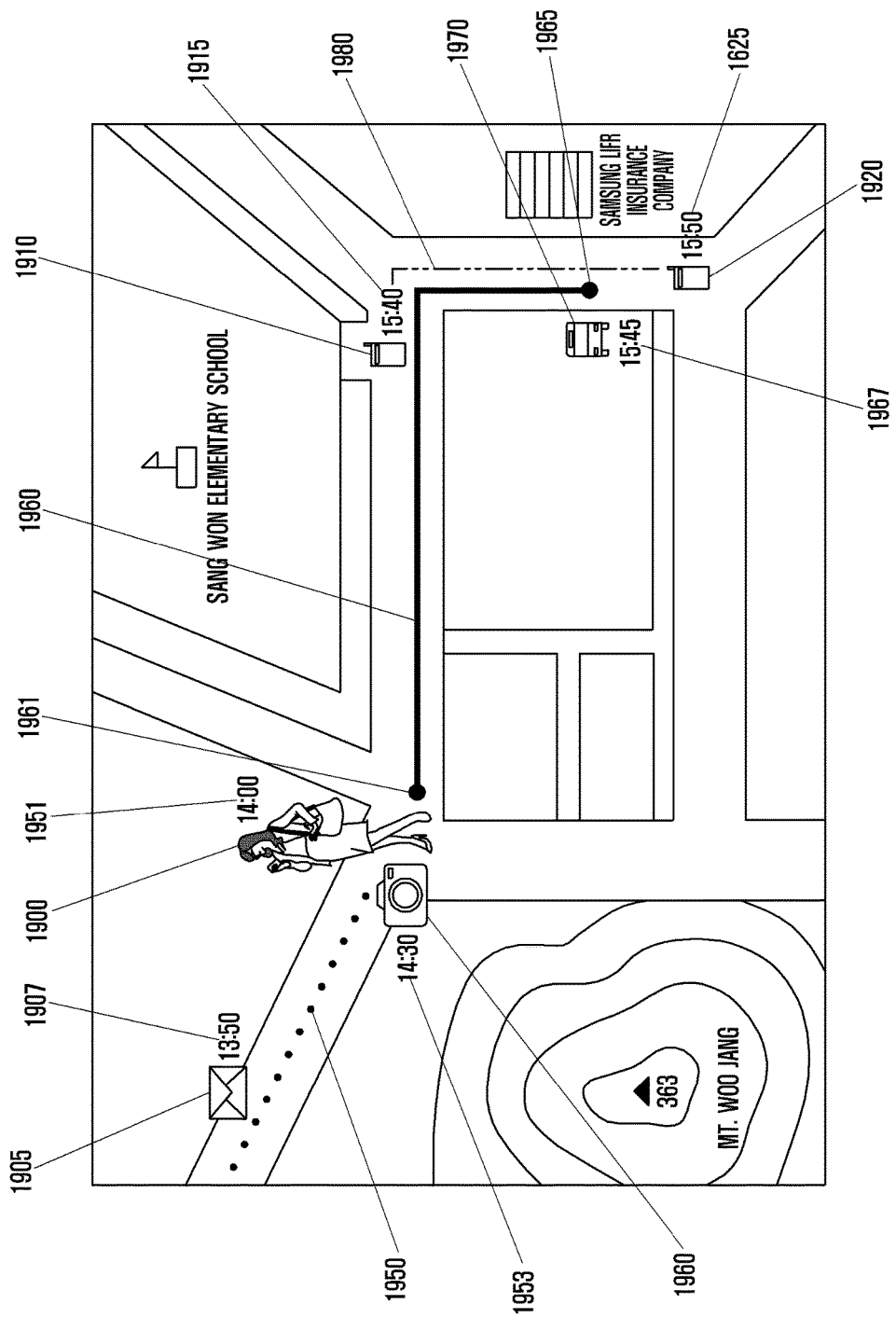

FIGS. 18 and 19 illustrate other examples of operations in the electronic device 100 according to various embodiments of the present disclosure.

According to the present disclosure, the electronic device 100 may collect log data generated while the user moves, and store contents related to the log data. The electronic device 100 may extract the log data or position information and time information of the contents related to the log data, and display a visual element related to the corresponding log data or contents on a map based on the extracted position information and time information.

According to the present disclosure, when time information of log data or time information of a log data group sharing a particular attribute has information indicating a period, the electronic device may display a visual element related to the period of the corresponding log data on the map. For example, the electronic device 100 may collect various pieces of log data according to a message function, a call function, a camera function, and a GPS function such as start and end of a call, start and end of video photography, duration of particular weather, period of play of particular media contents, reception and reply of messages, and departure time and arrival time according to movement of the log data or contents having the period information, and may make a control to display a visual element related to the log data or contents on the map. That is, according to various embodiments of the present disclosure, the electronic device 100 may display various visual elements together with or independently from a plurality of pieces of log data or contents according to the use of the electronic device 100.

According to an embodiment, as illustrated in FIG. 18, the user may configure positions related to a starting point, pause, and a destination by using the electronic device 100. Thereafter, the electronic device 100 may receive user position information and determine a departure time and arrival time based on the position information and the configured positions related to the starting point, pauses, and destination.

The electronic device 100 may determine a start time and end time in which log data is collected based on the departure time and the arrival time. The electronic device 100 may collect log data generated within the start time and end time and display contents related to the log data based on the corresponding log data and position information and time information related to the corresponding log data. The log data may include at least one of route information, call termination/origination information, message termination/origination information, photography information, media play information, voice recording information, memo writing information, content upload (sharing) information, content download information, payment information, and user health information collected within the departure time and the arrival time.

For example, the user of the electronic device 100 may configure a departure point 191 (for example, a first place), a destination 1920 (for example, a second place) when the user travels, and the electronic device 100 may collect and store log data 1930 and 1940 from the moment when the user leaves the departure point 1910 (for example, the first place). Thereafter, when the user arrives at the destination 1920 (for example, the second place), the electronic device 100 may correlatively display the contents 1930 and 1940 related to log data collected from the start time of the departure point (for example, the first place) to the arrival time of the destination (for example, the second place) with the map. Alternatively, when the electronic device 100 (always) collects the log data before the start time and the user leaves the departure point 1910 (for example, the first place) the electronic device 100 and arrives at the destination 1920 (for example, the second place), the electronic device 100 may display the contents 1930 and 1940 related to log data from a start time determined based on a predetermined departure point to an arrival time determined based on a predetermined destination on the map.

An example of the operation of the electronic device 100 in connection with FIG. 18 will be described in more detail with reference to FIG. 19.

According to various embodiments, as illustrated in FIG. 19, the electronic device 100 may display a map in response to execution of a map function by the user. The electronic device 100 may activate a GPS and various other sensors (for example, an acceleration sensor, a direction sensor, a vibration sensor, and a temperature sensor) in response to the map function execution to collect position information on a geographical position of the electronic device 100, use information of the electronic device 100 or context information on an external environment and display related information on the map. Additionally or alternatively, the electronic device 100 may display an avatar 1900 corresponding to the user of the electronic device 100 on the map, and the avatar 1900 may be changed to various images according to user's setting.

When the electronic device 100 transmits/receives a message while moving, the electronic device 100 may make a control to display a message icon 1902 corresponding to the message transmission or reception in a corresponding position of the map. The electronic device 100 may make a control to display time information 1907 (for example, 13:50) related to the message transmission or reception together with or independently from the message icon 1905. That is, the electronic device 100 may display a visual element (for example, the message icon 1905 or the time information 1907) corresponding to log data (for example, message transmission or reception) in a corresponding position of the map.

When the user moves by a predetermined distance and performs photography in a particular position through a camera function, the electronic device 100 may make a control to display a camera icon 1960 in a corresponding position on the map. For example, when the user of the electronic device 100 executes the camera function in a particular position (for example, the Woo Jang park) and performs the photography, the electronic device 100 may make a control to display the camera icon 1960 in a corresponding position of the map. The electronic device 100 may make a control to display time information 1953 (for example, 14:30) related to the photography (for example, generation of photo contents based on the photography by the user) together with or independently from the camera icon 1960. That is, the electronic device 100 may display a visual element (for example, the camera icon 1960 or the time information 1953) corresponding to log data (for example, photography or generation of photo contents) in a corresponding position of the map.

Additionally or alternatively, when the user moves by using particular transportation (for example, by foot, bus, subway, or bicycle), the electronic device 100 may display a visual element related to the movement based on each mode of transportation on the map.

For example, when the user moves from an initial movement start point (not shown) to the particular position (for example, the Woo Jang park) by walking, the electronic device 100 may display an image (for example, a dotted line 1950) corresponding to walking movement on the map along the movement route. The electronic device 100 may display time information (for example, a start time) in a movement start point (not shown) and time information 1951 (for example, arrival time 14:00) in a movement destination (for example, the particular position) in corresponding positions of the map.

When the user moves by a predetermined distance by using some mode of transportation (for example, a bus) in the particular position (for example, the WOO JANG part), the electronic device 100 may collect log data of the electronic device or contents related to the log data through various sensors. The electronic device 100 may determine transportation used by the user based on at least one piece of state information acquired from various sensors (for example, an acceleration sensor, a direction sensor, and a vibration sensor) or GPS. For example, when it is determined that a movement speed is slower than a predetermined speed and the electronic device 100 vibrates, the electronic device 100 may determine that the user moves by walking. Further, when it is identified that the movement speed is faster than or equal to a predetermined speed and the electronic device 100 does not vibrate, the electronic device 100 may determine that the user moves by some mode of transportation such as a bus or subway. The number of detected vibrations of the vibration sensor may be somewhat detected in a case of a bus or subway. Accordingly, the electronic device 100 may distinguish between walk and transportation according to whether the number of vibrations continuously generated is larger than or equal to a predetermined number. Further, the electronic device 100 may distinguish between walk and transportation based on the degree of change in position information of the electronic device 100 acquired from the GPS.

As described above, the electronic device 100 may display visual elements corresponding to a route, a distance, and transportation used by the user on the map. For example, when the user moves from the particular position (for example, the Woo Jang park) to a another position (for example, the Samsung life insurance company) by bus, the electronic device 100 may display an image (for example, a solid line 1960) corresponding to movement of the bus on the map along a movement route (for example, from the "Woo Jang park" to the "Samsung life insurance company" via "Sang Won elementary school". The electronic device 100 may display time information 1963 (for example, start time 15:00) at a movement start point (for example, the Woo Jang park) and time information 1967 (for example, arrival time 15:45) at a movement destination (for example, the Samsung life insurance company) in corresponding positions of the map. Further, the electronic device 100 may display an icon (for example, a bus icon 1967) corresponding to mode of transportation (for example, a bus) at least one of the start point of the solid line 1960 and the end point of the solid line 1960.

Additionally or alternatively, when the user uses a call function in a particular position (for example, the Sang Won elementary school) while moving by bus, the electronic device 100 may make a control to display a first call icon 1910 corresponding to the beginning of the call function on a corresponding position of the map. Further, when the user completes the call function in a particular position (for example, a position passing by the Samsung life insurance company), the electronic device 100 may display a second call icon 1920 corresponding to the completion of the call function in a corresponding position of the map. In addition, the electronic device 100 may make a control to display a route from a start point of the call function to an end point of the call function by using a particular image (for example, a perforated line 1980) located in an interval between the first call icon 1910 and the second call icon 1920. Furthermore, the electronic device 100 may make a control to display the time information 1915 (for example, 15:40) related to the beginning of the call function together with or independently from the first call icon 1910 and also make a control to display the time information 1925 (for example, 15:50) related to the end of the call function together with or independently from the second call icon 1920. The electronic device 100 may use different images for the first call icon 1910 and the second call icon 1920 in order to allow the user to recognize the beginning of the call and the end of the call.

Further, according to various embodiments of the present disclosure, the electronic device 100 may sense ambient context of the electronic device 100 by using various sensors and make a control to display a related visual element. For example, the electronic device 100 may sense ambient temperature through a temperature sensor to make a control to display a related icon or text, and sense ambient humidity through a humidity sensor to make a control to display a related icon or text.

Further, although the example of FIG. 19 describes the map as being fixed, the map may be changed and displayed based a position where an avatar 1900 of the user is displayed. For example, in response to movement of the user, the map may be changed and displayed in real time such that the avatar 1900 is located in the middle of the screen.

According to various embodiments of the present disclosure as described in the examples of FIGS. 18 and 19, when providing log data including period information or contents, the electronic device 100 may extract position information and time information of the log data or contents related to the log data, and make a control to display a visual element related to the corresponding log data or contents on the map based on the extracted position information and time information. Accordingly, by making a control to display the functions of the electronic device 100 on the map based on the time information or the position information, it is possible to monitor where and when the user of the electronic device 100 uses which function of the electronic device 100.

Figure 20:
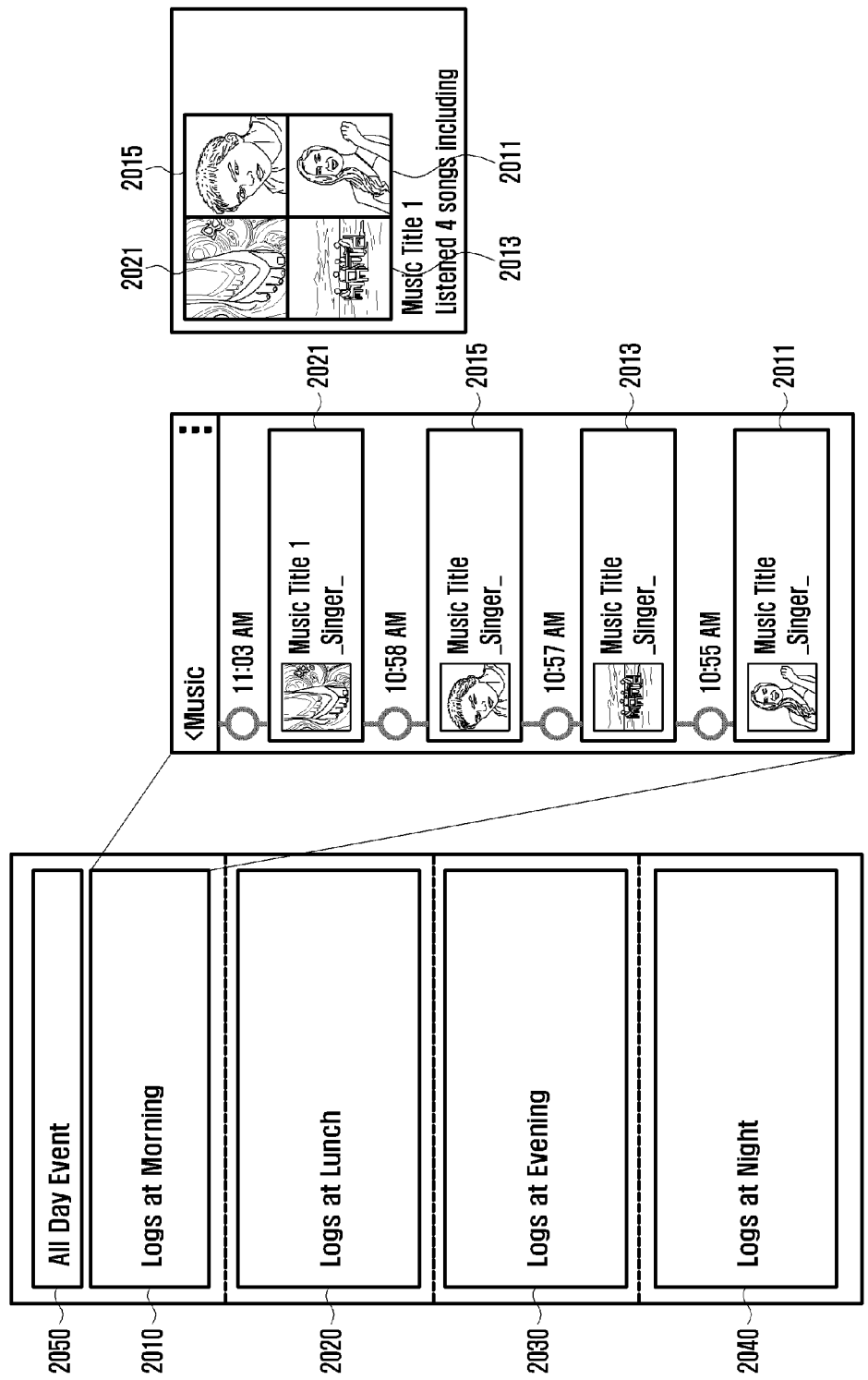
FIG. 20 illustrates an operation in which an electronic device provides log data according to various embodiments of the present disclosure.

FIG. 20 illustrates an example in which the electronic device 100 displays log data or contents related to the log data according to various embodiments of the present disclosure.

According to an embodiment, the electronic device 100 may collect and store log data related to the use of the electronic device 100 by the user for a predetermined period (for example, a day). The corresponding log data may include time information and position information.

The electronic device 100 may arrange or group the log data or the contents related to the log data according to time orders of the generation of the log data or the contents. According to an embodiment, the electronic device 100 may display the corresponding log data or contents in the log data collected for the predetermined period (for example, a day) based on a particular time reference (for example, Time Zone reference time). For example, the user may configure Morning (AM05:00~AM11:00)", "Lunch (AM11: 00~PM16:00)", "Evening (PM16:00~PM21:00)", and "Night (PM21:00~AM05:00)" based on the Time Zone. The electronic device 100 may classify and group the log data collected for the predetermined period (for example, a day) or the contents related to the log data according to the Time Zone based on a particular time reference such as "Morning" 2010, "Lunch" 2020, "Evening" 2030, and "Night" 2040, and display the classified and grouped data or contents.

According to various embodiments, the electronic device 100 may display a periodic event 2050 (for example, a birthday, wedding anniversary, national holiday, and anniversary such as events corresponding to an entire day) in an uppermost end of the display area regardless of the designated Time Zone.

According to various embodiments, the electronic device 100 may include continuous log data in each group such as "Lunch" 2020, "Evening" 2030, or "Night" 2040 in the group based on an initial start time even when the particular reference time is exceeded.

For example, the user may start listening to music at the time corresponding to "Morning (AM05:00~AM11:00)" and continue listening into the time corresponding to "Lunch (AM11:00~PM16:00)". The electronic device 100 may group and display log data 2011, 2013, and 2015 having the music attribute in the group of "Morning" 2010 and log data 2021 having the music attribute in the group of "Lunch" 2020 based on the initial start time (for example, AM 10:55 of the Morning) in spite of different reference times (for example, a Time Zone).

Figure 21:
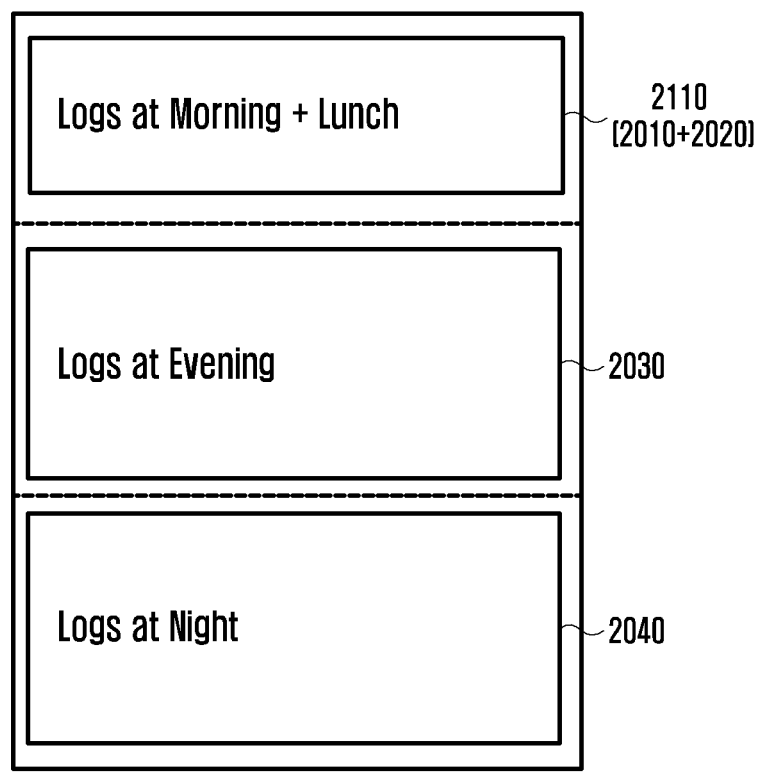
FIG. 21 illustrates another example in which an electronic device provides log data according to various embodiments of the present disclosure.

FIG. 21 illustrates an example in which the electronic device 100 displays log data or contents related to the log data according to various embodiments of the present disclosure.

According to various embodiments, the electronic device 100 may chronologically group log data or contents and display the grouped log data or contents according to a particular reference such as a Time Zone (for example, morning, lunch, evening, or night) as illustrated in the example of FIG. 20. When providing the log data or contents based on the Time Zone, the electronic device 100 may analyze the log data or contents of each Time Zone, and combine consecutive groups having corresponding log data or contents smaller than a preset number into one group and display the one combined group.

According to an embodiment, as illustrated in FIG. 21, the electronic device 100 may group consecutive "morning" 2010 and "lunch" 2020 having small log data in groups of "morning 2010, lunch 2020, evening 2030, and night 2040" into one group ("morning+lunch") 2110 and display the one group.

Figure 22:
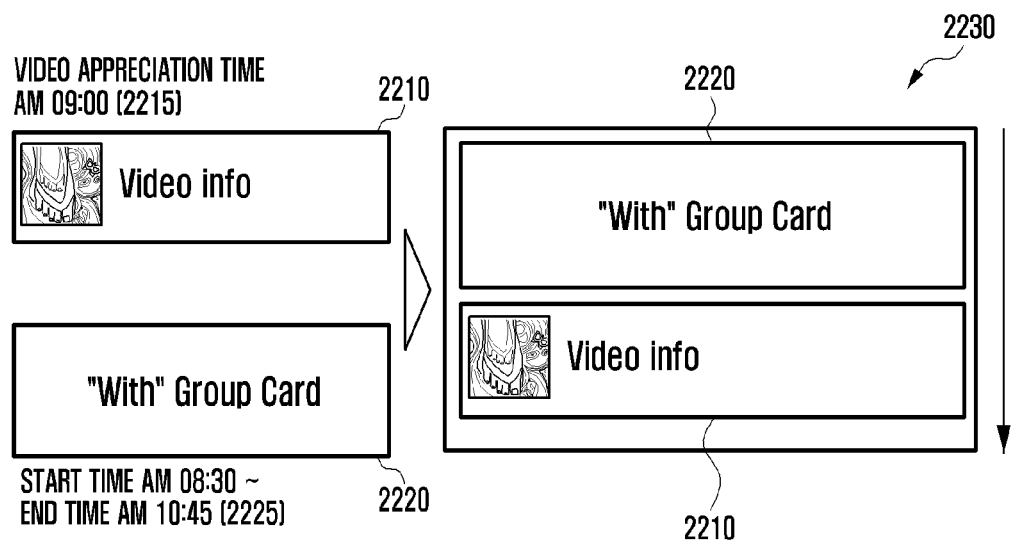
FIG. 22 illustrates still another example in which an electronic device provides log data according to various embodiments of the present disclosure.

FIG. 22 illustrates an example in which the electronic device 100 displays contents related to log data according to various embodiments of the present disclosure.

According to an embodiment, the user may determine an arrangement reference of individual contents and group contents. For example, when individual contents and group contents in which a plurality of contents are grouped coexist, a reference may be determined to arrange the individual contents and the group contents according to the time based on the time of contents having the earliest time among the plurality of contents and the time of the individual contents.

Referring to FIG. 22, when individual contents 2210 (for example, video information) and group contents 2220 (for example, a "With" group card) coexist, the electronic device 100 may arrange and display the individual contents 2210 and the group contents 2220 according to the determined arrangement reference. According to an embodiment, the electronic device 100 may determine time information (for example, start time and generation time) of a plurality of contents of the group contents 2220 and determine contents 2225 (for example, start time AM 08:30) having the earliest start time or generation time among the plurality of contents.

The electronic device may compare the start time 2225 (for example, start time AM 08:30) of the determined contents in the group contents 2220 (for example, the "With" group card) with the start time or generation time (for example, AM 09:00) of the individual contents 2210 (for example, video information) and determine contents of the earlier time (for example, individual contents or group contents). The electronic device 100 may arrange and display the individual contents 2210 and group contents 2220 according to the determination based on the corresponding time order. For example, as illustrated in reference numeral 2230 of FIG. 22, the group contents 2220 (for example, the "With" group card) may be arranged and displayed before the individual contents 2210 (for example, video information).

Figure 23:
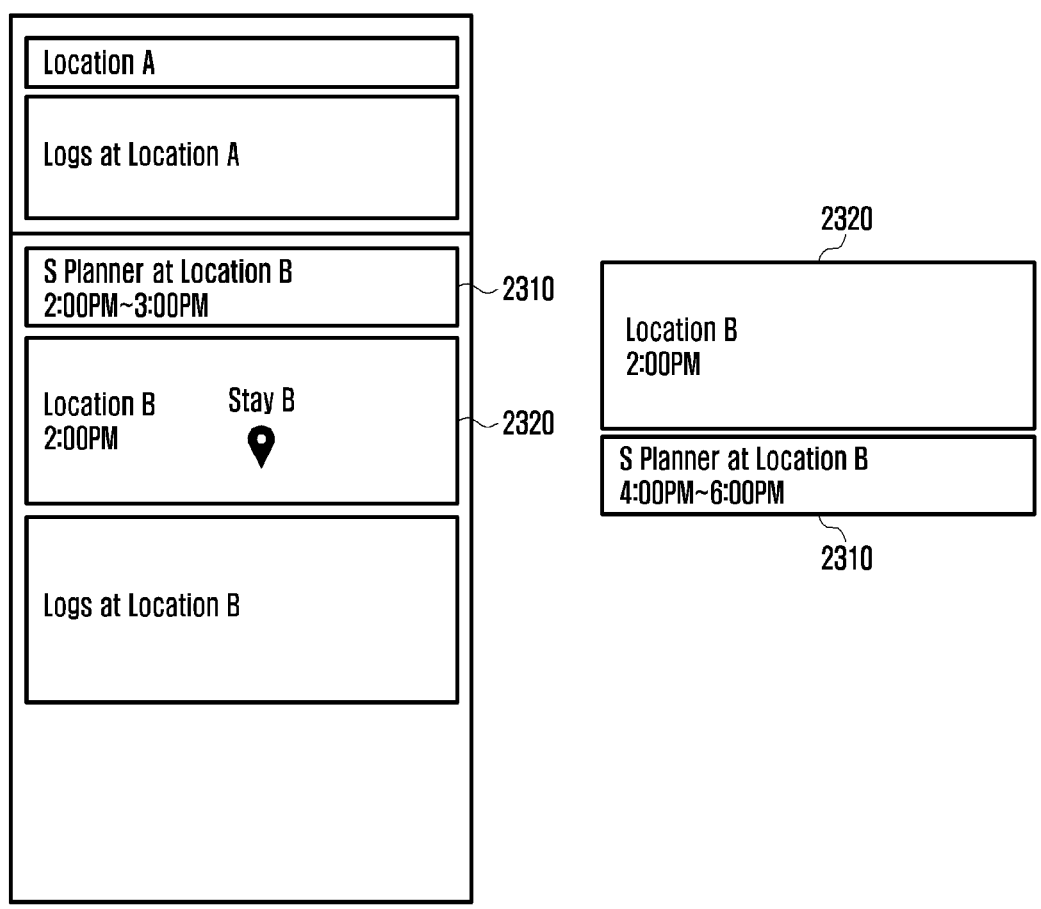
FIG. 23 illustrates yet another example in which an electronic device provides log data according to various embodiments of the present disclosure.

FIG. 23 illustrates an example in which the electronic device 100 provides contents related to log data according to various embodiments of the present disclosure.

According to an embodiment, the user may determine an arrangement reference of log contents based on position information related to the log contents. For example, as illustrated in FIG. 23, the electronic device 100 may compare position information (for example, location B) related to calendar contents 2310 with position information (for example, stay B) related to stay contents 2320. When the position information (location B) related to the calendar contents 2310 and the position information (stay B) related to the stay contents 2320 are similar to each other, the electronic device 100 may display the calendar contents 2310 before the corresponding position contents (for example, stay contents 2329) to indicate that the corresponding position contents are associated with schedule information related to the calendar contents.

According to various embodiments, even though the position information (location B) related to the calendar contents 2310 and the position information (stay B) related to the stay contents 2320 are similar to each other, when difference between time information (for example, PM 16:00~PM 18:00) related to the calendar contents 2310 and time information (for example, PM 14:00) related to the stay contents 2320 is larger than a predetermined time, an operation of displaying the stay contents 2320 before the calendar contents 2310 may not be performed.

Figure 24:
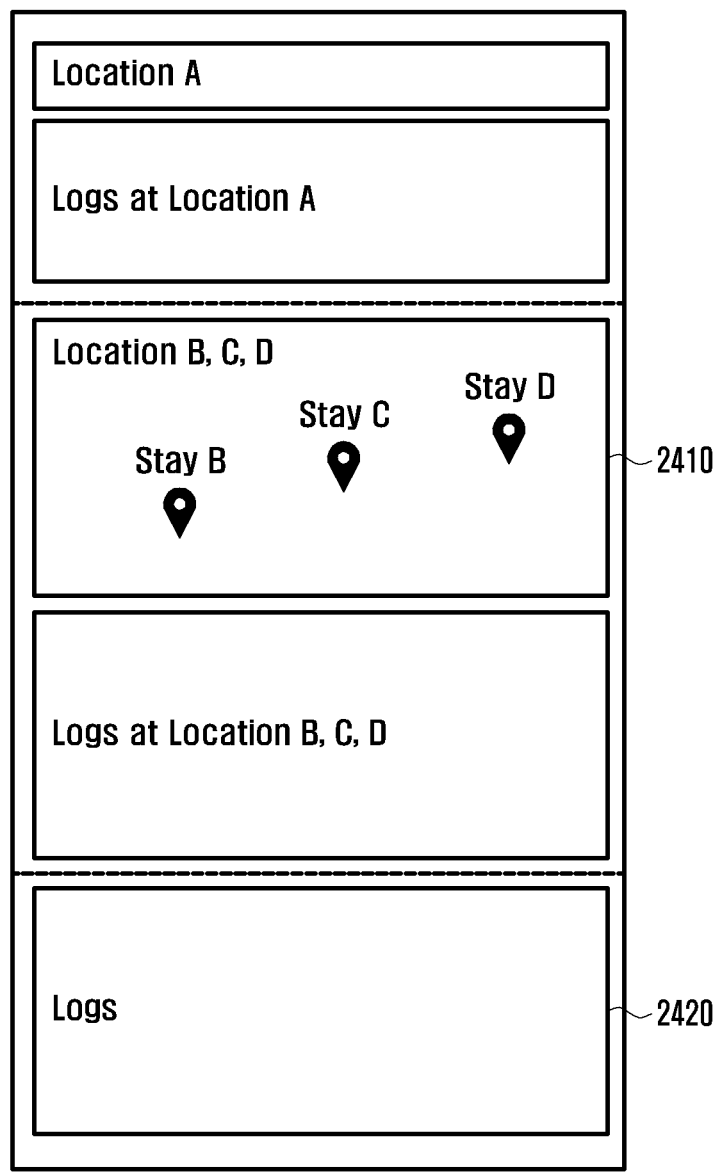
FIG. 24 illustrates still yet another example in which an electronic device provides log data according to various embodiments of the present disclosure.

FIG. 24 illustrates an example in which the electronic device 100 provides contents related to log data according to various embodiments of the present disclosure.

According to an embodiment, the electronic device 100 may determine a display reference of the contents based on position information related to each of the contents, and group and display one or more corresponding contents based on position information of the contents.

For example, as illustrated in FIG. 24, the electronic device 100 may combine stay contents having similar or equal position information to display the combined stay contents as one or more contents. According to an embodiment, when position information of position contents (for example, stay contents) including A region position information, position information of position contents including B region position information, and position information of position contents including C region position information are similar to each other, the position information may be combined and displayed as one or more position contents, and contents related to log data generated in positions A, B, and C may be chronologically displayed.

According to various embodiments, contents 2420 having no position information may be displayed based on the time when log data related to the corresponding contents is generated.

Figure 25:
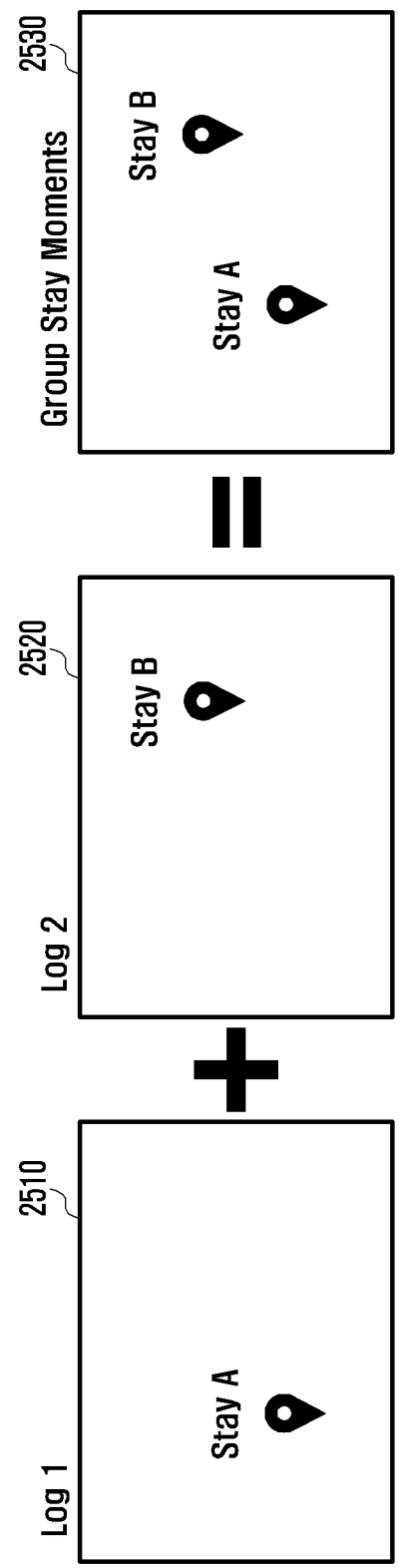
FIG. 25 and FIG. 26 illustrate further examples in which an electronic device provides log data according to various embodiments of the present disclosure.
Figure 26:
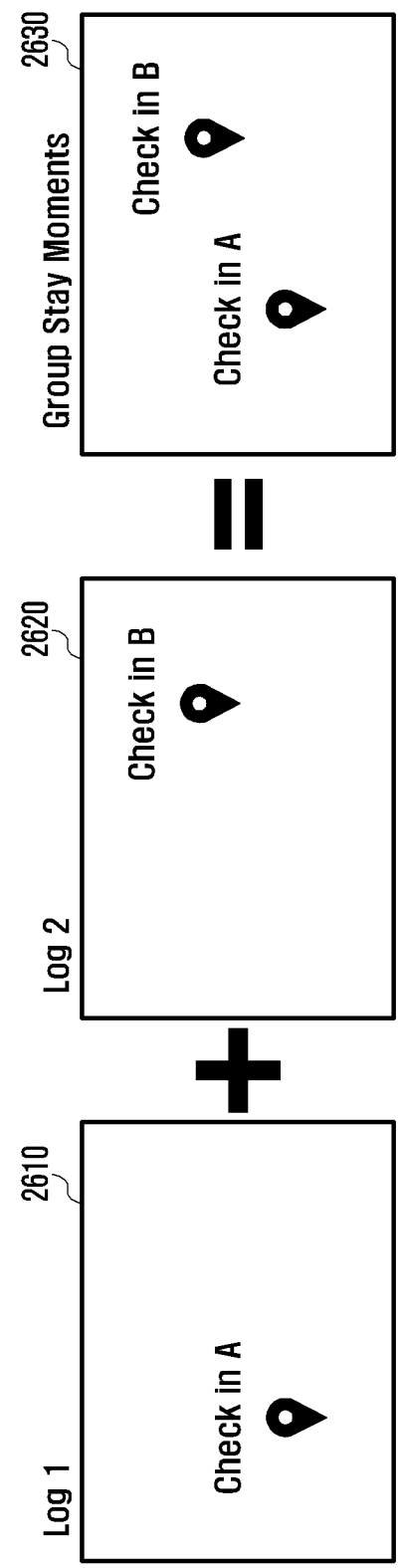

FIGS. 25 and 26 illustrate examples in which the electronic device 100 displays contents related to log data according to various embodiments of the present disclosure.

According to various embodiments of the present disclosure, the electronic device 100 may determine distance information in a predetermined range based on position information related to each content, and group and display one or more contents included in the predetermined range based on the position information of the contents. For example, the electronic device 100 may combine contents having position information related to the contents included within the predetermined range (for example, contents having departure positions or arrival positions within the predetermined range) and display the combined contents as one group. That is, the electronic device 100 may combine contents having the position information included in the predetermined range (for example, contents having similar or equal position information) and display the combined contents as one content.

According to various embodiments, as illustrated in FIG. 25, the electronic device 100 may determine contents (for example, contents having similar or equal position information) included in a predetermined range based on position information of the contents. For example, when it is determined that A region (for example, stay A) position information of first contents 2510 and B region (for example, stay B) position information of second contents 2520 are included in the predetermined range, the electronic device 200 may combine the first contents 2510 and the second contents 2520 and display the combined contents as one content 2530.

According to various embodiments, as illustrated in FIG. 26, the electronic device 100 may determine contents (for example, contents having similar or equal position information and executing the same function by the electronic device 100) related to log data collected by the same operation in a predetermined range based on position information of the contents. For example, based on check in information in region A (for example, stay A) of third contents 2610 and check in information in region B of fourth contents 2620, the electronic device 100 may determine that the third contents 2610 and the fourth contents 2620 are contents included in the predetermined range, and combine the third contents 2610 and the fourth contents 2620 and display the combined contents as one content 2630.

Figure 27:
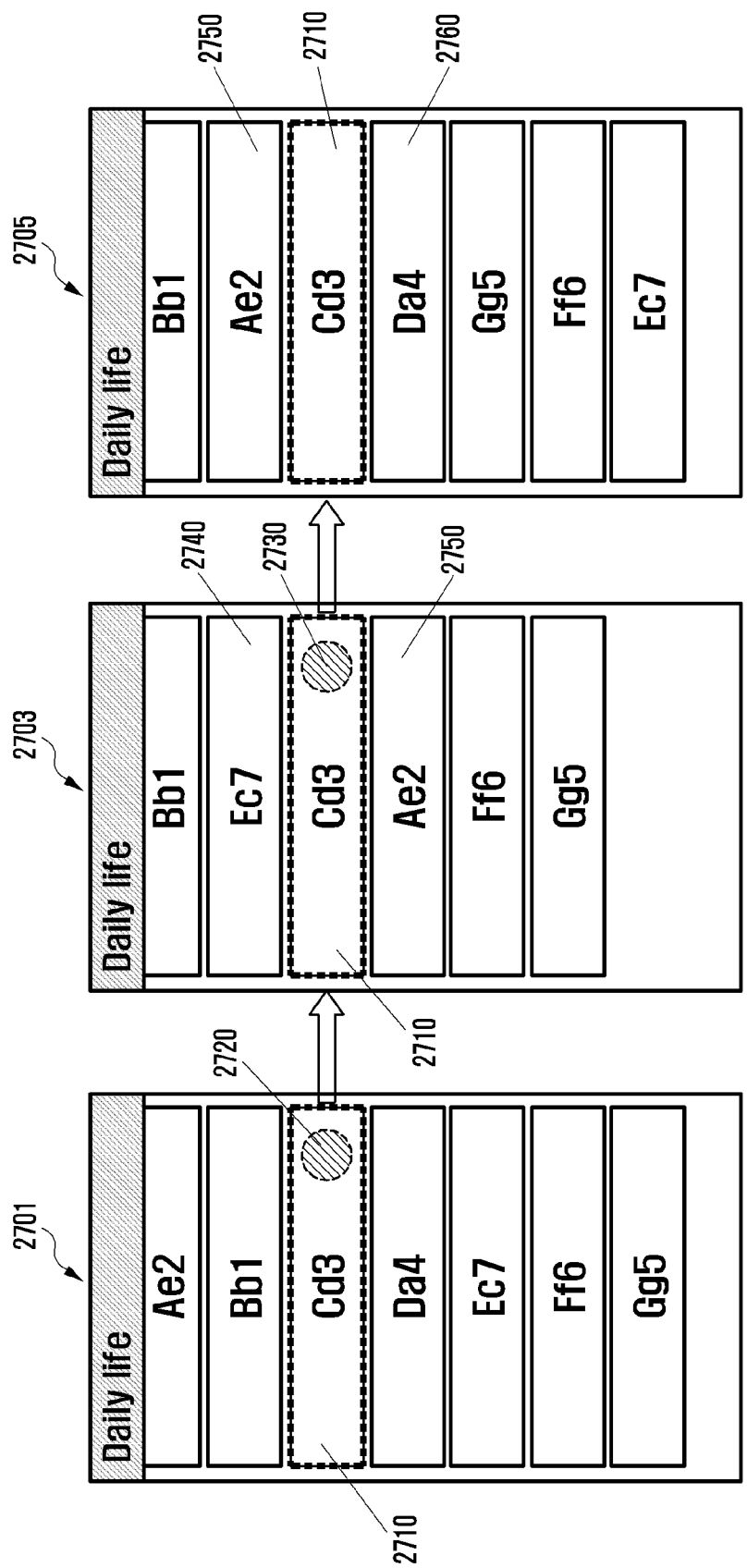
FIG. 27 illustrates an example of an operation in which an electronic device provides log data according to various embodiments of the present disclosure.

FIG. 27 illustrates an example of an operation in which the electronic device 100 displays contents related to log data according to various embodiments of the present disclosure.

According to an embodiment, the electronic device 100 may collect a plurality of pieces of log data and change positions where the plurality of pieces of collected log data are displayed according to a user input. The electronic device 100 may display contents related to the collected log data to be close to each other based on a particular condition (for example, attribute information, position information, and time information related to contents).

The electronic device 100 may display mutually associated contents of the contents to be close to each other based on a first condition as illustrated in an operation 2701 and receive a first gesture input 2720 for a display area of one or more contents 2710 (for example, Cd3) among the displayed contents.

The electronic device 100 may change display positions (orders) of the remaining contents except for the one or more contents 2710 (for example, Cd3) related to an area of the first gesture input 2720 in response to the first gesture input 2720. The display position (order) may be displayed such that the contents are close to each other based on a second condition. For example, the electronic device 100 may display the mutually associated contents to be close to each other based on the second condition (for example, collection or generation time) as illustrated in an operation 2703. According to the relationship between the contents 2710 (for example, Cd3) corresponding to the first gesture input 2720 (for example, the input of maintaining the selection for a specific time) and the remaining contents based on the second condition (for example, collection or generation positions), the electronic device 100 may rearrange and display the remaining contents to be close to the contents 2710 (for example, Cd3) corresponding to the first gesture input 2720.

The electronic device 100 may receive a second gesture input 2730 for display areas of one or more contents 2710 (for example, Cd3) among the contents displayed to be close based on the second condition.

The electronic device 100 may change display positions (orders) of the remaining contents except for the one or more contents 2710 (for example, Cd3) related to the area of the second gesture input 2730 in response to the second gesture input 2720. The display position (order) may be displayed such that the contents are close to each other based on a third condition. For example, the electronic device 100 may display the mutually associated contents to be close to each other based on the third condition (for example, attribute information) as illustrated in an operation 2705. According to the relation between the contents 2710 (for example, Cd3) corresponding to the second gesture input 2730 (for example, the input of maintaining the selection for a specific time) and the remaining contents based on the third condition (for example, the attribute information), the electronic device 100 may rearrange and display the remaining contents to be close to the contents 2710 (for example, Cd3) corresponding to the second gesture input 2730.

According to various embodiments, the contents corresponding to the user's gesture input may be fixedly displayed in the corresponding display area without any position change (for example, screen scroll) and only the positions of the remaining contents according to the relation may be rearranged and displayed. Further, the position of the contents corresponding to the user's gesture input may be changed and displayed.

According to various embodiments, the electronic device 100 may collect log data including first information and second information, and may arrange and display contents related to the log data according to the order based on the first information. When one or more of the displayed contents are selected, the electronic device 100 may change or add a visual element of adjacent contents based on the selected contents and the second information. The first information and the second information may include different information among time information (timestamp), position information, attribute information, and schedule information.

For example, when one or more of the contents arranged based on the time information (timestamp) are selected, the electronic device 100 may highlight adjacent contents based on the position information. When one or more of the contents arranged based on the position information, the electronic device 100 may highlight adjacent contents based on the time information (timestamp).

Figure 28:
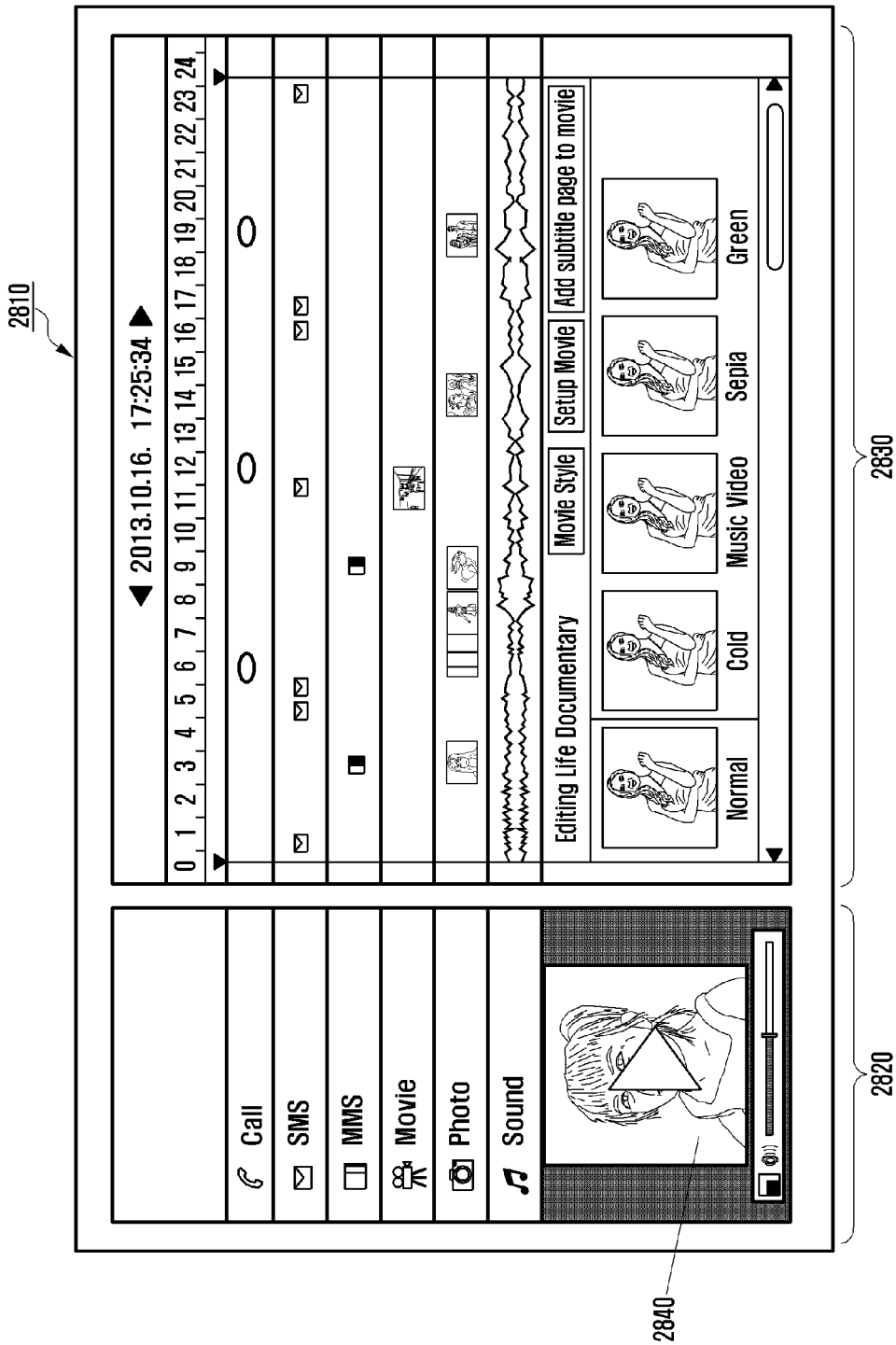
FIG. 28 illustrates an example of an operation in which an electronic edits log data according to various embodiments of the present disclosure.

FIG. 28 illustrates an example of an operation in which the electronic device 100 edits contents related to log data according to various embodiments of the present disclosure.

According to an embodiment, the electronic device 100 may analyze the contents related to a predetermined period by the user. According to an embodiment, an operation of analyzing the contents may include an operation of analyzing at least one of existence or nonexistence of particular contents, the amount of contents, and the diversity of content attributes.

The electronic device 100 may determine the suitability of production of an image related to the contents based on the analysis. For example, when receiving an intention to produce the image from the user, the electronic device 100 may determine the suitability of the production of the image related to the contents related to the predetermined period. Alternatively, the electronic device may identify a particular condition (For example, elapse of a predetermined period or a particular time) to automatically determine the suitability of the production of the image related to the contents. Further, the electronic device 100 may produce the image or determine the suitability of the production of the image according to an input corresponding to a user's intension to produce the image based on the contents related to the collected log data.

When receiving the input corresponding to the user's intention to produce the image, the electronic device 100 may configure and display an editing screen for the production of the image. According to an embodiment, the editing screen 2810 may include a first area 2820 for displaying content attributes (for example, call, SMS, MMS, movie, photo, and sound) and a second area 2830 for arranging and displaying contents related to each of the attributes in a time axis.

The electronic device 100 may display a third area 2840 for displaying a preview image for identifying in advance an expected image based on the time axis related to at least some selected from the second area 2830. According to various embodiments, the image produced based on at least some of the contents related to the log data may be executed in response to a user input, and contents within various periods such as a time unit, a day unit, a week unit, a month unit, and a year unit may be designated, provided, and edited.

Figure 29:
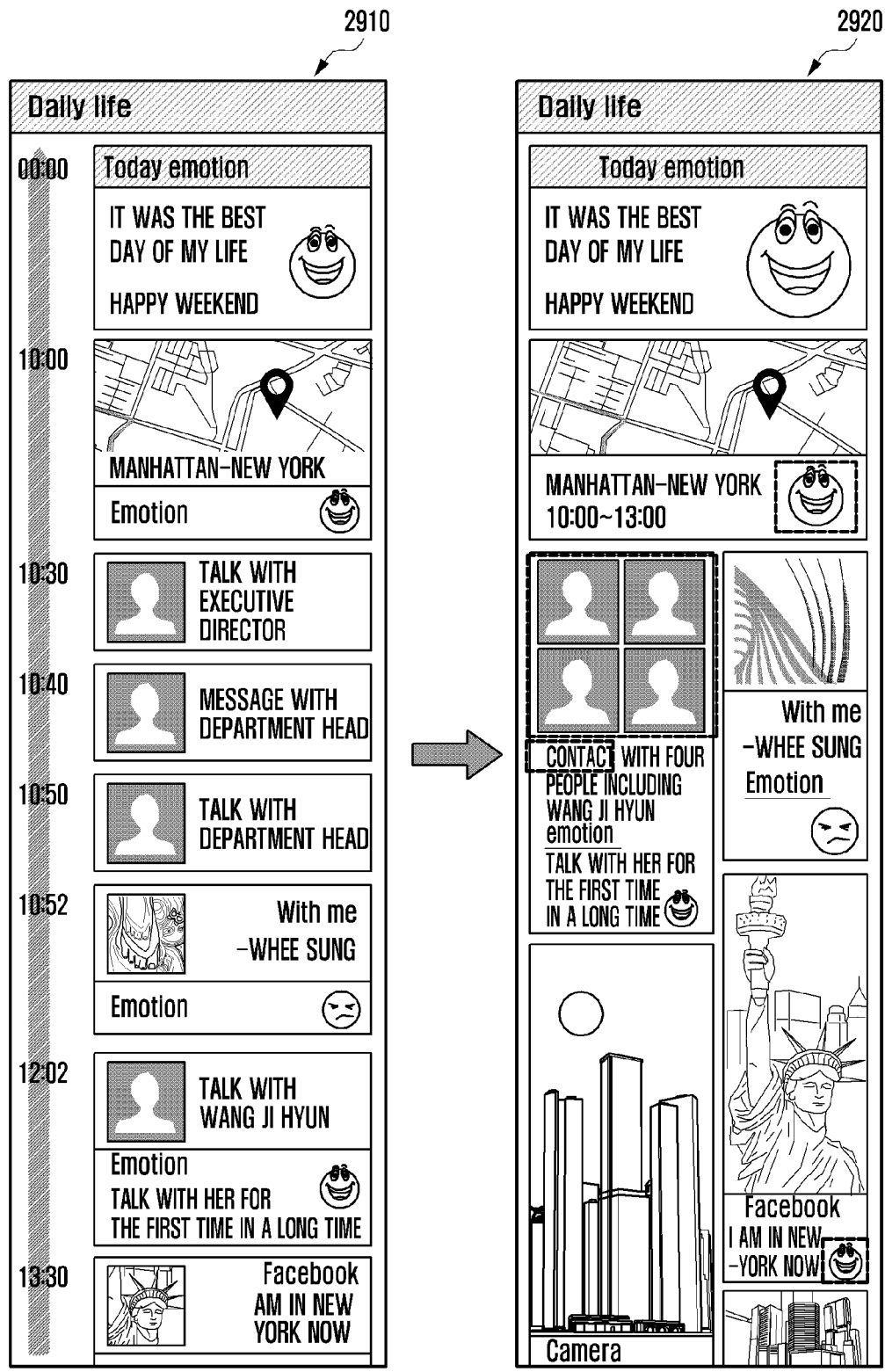
FIG. 29 illustrates an example of a log content group of an electronic device according to various embodiments of the present disclosure.

FIG. 29 illustrates an example of content groups related to the log data of the electronic device 100 according to various embodiments of the present disclosure.

According to various embodiments of the present disclosure, the electronic device 100 may display, on a screen including, automatically generated contents groups. The contents groups may be generated based on the automatically collected log data.

According to some embodiments, each of the content groups may be included in a temporary storage (e.g., content group list 970) and/or permanent storage (e.g., content group list 940). Thus, in some embodiments, the screen can be generated based on one or more of (i) content groups that are included in the temporary storage (e.g., content groups added to the content group list 970), (ii) content groups that are included in the permanent storage (e.g., content groups added to the content group list 940), and (iii) content groups that are included in both the temporary storage and the permanent storage.

According to various embodiments, the electronic device 100 may collect log data related to a predetermined period (for example, a day) based on position information and time information, divide the contents related to the log data based on time and attribute (for example, call, SMS, MMS, movie, photo, and sound), and display the divided contents on the screen.

According to various embodiments, the electronic device 100 may divide the contents based on time and attribute, display the divided contents on the screen, and determine one or more of the divided contents as main contents. An operation of determining the main contents may be based on most recently generated log data.

According to various embodiments, when contents related to new log data are automatically added, the electronic device 100 may determine the main contents again. The electronic device 100 may display image contents related to the main contents as a representative image (cover).

The electronic device 100 may generate one or more contents related to the log data of a predetermined period (for example, a day) as a content group and display the contents on screens 2910 and 2920 which can be scrolled through based on time information, position information, or schedule information. The electronic device 100 may generate and display log data within the content group as different small groups based on a first condition or a second condition.

The electronic device 100 may determine one or more representative small groups among the small groups, and generate a title (for example, representative text) of the content group using attributes of the determined representative small group. In various embodiments, an operation of determining the representative small group may be performed based on at least one of an amount of particular contents, the existence or nonexistence of contents having particular attributes, an amount of particular emotion data, and the existence or nonexistence of emotion data having particular attributes.

According to an embodiment, a content group list (for example, daily life list) exists, each item (for example, content group cover on particular date) of the content group list has a title (representative text), and content group substance (contents within the group) is displayed when a particular item is selected. In such a structure, the contents within the content group (or log data) may be grouped and displayed based on time, or based on position.

According to another embodiment, when the contents are grouped and displayed based on time, the time may be divided into "morning", "afternoon", "evening", and "night". When the contents are grouped and displayed based on the position, the position may be divided in to "region A" and "region B".

At this time, when the contents within the content group are grouped based on time, a group element for each time may be used for configuring a title of the content group. For example, the group element for each time such as "had a busy morning" and "boring afternoon" may be cited.

Further, when the contents within the content group are grouped based on position, a group element for each position may be used for configuring a title of the content group. For example, the group element for each position such as "leave behind memory (photo) in A" and "long journey to B" may be cited.

FIGS. 30, 31, 32, 33, and 34 illustrate examples of content groups related to log data of the electronic device 100 according to various embodiments of the present disclosure.

According to an embodiment, a reference (for example, log data attribute) for providing a grouping to log data generated in the electronic device 100 may be classified into, for example, "Communication", "Listened", "Scrapped", and "Location". Further, "Communication" may include calls, messages, emails and the like, "Listened" may include music and the like, and "Scrapped" may include scrapbooks, screens, captures and the like.

According to various embodiments of the present disclosure, the groups may be performed on a plurality of contents based on the grouping reference of the contents related to the log data, and a representative object based on at least some of representative contents or common contents may be determined from a plurality of contents within each group corresponding to the grouping.

According to an embodiment, a reference of selecting a representative object may be shown in the example of Table 1.

TABLE 1

| People | Type | Type | Duration 10 minute = 1 | Favorites/Priority Sender 1.2 | Score |
|---|---|---|---|---|---|
| A | Call | 1 | 30 minute = 3 | 1.2 | [1 * 3 * 1.2] + 4 = 7.6 |
|  | MSG | 4 |  |  |  |
| B | Call | 2 | 20 minute = 2 |  | [2 * 2] + 1 + 1 = 6 |
|  | MSG | 1 |  |  |  |
|  | Email | 1 |  |  |  |
| C | Email | 5 |  |  | 5 |
| D | MSG | 4 |  | 1.2 | [4 * 1.2] = 4.8 |
| E | Call | 2 | 5 minute | 1.2 | [2 * 1.2] = 2.4 |
| F | Call | 2 | 5 minute |  | 2 |

According to an embodiment, Table 1 shows examples in which the user performs "Communication" with other users A, B, C, D, E, and F by using the electronic device 100 and the electronic device 100 selects a representative object when the electronic device 100 collects and groups log data related to the performance of the "Communication". Through the examples of Table 1, four representative objects will be described.

As illustrated in Table, 1, the electronic device 100 may select a target (for example, user A, user B, user C, user D, user E, or user F) to perform "Communication" within a classified reference (for example, time reference or position reference) and select a representative object to express a representative image (for example, thumbnail) from the target (for example, user A, user B, user C, user D, user E, or user F) to perform "Communication". The electronic device 100 may arrange users corresponding to the "Communication" targets according to log frequency or talk time for "Call+Message+Send Email". Further, the electronic device 100 may assign a weighted value to a user (for example, user A, user D, or user F) corresponding to "Favorites/Priority Sender".

According to the examples of Table 1, user A, user B, user C, and user D may be selected as four representative objects of the "Communication" group, and the representative object to be expressed by the thumbnail may be determined according to the order of user A (store=7.6)>user B (score=6)>user C (score 5)>user D (score 4.8) based on "score".

According to an embodiment, when the representative object is determined, in order to display a content group, the electronic device 100 may visually display a corresponding group according to the determined representative object for the corresponding group (for example, the "Communication" group). Screen examples thereof are illustrated in FIGS. 30 to 33.

Figure 30:
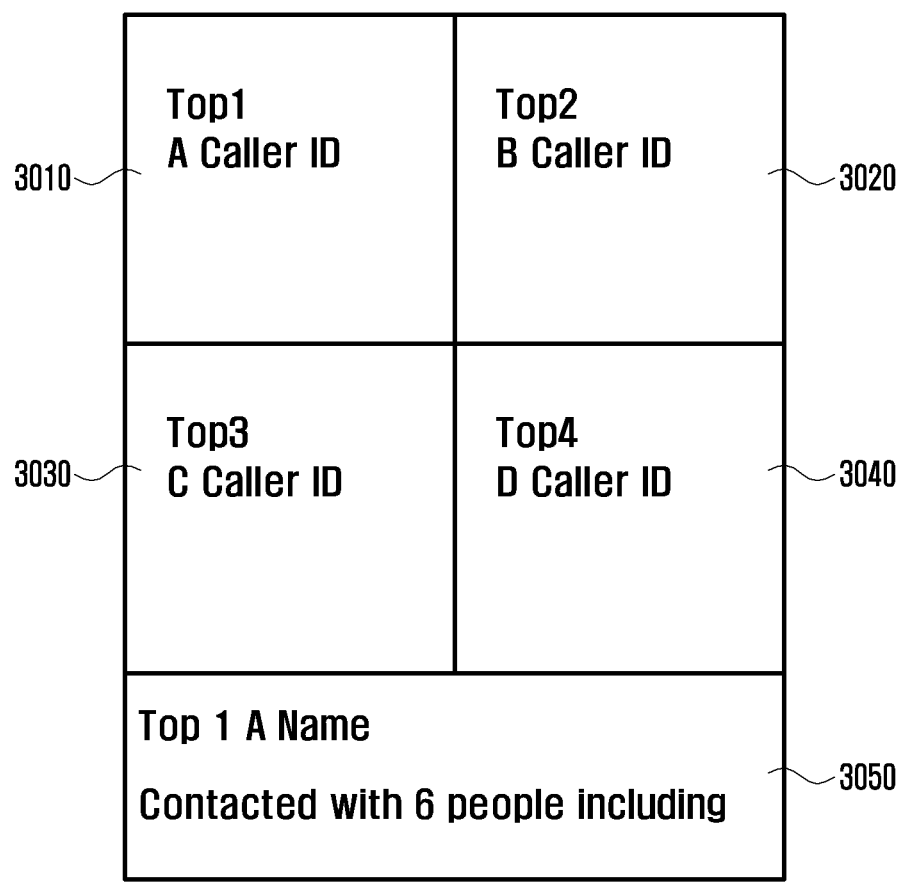
FIG. 30, FIG. 31, FIG. 32, FIG. 33, and FIG. 34 illustrate examples of log content groups of an electronic device according to various embodiments of the present disclosure.

In FIG. 30, when a representative object is displayed, a plurality of representative objects 3010, 3020, 3030, and 3040 are selected for the corresponding group and provided through a multi case. According to an embodiment, the electronic device 100 may also display information 3050 on the corresponding group together with the representative objects 3010, 3020, 3030, and 3040 of the corresponding group. For example, the information 3050 on the group may include information on a representative object (for example, representative object 3010) having the highest priority among the representative objects of the corresponding group and all information indicating which contents are included in the corresponding group (for example, information on all targets with which the user communicated) (Contacted with 6 people including).

Figure 31:
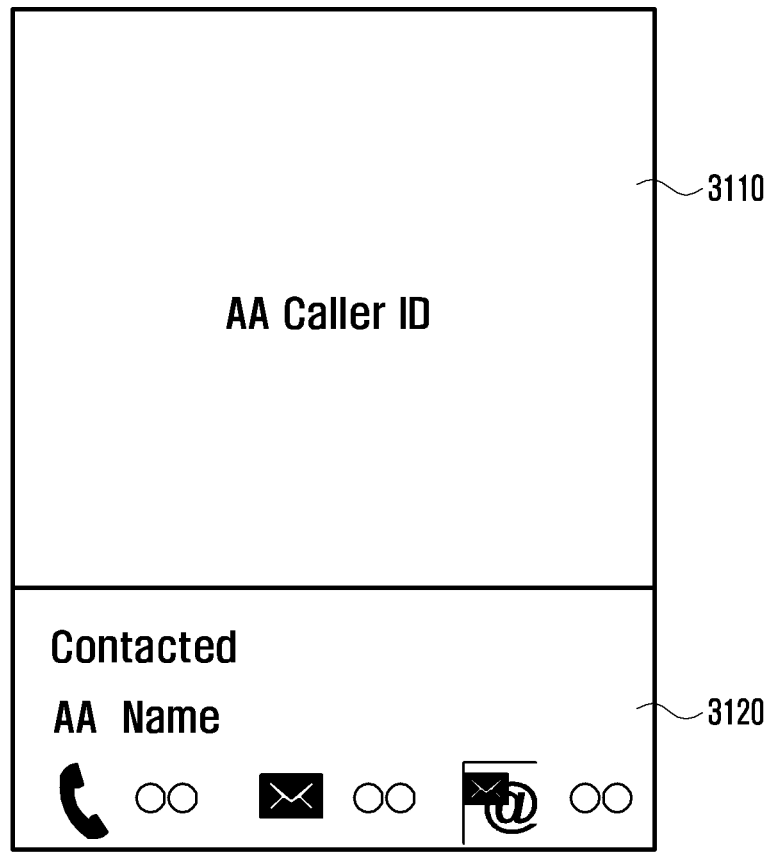

In FIG. 31, when a representative object is displayed, one representative object 3110 having the highest priority is selected for the corresponding group and provided through a single case. According to an embodiment, the electronic device 100 may also display information 3120 on the corresponding group together with the representative object 3110 of the corresponding group. For example, the information 3120 on the group may include information on the corresponding representative object 3110 and detailed information (for example, call frequency, message frequency, or email frequency corresponding to the classified reference) corresponding to the classified reference in the corresponding group.

Figure 32:
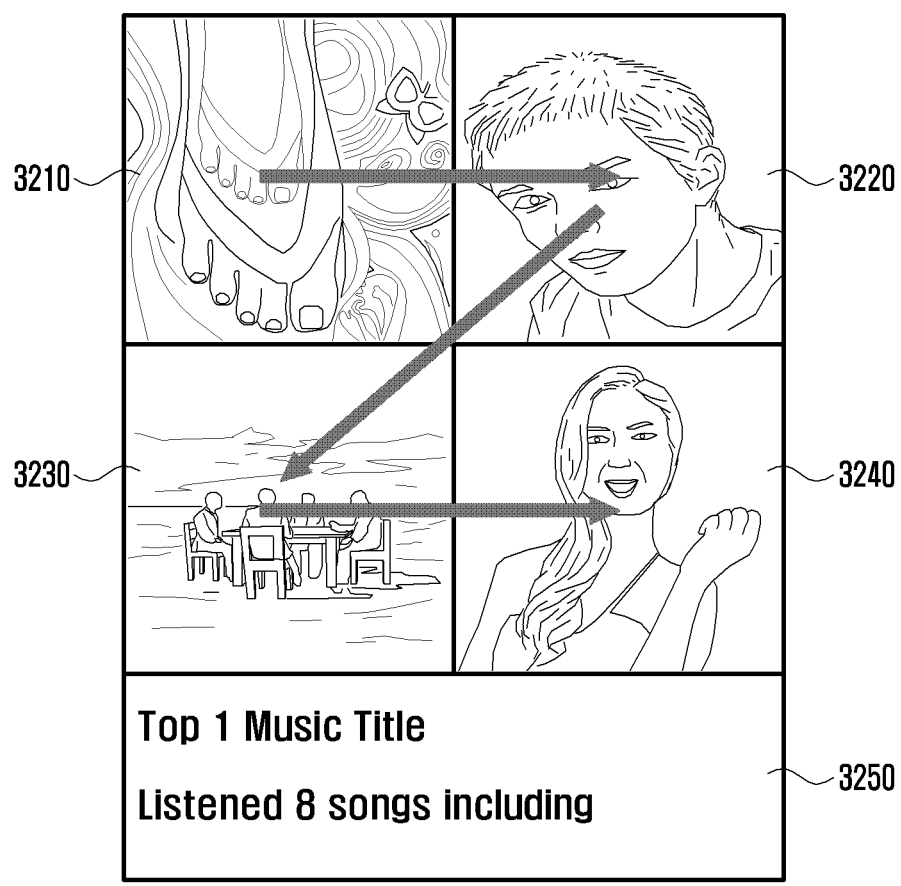

FIG. 32 shows an example of a screen actually provided according to the representative object display method of FIG. 30. In FIG. 32, a reference for a grouping is "Listened". When representative objects 3210, 3220, 3230, and 3240 to be expressed as representative images (for example, album images corresponding to the music) may be selected from the "Listened" targets in the classified reference (for example, time reference or position reference) and the selected images may be displayed according to the order of music to which the user more frequently listened. According to an embodiment, the electronic device 100 may also display information 3250 on the corresponding group together with the representative objects 3210, 3220, 3230, and 3240 of the corresponding group. For example, information (for example, a music title) on the representative object 3210 having the highest priority and all information included in the corresponding group (for example, information on all music to which the user has listened) (Listened to 8 songs including) may be displayed. According to another embodiment, when there is no music to which the user frequently listens to, the electronic device 100 may display the music to which the user recently listened to, on an upper portion.

Figure 33:
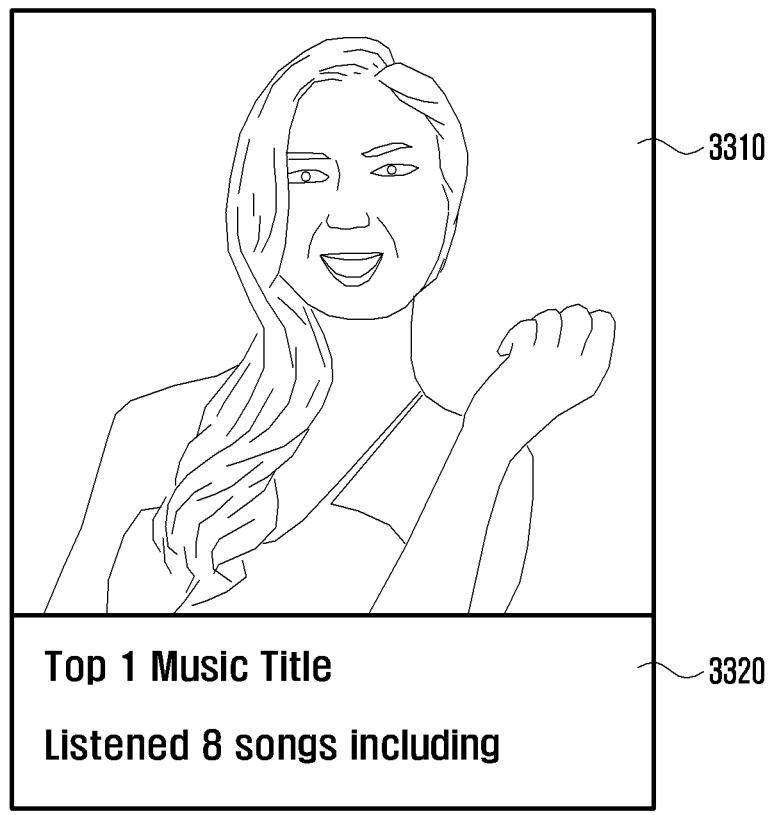

FIG. 33 shows an example of a screen actually provided according to the representative object display method of FIG. 31. In FIG. 33, a reference for a grouping is "Listened". One representative object 3310 having the highest priority for the corresponding group may be selected and an album image thereof may be displayed. According to an embodiment, when the user repeatedly listens to the same album, the representative object 3310 may be selected and provided based on the corresponding album. According to an embodiment, the electronic device 100 may also display information 3320 on the corresponding group together with the representative object 3310 of the corresponding group. For example, the information 3320 on the group may preferentially display information on the corresponding representative object 3310 and detailed information (for example, album information (album name, listened 20 songs including) corresponding to the classified reference in the corresponding group.

According to various embodiments of the present disclosure, all log data types of the corresponding group may be arranged and provided according to the time order without selecting the representative object of the corresponding group. Examples thereof will be described in FIG. 34.

Figure 34:
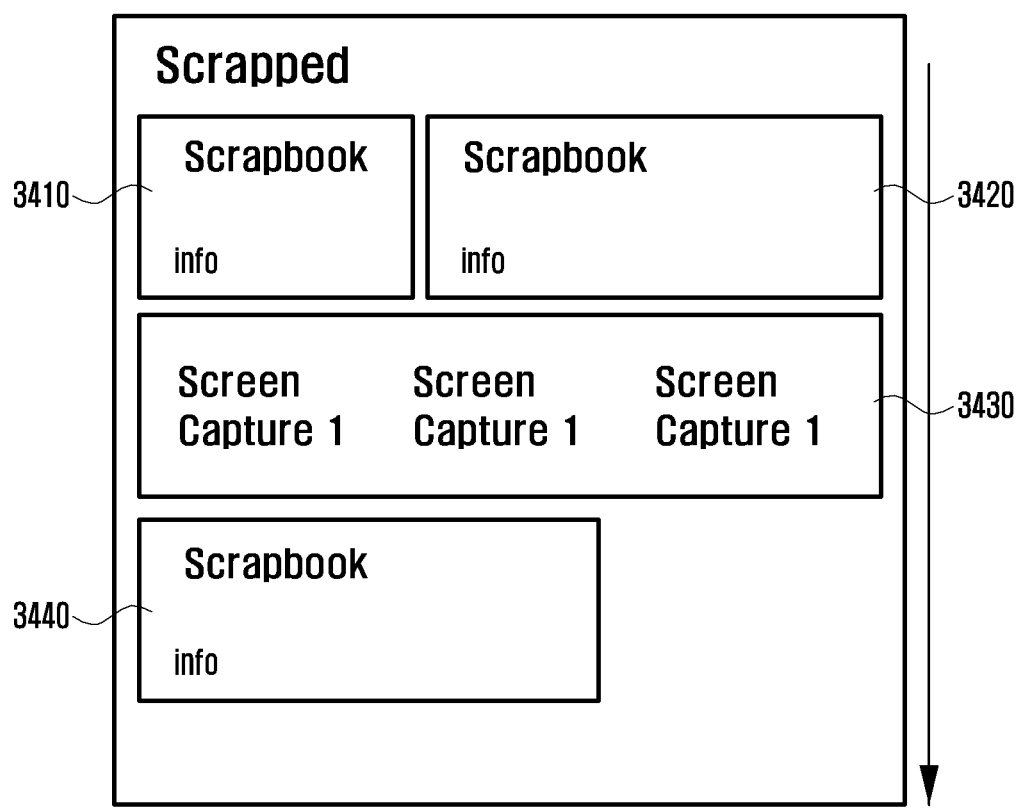

FIG. 34 illustrates an example in which a reference for a grouping is "Scrapped".

According to an embodiment, the electronic device 100 may group log data collected in connection with the use of "Scrapbook" and "Screen Capture" by the user. The electronic device 100 may arrange and display all log data types in the time order without determining the representative object of the corresponding group. For example, the electronic device 100 may collect and group scrapbook 3410, scrapbook 3420, screen captures 3430 (for example, screen capture 1, screen capture 2, and screen capture 3), and scrapbook 3440. In the grouping, the electronic device 100 may display data according to the time order from first generated log data (for example, scrapbook 3410) to last generated log data (for example, scrapbook 3440).

Additionally or alternatively, the electronic device 100 may group successive log data (for example, screen capture 1, screen capture 2, and screen capture 3) as one small group (for example, screen capture 3430) and display the one small group within the corresponding group.

Figure 35:
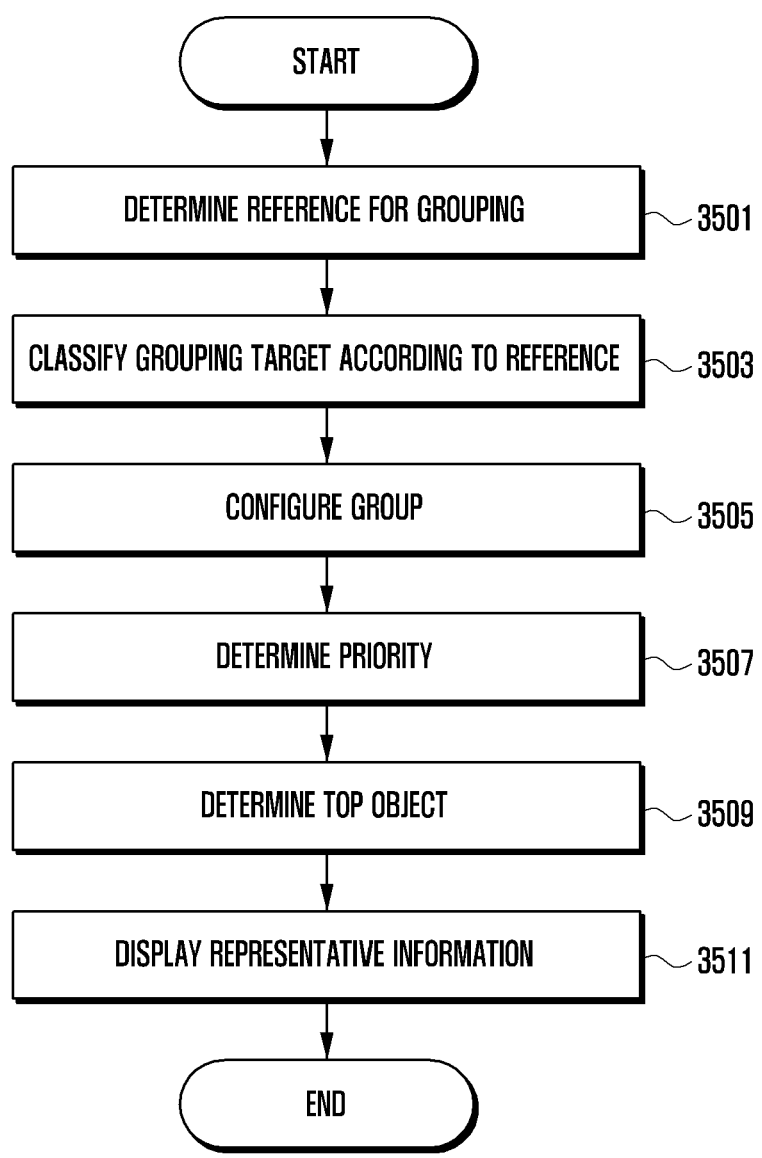
FIG. 35 illustrates an operation of an electronic device according to various embodiments of the present disclosure.

FIG. 35 illustrates the operation of the electronic device 100 according to various embodiments of the present disclosure.

According to an embodiment, when the electronic device 100 provides a content group based on at least some of the data collected in connection with the use of the electronic device 100, the electronic device 100 may generate and provide one or more groups according to a reference for grouping the data and a classification reference within the corresponding reference. Further, when the electronic device provides groups in one content group, the electronic device 100 may select a representative object of the corresponding group and provide representative information (for example, representative text or representative title) on the corresponding group.

According to an embodiment, as illustrated in FIG. 35, in operation 3501, the controller 180 may determine a reference (for example, Communication, Listened, Scrapped, or Location) for providing the grouping to the log data generated in the electronic device 100.

In operation 3503, the controller 180 may classify grouping targets in accordance with the grouping reference with respect to the log data.

In operation 3504, the controller may group the log data classified according to the grouping reference in accordance with the corresponding reference to configure one or more groups.

In operation 3507, the controller 180 may determine priorities based on at least some of the log data for each group in the configured one or more groups. According to an embodiment, the controller 180 may determine the priority (importance) of the log data within the corresponding group in consideration of representative log data, common log data, and use frequency in the log data of the corresponding group.

In operation 3509, the controller 180 may determine a representative object to be displayed as representative information according to the priority of the log data within the corresponding group. According to an embodiment, the controller 180 may determine the priority of the log data in consideration of log frequency of Call+Message+Email", talk time, and weighted value in log data related to user A, user B, user C, user D, user E, and user F of the "Communication" group.

In operation 3511, the controller 180 may configure and display representative information according to the priority. According to an embodiment, the controller 180 may configure one or more representative objects of the corresponding group based on the priority and a method of providing the representative information and visually display the corresponding group based on the one or more representative objects. According to an embodiment, the controller 180 may configure a plurality of objects and provide the objects in a multi case form (for example, FIGS. 30 and 32) for the corresponding group. According to another embodiment, the controller 180 may configure one representative object and provide the object in a single case form (for example, FIGS. 31 and 33) for the corresponding group.

Figure 36:
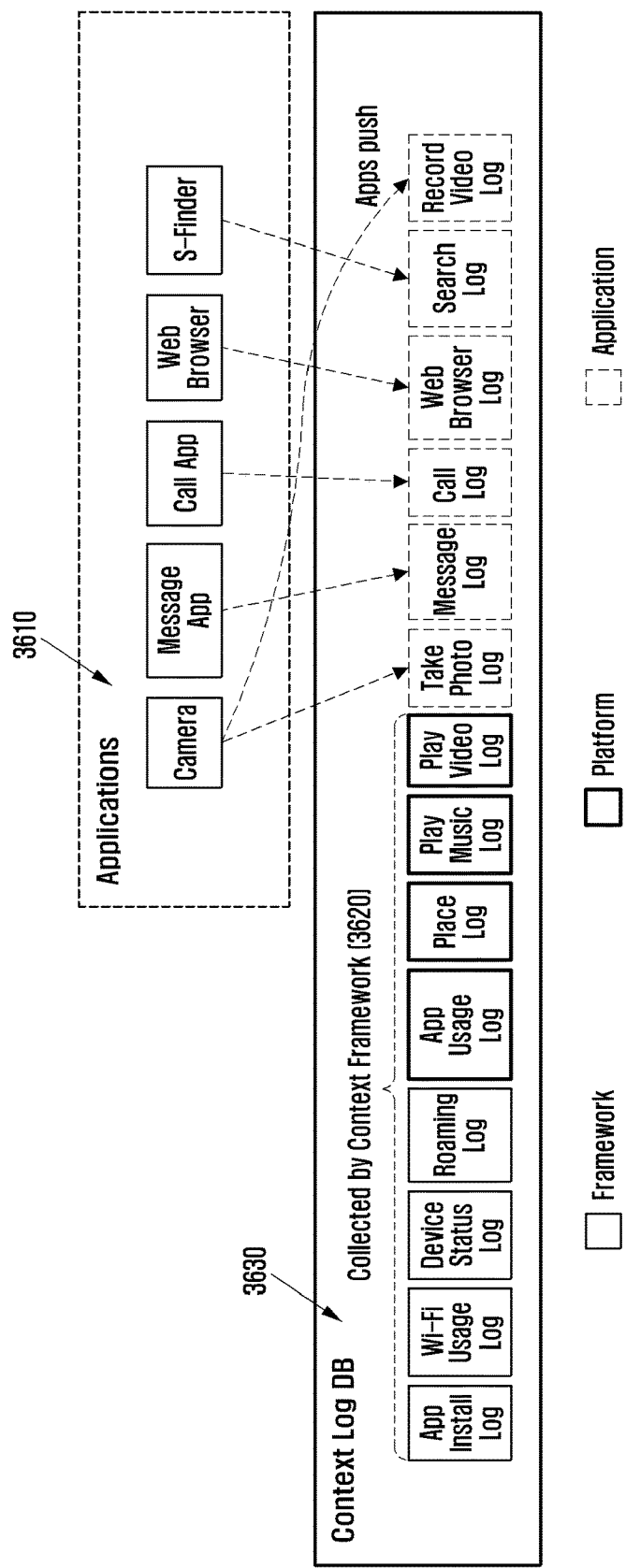
FIG. 36 illustrates an example of an operation in which an electronic device collects data according to various embodiments of the present disclosure.

FIG. 36 illustrates an example of an operation in which the electronic device 100 collects data according to various embodiments of the present disclosure.

According to various embodiments of the present disclosure, a route along which the electronic device 100 collects log data will be described below.

According to an embodiment, log data may be generated in an application 3610 (for example, camera, message, call, web browser, or S-finder application). When the log data is generated in the application 3610, the electronic device 100 may actively push the corresponding data through a context framework 3620 and store the data in a context log DB 3630.

The log data collected by the context framework 3620 may include log data related to an app install log, Wi-Fi usage log, device status log, and roaming log collected based on a framework (for example, an Android framework) according to an Operating System (OS) of the electronic device 100 and log data related to app usage log, place log, play music log, and play video log collected based on a platform.

The log data generated in the application 3610 and pushed to the context log DB 3630 may include log data related to a taken photo log, message log, call log, web browser log, search log, and record video log which may be generated according to the application 3610, for example, the camera, message, call, web browser, or S-finder application.

According to an embodiment, the log data collected by the application 3610 or the context framework 3620 may be classified according to the corresponding log data type and stored in the context log DB 3630.

Further, additionally or alternatively, the context framework 3620 may actively make a request for the log data to the application 3610 generating the log data or a sensor (for example, a voice recognition sensor, an acceleration sensor, an illumination sensor, a temperature sensor, a geomagnetic sensor, a color sensor, a proximity sensor, or a motion recognition sensor), and may receive the log data requested from the corresponding application 3610 or the corresponding sensor and store the received log data in the context log DB 3630.

Additionally or alternatively, the context framework 3620 may collect and store message information generated by an OS framework or platform.

According to various embodiments of the present disclosure, the electronic device 100 may collect and store log data through at least one method based on various log data types or various context among the various methods.

According to an embodiment, the log data corresponding to various contexts will be described in Table 2 below.

Figure 38:
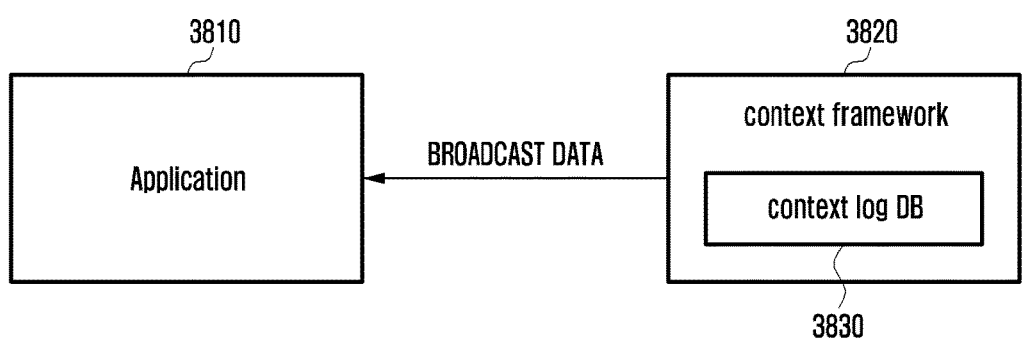

According to another embodiment, as illustrated in FIG. 38, a context framework 3820 may broadcast log data to an application 3810 of a context log DB 3830 even though the application 3810 does not request the log data of the context log DB 3830. Accordingly, the application 3810 may receive the log data broadcasted by the context framework 3820 even though the application 3810 does not request the log data of the context framework 3820.

TABLE 2

| Type | Description | Log Provider | Server Upload |
|---|---|---|---|
| use_app | App usage (launch type, duration, . . . ) | CF | ○ |
| manage_app | App install/uninstall | CF | X |
| take_photo | History of taking photos and their configuration information | Camera | ○ |
| record_video | History of recording video and their configuration information | Camera | ○ |
| play_music | History of playing songs and their metadata | Media player | ○ |
| play_video | History of playing video clips and their metadata | Media Player | ○ |
| exchange_call | Call logs (contact address, duration, . . . ) | Call/Phone | X |
| exchange_message | Message exchange logs such as SMS and MMS | Messages | X |
| browse_web | History of browsing web pages | Browser | X |
| search_keyword | Keywords list used in searching | S Finder | X |
| track_roaming | Change log about roaming | CF | ○ |
| change_device_status | Change log about the local device status | CF | X |
| use_wifi | History of using Wi-Fi and their configuration information | CF | ○ |
| move_place | Places list that user visits if they are registered in advance | CF | ○ |

In Table 2, "CF" of "Log Provide" may refer to a provider providing log data recorded by the context framework 3620 or log data recorded by the specific application 3610.

According to various embodiments, the electronic device 100 may process log data received by the context framework 3620 through the sensor, or may generate and store other meaningful data. For example, "Place log" may be data generated by receiving only position information from the sensor, processing the received position information to be meaningful data such as stay, move, departure, or arrived, and storing the meaningful data by the context framework 3620.

Figure 37:
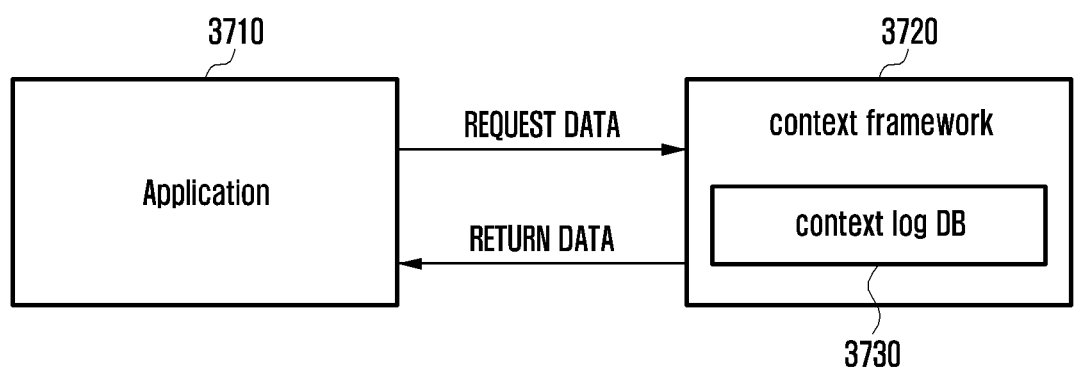
FIG. 37 and FIG. 38 illustrate examples of an operation in which an electronic device collects data according to various embodiments of the present disclosure.

FIGS. 37 and 38 illustrate examples of an operation in which the electronic device 100 collects data according to various embodiments of the present disclosure.

According to various embodiments of the present disclosure, a series of operations in which the electronic device 100 requests and returns the log data may be performed in a query type which is generally used when data is read from a database.

According to an embodiment, as illustrated in FIG. 37, the context framework 3720 may store the log data in the context log DB 3730 in real time. An application 3710 (for example, a life logging application) may request and receive the log data of the context log DB 3730 through the context framework 3720 as necessary.

According to an embodiment, the application 3710 may request and receive the log data of the context framework 3720 whenever the corresponding application is executed. Additionally or alternatively, the application 3710 may request and receive the log data of the context framework 3720 even though the corresponding application is not executed.

Additionally or alternatively, according to various embodiments of the present disclosure, the electronic device 100 may collect log data based on at least one of the three operations according to log data types or various contexts.

Figure 39:
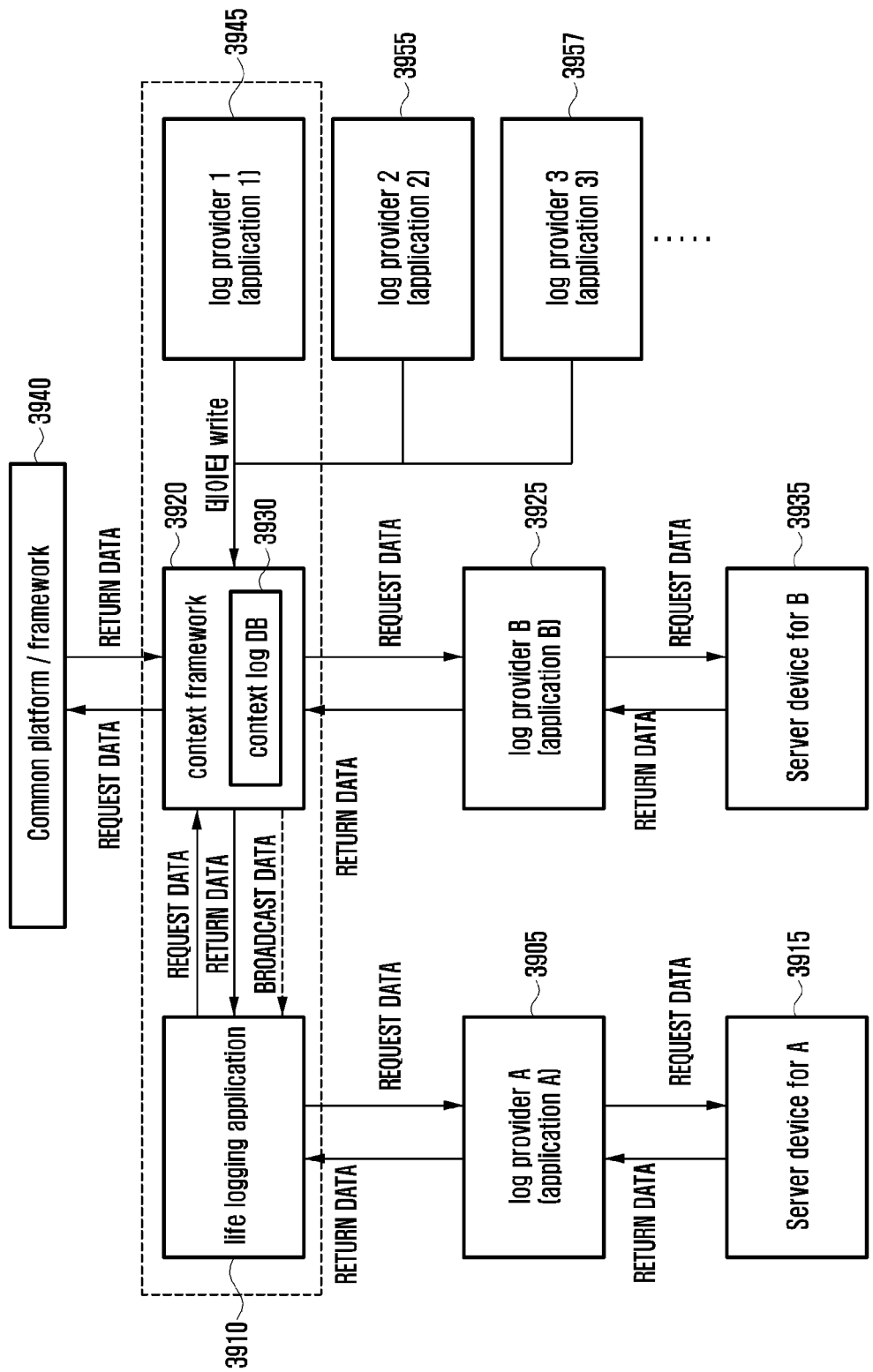
FIG. 39 illustrates an example for describing a route on which an electronic device collects data according to various embodiments of the present disclosure.

FIG. 39 illustrates an example for describing a route along which the electronic device 100 collects data according to various embodiments of the present disclosure.

FIG. 39 shows an example of all routes along which an application 3910 collects log data.

According to an embodiment, the application 3910 (for example, a life logging application) may request log data accumulated in a context log DB 3930 through a context framework 3920 to configure log contents and receive the corresponding log data from the context framework 3920. Additionally or alternatively, the application 3910 may receive the log data through broadcast by the context framework 3920.

According to another embodiment, in order to collect the log data, the application 3910 may directly request the log data from a corresponding subject 3905 (for example, log provider A (application A)) generating the log data and receive the log data from the corresponding subject without passing through the context framework 3920. For example, the application 3910 may directly request the log data from the corresponding subject based on at least one of the type of log data, the type of subject generating the log data, and context in which the log data is collected. Such an operation may be performed by a schedule application, a health management application, or an SNS application.

When the log data generating subject 3905 (for example, log provider A) receives a log data request from the application 3910, the log data generating subject 3905 may immediately return the log data accumulated by the log data generating subject 3905 to the application 3910. Additionally or alternatively, when the log data generating subject 3905 receives the log data request from the application 3910, the log data generating subject 3905 may request the log data to be returned, from a server device 3905 (for example, server device for A) for the subject 3905. The log data generating subject 3905 may receive the corresponding log data from the server device 3915 and return the received log data to the application 3910.

When the application 3910 generates log data, the context framework 3920 may actively push the corresponding log data and store the log data in the context log DB 3930. According to an embodiment, when various subjects generating the log data (for example, an application or a sensor) (for example, a log provider 1 (application 1) 3945, log provider 2 (application 2) 3955, and log provider 3 (application 3) 3957) generate log data, the context framework 3920 may actively push the corresponding log data and store the log data in the context log DB 3630.

Further, the context framework 3920 may actively request the log data from the application 3910 or sensor which generates the log data, receive the corresponding log data from the application 3910 or the sensor, and store the log data in the context log DB 3930.

According to an embodiment, when the context framework 3920 receives the log data request from the application 3910, the context framework 3920 may immediately return the log data accumulated in the context log DB 3930 to the application 3910. Additionally or alternatively, when the context framework 3920 receives the log data request from the application 3910, the context framework 3920 may directly request the log data to be returned, from a log data generating subject 3925 (for example, log provider B (application B)).

When the log data generating subject 3925 (for example, log provider B) receives the log data request from the context framework 3920, the log data generating subject 3925 may immediately return the log data accumulated by the log data generating subject 3925 to the context framework 3920. Additionally or alternatively, when the log data generating subject 3925 receives the log data request from the context framework 3920, the log data generating subject 3925 may request the log data to be returned, from a server device 3935 (for example, server device for B) for the subject 3925. The log data generating subject 3925 may receive the corresponding log data from the server device 3935 and return the received log data to the context framework 3920.

Further, according to various embodiments, the context framework 3920 may collect message information generated by, for example, an OS framework (for example, an Android framework) or a platform of the electronic device 200 and may store log data in the context log DB 3930 based on at least some of the collected message information.

Figure 40:
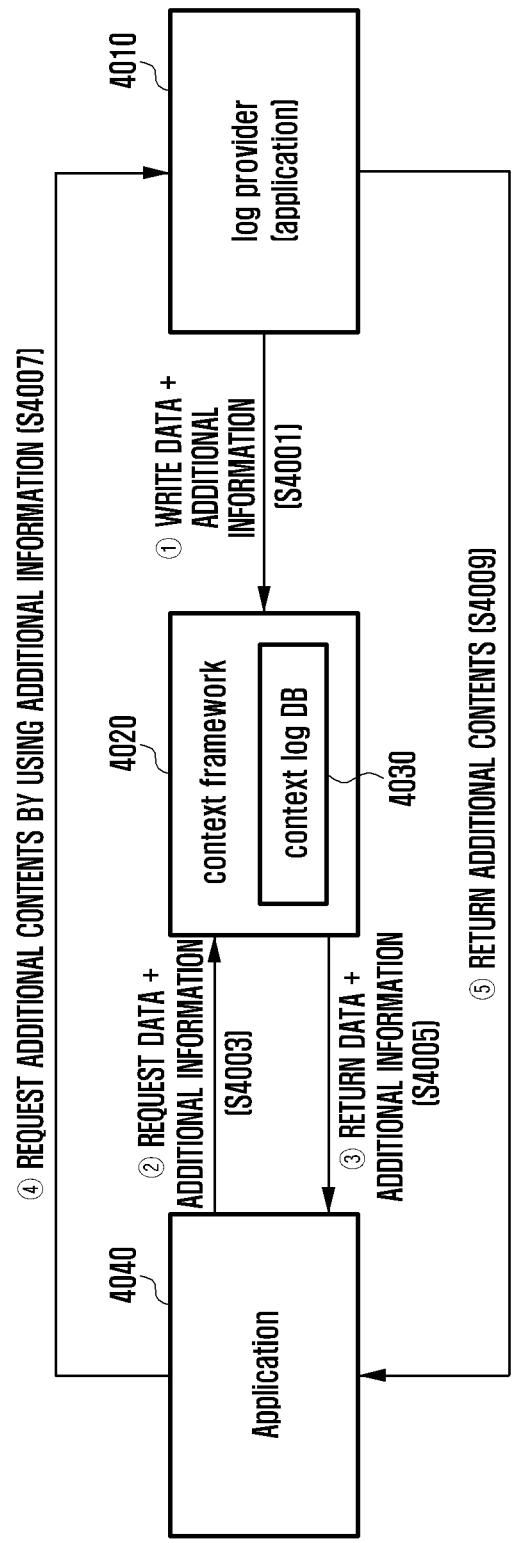
FIG. 40 illustrates an example of an operation in which an electronic device generates contents according to various embodiments of the present disclosure.

FIG. 40 illustrates an example of an operation in which the electronic device 100 generates contents according to various embodiments of the present disclosure.

Referring to FIG. 40, a log data generating subject 4010 (for example, a log provider) may push not only the generated log data but also additional data related to the corresponding log data or additional information related to the contents to a context log DB 4030 of a context framework 4020. The context framework 4020 may push the log data received from the subject 4010, the additional data related to the corresponding log data, or the additional information related to the contents and may store the pushed data and information in the context log DB 4030.

An application 4040 (for example, a life logging application) may request the log data and the additional information through the context framework 4020 in step S4003, and receive the corresponding log data and additional information from the context framework 4020 in step S4005.

The application 4040 may request particular log data or contents from the log data generating subject 4010 (for example, a log provider) or another subject by using the received additional information in step S4007, and may receive the corresponding log data or contents from the log data generating subject 4010 or the other subject in step S4009.

According to another embodiment, the camera application 4010 may push log data related to taking a picture (for example, photography history, photography time, and photography position) and additional information (for example, a Uniform Resource Identifier (URI) from which photographed contents can be referred) (for example, a Uniform Resource Locator (URL) and a Uniform Resource Name (URN)) and may store the pushed log data and additional information in the context log DB 4030.

The life logging application 4040 may request and receive the photography log data and additional information from the context framework 4020, and refer to and receive image contents related to the log data from the camera application 4010, a gallery application, or a file manager application by using the URI corresponding to the additional information.

The life logging application 4040 may combine the received log data and additional contents to generate log contents. For example, information such as photos photographed at the time of XX:YY in ZZ may be visually displayed. According to various embodiments, the additional information may be replaced with an ID, a key, or a URI.

Figure 41:
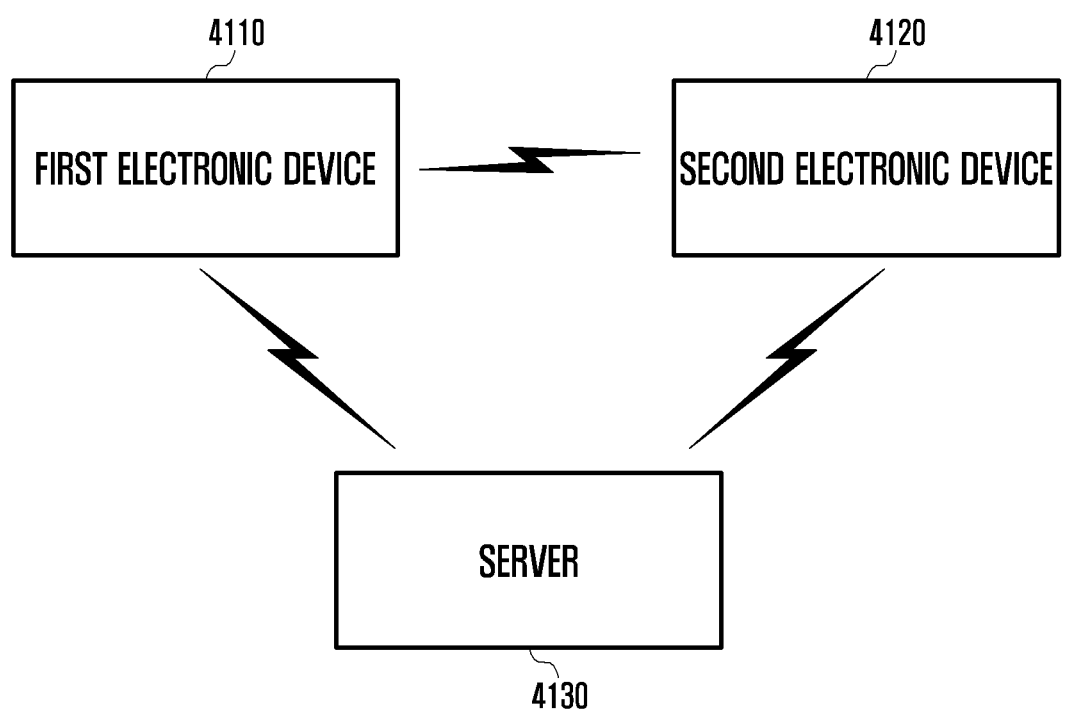
FIG. 41 illustrates an example of a data logging operation between electronic devices according to various embodiments of the present disclosure.

FIG. 41 illustrates a data logging operation according to various embodiments of the present disclosure.

FIG. 41 may include a first electronic device 4110 and a second electronic device 4120 for generating log data, and a server device 4130 for communicating with the first and second electronic devices 4110 and 4120. According to an embodiment, the first electronic device 4110 and the second electronic device 4120 may be pre-arranged or authenticated to collect counterpart data in connection with data logging.

Further, each of the first electronic device 4110 and the second electronic device 4120 may transmit log data including a timestamp generated by each of the first electronic device 4110 and the second electronic device 4120 and content information related to the corresponding log data to the server device 4130. The server device 4130 may correlate (map) the log data and the content information related to the log data transmitted by the first electronic device 4110 and the second electronic device 4120 with (to) each of the electronic devices 4110 and 4120 and store the log data and the content information related to the log data in the electronic devices 4110 and 4120.

The first electronic device 4110 may generate contents (first contents) of the first electronic device 4110 based on at least some of the log data including the timestamp generated by the first electronic device 4110 and the content information related to the corresponding log data. Further, the second electronic device 4120 may generate contents (second contents) of the second electronic device 4120 based on at least some of the log data including the timestamp generated by the second electronic device 4120 and the content information related to the corresponding log data.

According to an embodiment, during an operation in which the first electronic device 4110 generates the contents (first contents), the first electronic device 4110 may transmit the log data including the timestamp and the content information related to the corresponding log data to the server device 4130. Further, the first electronic device 4110 may make a request for the log data and the content information of the second electronic device 4120 pre-arranged (authenticated) with the first electronic device 4110 to the server device 4130 while transmitting the log data and the content information. For example, the first electronic device 4110 may make a request for log data and content information related to the timestamp to the server device 4130 among the log data and the content information of the second electronic device 4120.

When the server device 4130 receives the request from the first electronic device 4110, the server device 4130 may collect the log data and the content information related to the timestamp among the log data and the content information of the second electronic device 4120 based on the corresponding timestamp and transmit the collected log data and content information of the second electronic device 4120 to the first electronic device 4110.

The first electronic device 4110 may receive the log data and the content information related to the corresponding log data of the second electronic device 4120 from the server device 4130.

The first electronic device 4110 may generate the contents (second contents) of the second electronic device 4120 based on the received log data and content information related to the corresponding log data of the second electronic device 4120.

The first electronic device 4110 may configure one completed content based on the first contents of the first electronic device 4110 and the second contents of the second electronic device 4120. According to an embodiment, when configuring the contents, the first electronic device 4110 may re-arrange the first contents and the second contents based on the timestamp of the first contents and the timestamp of the second contents. The first electronic device 4110 may display the completed content on the screen.

For example, one user may use all of the first electronic device 4110 (for example, a smart phone) and the second electronic device 4120 (for example, a tablet PC). In such a condition, the first electronic device 4110 and the second electronic device 4120 may be logged into by one user account. Alternatively, a first user may use the first electronic device 4110 and a second user may use the second electronic device 4120. In such a condition, the first electronic device 4110 and the second electronic device 4120 may be preset by the first user and the second user to allow data collection by the counterpart in connection with data logging of the electronic device. That is, the first electronic device 4110 and the second electronic device 4120 may be mutually authenticated by each other.

According to an embodiment, the first electronic device 4110 or the second electronic device 4120 may store all of the log data generated by the first electronic device 110 and the log data generated by the second electronic device 4120. That is, the user may store each piece of log data generated by each of two or more different electronic devices in one electronic device.

According to various embodiments, each piece of log data of the electronic device 4110 and 4120 may be stored in the first electronic device 4110 or the second electronic device 4120 through short range communication or may be uploaded in the server device 4130 through a network.

Further, the electronic devices 4110 and 4120 may process contents to be displayed, by using the log data. In addition, when at least one of the first electronic device 4110 and the second electronic device 4120 displays contents, the electronic device may load the contents processed by the electronic device, which will display the contents, and display the contents.

According to various embodiments, communication between the electronic devices 4110 and 4120 and the server device 4130 may be omitted, and data logging may be performed through direct communication (for example, short range communication) between the first electronic device 4110 and the second electronic device 4120. The first electronic device 4110 or the second electronic device 4120 may acquire counterpart's log data and content information through the direct communication, and may configure its own contents based on at least some of its own log data and content information and counterpart's log data and content information.

Figure 42:
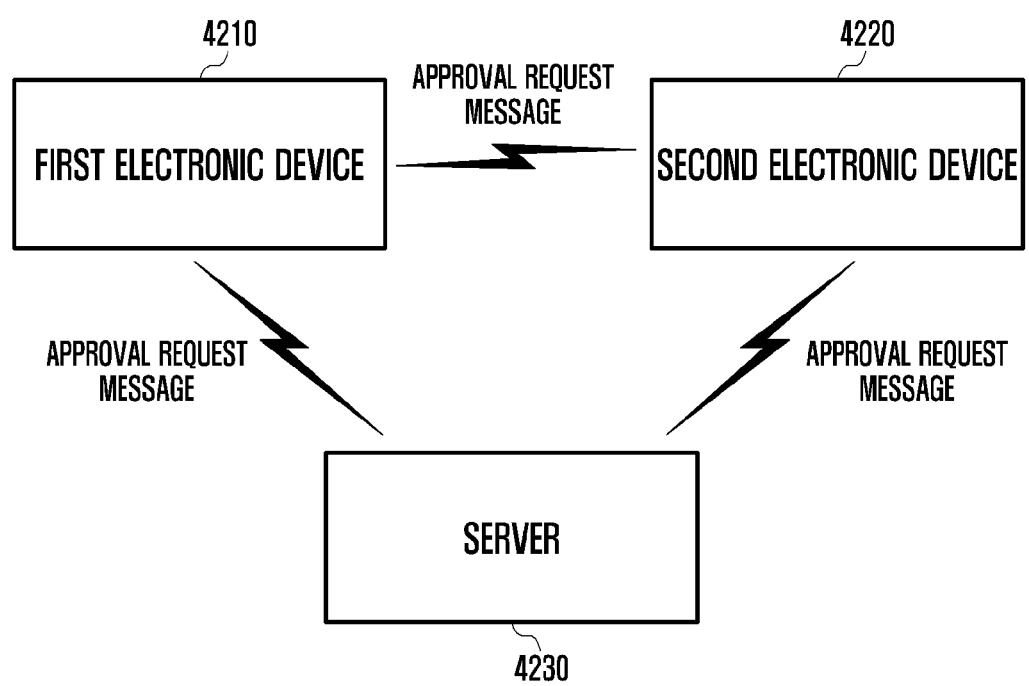
FIG. 42 illustrates another example of a data logging operation between electronic devices according to various embodiments of the present disclosure.

FIG. 42 illustrates a data logging operation according to various embodiments of the present disclosure.

FIG. 42 may include a first electronic device 4210 and a second electronic device 4220 for generating log data, and a server device 4230 for communicating with the first and second electronic devices 4210 and 4220.

Further, each of the first electronic device 4210 and the second electronic device 4220 may transmit log data including a timestamp generated by each of the first electronic device 4210 and the second electronic device 4220 and content information related to the corresponding log data to the server device 4230. The server device 4230 may correlate (map) the log data and the content information related to the log data transmitted by the first electronic device 4210 and the second electronic device 4220 with (to) each of the electronic devices 4210 and 4220 and store the log data and the content information related to the log data in the electronic devices 4210 and 4220.

The first electronic device 4210 may generate contents (first contents) of the first electronic device 4210 based on at least some of the log data including the timestamp generated by the first electronic device 4210 and the content information related to the corresponding log data. Further, the second electronic device 4220 may generate contents (second contents) of the second electronic device 4220 based on at least some of the log data including the timestamp generated by the second electronic device 4220 and the content information related to the corresponding log data.

According to an embodiment, during an operation in which the first electronic device 4210 generates the contents (first contents), the first electronic device 4210 may transmit the log data including the timestamp and the content information related to the corresponding log data to the server device 4230. Further, the first electronic device 4210 may transmit an approval request message to the server device 4230 to collect the log data and the content information of the second electronic device 4210 while transmitting the log data and the content information. For example, the first electronic device 4210 may transmit an approval request message making a request for collecting log data and content information related to the timestamp among the log data and the content information of the second electronic device 4220 to the server device 4230.

The server device 4230 may receive the approval request message of the first electronic device 4210 and transmit the approval request message of the first electronic device 4210 to the second electronic device 4220.

The second electronic device 4220 may receive the approval request message and transmit an approval response message to the server device 4230. According to an embodiment, the second electronic device 4220 may display the received approval request message on the screen, generate the approval response message or an approval rejection message in response to approval or rejection of the user of the second electronic device 4220, and transmit the generated message to the server device 4230.

According to an embodiment, the second electronic device 4220 may transmit log data related to a particular type and content information related to the corresponding log data among the log data generated by the second electronic device 4220 and the content information related to the corresponding log data to the server device 4230 based on the approval response message.

When the server device 4230 receives the approval response message corresponding to the approval request message from the second electronic device 4220, the server device 4230 may transmit the log data related to the particular type and the content information related to the corresponding log data to the first electronic device 4210. According to an embodiment, when the server device 4230 receives the approval rejection message in response to the approval request message from the second electronic device 4220, the server device 4230 may transmit the approval rejection message indicating rejection of the log data and the content information of the second electronic device 4220 to the first electronic device 4210.

The first electronic device 4210 may receive the log data related to the particular type and the content information related to the corresponding log data of the second electronic device 4220 from the server device 4230 in response to the approval response message. The first electronic device 4210 may generate the contents (second contents) of the second electronic device 4220 based on the received log data and content information related to the corresponding log data of the second electronic device 4220.

The first electronic device 4210 may configure one completed content based on the first contents of the first electronic device 4210 and the second contents of the second electronic device 4220. According to an embodiment, when configuring the contents, the first electronic device 4210 may re-arrange the first contents and the second contents based on the timestamp of the first contents and the timestamp of the second contents. The first electronic device 4210 may display the completed content on the screen.

For example, a first user may use the first electronic device 4210 and a second user may use the second electronic device 4220. According to an embodiment, the first user and the second user may desire to generate and share one content (for example, a life journal between users) related to the correlation. In this case, log data generated in each of accounts of the first user and the second user and contents related to the corresponding log data may be stored in at least one of the electronic devices (for example, the first electronic device 4210, the second electronic device 4220, or the server device 4230.

As described above, the log data and the content information related to the corresponding log data may be stored in one electronic device, and thus one common content may be generated and shared between different users. Further, in order to generate and share the common content, authentication and authorization between accounts of the first user and the second user are required or a process of identifying the relationship therebetween through an SNS may be required. According to an embodiment, unlike common contents generated by one account, individual contents (for example, personal life journals) integrally generated by different accounts may require privacy protection for each user. Accordingly, the first electronic device 4210 or the second electronic device 4220 may limit or configure the type and range of shared log data and contents information related to the corresponding log data to protect the user's privacy and may collect the corresponding log data and the content information according to counterpart's approval.

According to various embodiments, communication between the electronic devices 4210 and 4220 and the server device 4230 through the network may be omitted, and data logging may be performed through direct communication (for example, short range communication) between the first electronic device 4210 and the second electronic device 4220. The first electronic device 4210 or the second electronic device 4220 may acquire corresponding log data and content information through direct communication in response to counterpart's approval, and may configure its own contents based on at least some of its own log data and content information and counterpart's log data and content information.

As described above, an operation method of the electronic device 100 according to various embodiments of the present disclosure may include an operation of collecting data related to the use of the electronic device 100, an operation of generating one or more contents based on at least some of the collected data, and an operation of displaying the one or more contents according to a preset condition.

According to various embodiments of the present disclosure, the method may include an operation of collecting the data based on the logs collected by the electronic device 100 and may acquiring an object based on the data and at least some of the context in which the logs are generated or a function related to the logs.

According to various embodiments of the present disclosure, the method may include an operation in which the electronic device 100 collects at least one of time information and position information.

According to various embodiments of the present disclosure, the method may include an operation in which the electronic device 100 displays at least one group including one or more contents.

According to various embodiments of the present disclosure, the method may include an operation in which the electronic device 100 displays the contents based on at least one of time, position, schedule, user input, information, event, and function.

According to various embodiments of the present disclosure, the method may include an operation in which the electronic device 100 displays the one or more contents based on priorities of the contents.

According to various embodiments of the present disclosure, the method may include an operation in which the electronic device 100 generates the contents according to a preset period or generate the contents in response to the collection of the data.

According to various embodiments of the present disclosure, the method may include an operation in which the electronic device 100 exposes the one or more contents for a predetermined time when the preset period passes or in response to the collection of the data.

According to various embodiments of the present disclosure, the method may include an operation in which the electronic device 100 removes the one or more contents when the predetermined time passes.

According to various embodiments of the present disclosure, the method may include an operation in which the electronic device 100 stores the one or more contents based on at least some of the inputs. According to various embodiments of the present disclosure, the user input may include at least one of commands of adding, editing, deleting, modifying the arrangement of, adding comments to, sharing, exporting, or directly storing the contents. According to various embodiments of the present disclosure, the user input may include an input before the predetermined time passes.

According to various embodiments of the present disclosure, the method may include an operation in which the electronic device 100 combines the one or more contents with tag information corresponding to input attributes of the user input and stores the combined contents and tag information.

According to various embodiments of the present disclosure, the method may include an operation in which the electronic device 100 provides information on the one or more contents through at least one method of sound, color, screen, form, and shape based on at least some of the tag information.

According to various embodiments of the present disclosure, the method may include an operation in which the electronic device 100 applies the tag information to every piece of data of the contents.

According to various embodiments of the present disclosure, the method may include an operation in which the electronic device 100 provides the information based on at least some of context information indicating the context in which the one or more contents are generated.

According to various embodiments of the present disclosure, the method may include an operation in which the electronic device 100 periodically or aperiodically collects data related to the use of the electronic device 100.

According to various embodiments of the present disclosure, the method may include an operation in which the electronic device 100 determines representative objects based on at least some of the one or more contents and displays the one or more contents based on at least some of the determined representative objects.

Figure 43:
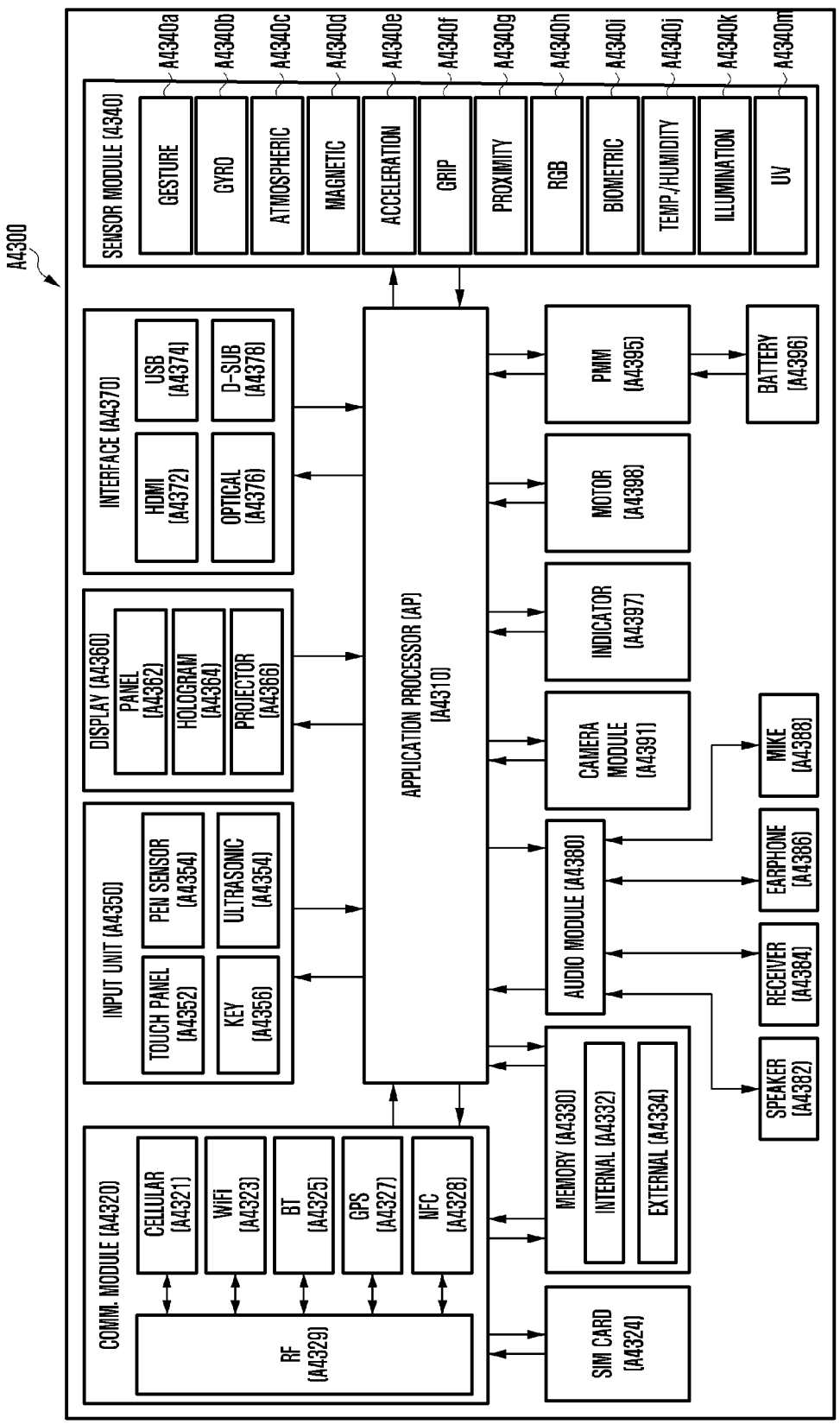
FIG. 43 is a block diagram of an electronic device according to various embodiments of the present disclosure.

FIG. 43 is a block diagram of an electronic device A4300 according to various embodiments of the present disclosure.

The electronic device A4300 may include, for example, all or some of the electronic device 100 or the electronic device 200 illustrated in FIG. 1 or FIG. 2.

Referring to FIG. 43, the electronic device A4300 may include at least one Application Processor (AP) A4310, a communication module A4320, a Subscriber Identifier Module (SIM) card A4324, a memory A4330, a sensor module A4340, an input device A4350, a display A4360, an interface A4370, an audio module A4380, a camera module A4391, a power management module A4395, a battery A4396, an indicator A4397, and a motor A4398.

The AP A4310 controls a plurality of hardware or software components connected to the AP A4310 by driving an operating system or an application program and processes various types of data including multimedia data and performs calculations. The AP A4310 may be implemented by, for example, a System on Chip (SoC). According to an embodiment, the AP A4310 may further include a Graphic Processing Unit (GPU).

The communication module A4320 (for example, the communication interface 145) may perform data transmission/reception in communication between the electronic device A4300 (for example, the electronic device 100) and other electronic devices (for example, the electronic device 220 or the server 230) connected thereto through a network. According to an embodiment, the communication module A4320 may include a cellular module A4321, a Wi-Fi module A4323, a BT module A4325, a GPS module A4327, an NFC module A4328, and a Radio Frequency (RF) module A4329.

The cellular module A4321 may provide a voice call, a video call, a Short Message Service (SMS), or an Internet service through a communication network (for example, LTE, LTE-A, CDMA, WCDMA, UMTS, WiBro, OR GSM). Furthermore, the cellular module A4321 may distinguish and authenticate electronic devices within a communication network using, for example, a subscriber identification module (for example, the SIM card A4324). According to an embodiment, the cellular module A4321 may perform at least some functions which can be provided by the AP A4310. For example, the cellular module A4321 may perform at least some of the multimedia control functions.

According to an embodiment, the cellular module A4321 may include a Communication Processor (CP). Furthermore, the cellular module A4321 may be implemented by, for example, an SoC. Although the elements such as the cellular module A4321 (for example, a communication processor), the memory A4330, and the power management module A4395 are illustrated to be separated from the AP A4310 in FIG. 43, the AP A4310 may include at least some of the aforementioned elements (for example, the cellular module A4321) in an embodiment.

According to an embodiment, the AP A4310 or the cellular module A4321 (for example, communication processor) may load a command or data received from at least one of a non-volatile memory and other elements connected thereto in a volatile memory, and may process the loaded command or data. Furthermore, the AP A4310 or the cellular module A4321 may store data received from or generated by at least one of other elements in a non-volatile memory.

The Wi-Fi module A4323, the BT module A4325, the GPS module A4327, and the NFC module A4328 may include, for example, a processor for processing data transmitted/received through the corresponding module. In FIG. 43, the cellular module A4321, the WiFi module A4323, the BT module A4325, the GPS module A4327, and the NFC module A4328 are illustrated as separate blocks, but at least some (for example, two or more) of the cellular module A4321, the WiFi module A4323, the BT module A4325, the GPS module A4327, and the NFC module A4328 may be included in one Integrated Chip (IC) or one IC package. For example, at least some (for example, the communication processor corresponding to the cellular module A4321 and the WiFi processor corresponding to the WiFi module A4323) of the processors corresponding to the cellular module A4321, the WiFi module A4323, the BT module A4325, the GPS module A4327, and the NFC module A4328 may be implemented by one SoC.

The RF module A4329 may transmit/receive data, for example, an RF signal. Although not illustrated, the RF unit A4329 may include, for example, a transceiver, a Power Amplifier Module (PAM), a frequency filter, a Low Noise Amplifier (LNA), or the like. Further, the RF module A4329 may further include a component for transmitting/receiving electronic waves over free air space in wireless communication, for example, a conductor, a conducting wire or the like. Although the cellular module A4321, the WiFi module A4323, the BT module A4325, the GPS module A4327, and the NFC module A4328 share one RF module A4329 in FIG. 43, at least one of the cellular module A4321, the WiFi module A4323, the BT module A4325, the GPS module A4327, and the NFC module A4328 may transmit/receive an RF signal through a separate RF module in one embodiment.

The SIM card A4324 may be a card including a subscriber identification module, and may be inserted into a slot formed in a particular portion of the electronic device. The SIM card A4324 may include unique identification information (for example, an Integrated Circuit Card IDentifier (ICCID)) or subscriber information (for example, International Mobile Subscriber Identity (IMSI)).

The memory A4330 (for example, the memory 150) may include an internal memory A4332 or an external memory A4334. The internal memory A4332 may include, for example, at least one of a volatile memory (for example, a Dynamic RAM (DRAM), a Static RAM (SRAM), a Synchronous Dynamic RAM (SDRAM), and the like), and a non-volatile Memory (for example, a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, an NOR flash memory, and the like).

According to an embodiment, the internal memory A4332 may be a Solid State Drive (SSD). The external memory A4334 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory A4334 may be functionally connected with the electronic device A4300 through various interfaces. According to an embodiment, the electronic device A4300 may further include a storage device (or storage medium) such as a hard drive.

The sensor module A4340 may measure a physical quantity or detect an operation state of the electronic device A4300, and may convert the measured or detected information to an electronic signal. The sensor module A4340 may include at least one of, for example, a gesture sensor A4340a, a gyro sensor A4340b, an atmospheric pressure sensor A4340v, a magnetic sensor A4340f, an acceleration sensor A4340e, a grip sensor A4340f, a proximity sensor A4340g, a color sensor A4340h (for example, red, green, and blue (RGB) sensor), a bio-sensor A4340i, a temperature/humidity sensor A4340j, an illumination sensor A4340k, and a Ultra Violet (UV) sensor A4340m. Additionally or alternatively, the sensor module A4340 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module A4340 may further include a control circuit for controlling one or more sensors included in the sensor module A4340.

The input device A4350 may include a touch panel A4352, a (digital) pen sensor A4354, a key A4356, or an ultrasonic input device A4358. The touch panel A4352 may recognize a touch input through at least one of a capacitive type, a resistive type, an infrared type, and an acoustic wave type. The touch panel A4352 may further include a control circuit. The capacitive type touch panel may recognize physical contact or proximity. The touch panel A4352 may further include a tactile layer. In this case, the touch panel A4352 may provide a tactile reaction to the user.

The (digital) pen sensor A4354 may be implemented, for example, using a method identical or similar to a method of receiving a touch input of the user, or using a separate recognition sheet. The key A4356 may include, for example, a physical button, an optical key, or a keypad. The ultrasonic input device A4358 may identify data by detecting an acoustic wave with a microphone (for example, a microphone A4388) of the electronic device A4300 through an input unit generating an ultrasonic signal, and may perform wireless recognition. According to an embodiment, the electronic device A4300 may receive a user input from an external device (for example, computer or server) connected thereto using the communication module A4320.

The display A4360 (for example the display unit 131) may include a panel A4362, a hologram device A4364, or a projector A4366. The panel A4362 may be, for example, a Liquid Crystal Display (LCD) or an Active Matrix Organic Light Emitting Diode (AM-OLED). The panel A4362 may be implemented to be, for example, flexible, transparent, or wearable. The panel A4362 and the touch panel A4352 may be configured as one module. The hologram device A4364 may show a stereoscopic image in the air using interference of light. The projector A4366 may project light onto a screen to display an image. The screen may be located, for example, inside or outside the electronic device A4300. According to an embodiment, the display A4360 may further include a control circuit for controlling the panel A4362, the hologram device A4364, or the projector A4366.

The interface A4370 may include, for example, a High-Definition Multimedia Interface (HDMI) A4372, a Universal Serial Bus (USB) A4374, an optical interface A4376, or a D-subminiature (D-sub) A4378. The interface A4370 may be included in, for example, the communication interface 145 illustrated in FIG. 2. Additionally or alternatively, the interface A4370 may include, for example, a Mobile High-definition Link (MHL) interface, a Secure Digital (SD)/Multi-Media Card (MMC) interface, or an Infrared Data Association (IrDA) standard interface.

The audio module A4380 may bilaterally convert a sound and an electronic signal. At least some elements of the audio module A4380 may be included in, for example, the input/output interface 135 illustrated in FIG. 2. The audio module A4380 may process sound information input or output through, for example, the speaker A4382, the receiver A4384, the earphones A4386, the microphone A4388 or the like.

The camera module A4391 is a device for capturing a still image or a video, and according to an embodiment, may include one or more image sensors (for example, a front sensor or a rear sensor), a lens (not illustrated), an Image Signal Processor (ISP) (not illustrated), or a flash (not illustrated) (for example, an LED or xenon lamp).

The power management module A4395 may manage power of the electronic device A4300. Although not illustrated, the power management module A4395 may include, for example, a Power Management Integrated Circuit (PMIC), a charger Integrated Circuit (IC), or a battery or fuel gauge.

The PMIC may be mounted to, for example, an integrated circuit or an SoC semiconductor. Charging methods may be classified into a wired charging method and a wireless charging method. The charger IC may charge a battery and prevent over voltage or over current from flowing from a charger. According to an embodiment, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge may measure, for example, a remaining quantity of the battery A4396, or a voltage, a current, or a temperature during the charging. The battery A4396 may store or generate electricity, and may supply power to the electronic device A4300 using the stored or generated electricity. The battery A4396 may include, for example, a rechargeable battery or a solar battery.

The indicator A4397 may show particular statuses of the electronic device A4300 or a part (for example, AP A4310) of the electronic device A4300, for example, a booting status, a message status, a charging status and the like. The motor A4398 may convert an electrical signal to a mechanical vibration. Although not illustrated, the electronic device A4300 may include a processing unit (for example, GPU) for supporting mobile TV. The processing unit for supporting the mobile TV may process media data according to a standard of Digital Multimedia Broadcasting (DMB), Digital Video Broadcasting (DVB), media flow or the like.

Each of the above described elements of the electronic device according to various embodiments of the present disclosure may be formed of one or more components, and the name of a corresponding element may vary according to the type of an electronic device. The electronic device according to various embodiments of the present disclosure may be formed to include at least one of the above described components, and some of the components may be omitted or additional components may be further included. Further, some of the elements of the electronic device according to various embodiments of the present disclosure may be coupled to form a single entity while performing the same functions as those of the corresponding elements before the coupling.

The term "module" as used in various embodiments of the present disclosure may mean, for example, a unit including one of hardware, software, and firmware or any combination of two or more of them. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an application-specific integrated circuit (ASIC) chip, a field-programmable gate array (FPGA), and a programmable-logic device for performing certain operations, which are now known or will be developed in the future.

At least some of the devices (e.g., modules or functions thereof) or methods (e.g., operations) according to various embodiments of the present disclosure may be implemented by, for example, by a command stored in a computer-readable storage medium in the form of a programming module. When he command is executed by one or more processors (for example, the processor 125), the one or more processors may execute a function corresponding to the command. The computer-readable storage medium may be, for example, the memory 150. At least a part of the programming module may be implemented (for example, executed) by, for example, the processor 125. At least some of the programming modules may include, for example, a module, a program, a routine, a set of instructions or a process for performing one or more functions.

FIGS. 1-43 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples. It is to be understood, that the examples provided with respect to the figures are non-exclusive. Thus, the examples provided with two or more of the figures can be combined together. For example, the examples provided with respect to any of FIGS. 29, and 7-13 can be combined with one another.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

disclosure Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed in this specification and the drawings are merely specific examples presented in order to easily describe technical details of various embodiments of the present disclosure and to help the understanding of them, and are not intended to limit the scope of embodiments of the present disclosure. Therefore, all changes or modifications derived from the technical idea of various embodiments of the present disclosure as well as various embodiments disclosed herein should be construed to fall within the scope of various embodiments of the present disclosure.

What is claimed is:

1. A method in an electronic device, comprising:
detecting, by a processor, operations executed by the electronic device and recording at least a description, a time and a geographic location for each of the detected operations, the detected operations including at least one operation corresponding to a first type of operation, and at least one operation corresponding to a second type of operation;
generating content including a plurality of images for display based on one or more the detected operations, the plurality of images each respectively representing one type of operation, the plurality of images arranged according to a preset condition; and
controlling, by the processor, a display to display the generated plurality of images on a displayed geographic map according to the preset condition, the displayed plurality of images includes a first image representing operations of the first type and a second image representing operations of the second type,
wherein a copy of the first image is displayed at a first location within the geographic map corresponding to a detected geographic location where a user activated an operation of the first type, and a copy of the second image is displayed at a second location within the geographic map corresponding to a detected geographic location where the user activated an operation of the second type.

2. The method of claim 1, wherein the preset condition includes displaying each of the plurality of images at a location within the geographic map where activation of a corresponding operation was detected, and
wherein the first image represents the first type of operation including a call transceived through a communication unit, and the second image represents the second type of operation including a textual message transceived through the communication unit.

3. The method of claim 2, wherein the detecting the operations and recording includes collecting at least one of time information and position information, the method further comprising:
displaying a route of travel of the electronic device on the displayed geographic map based on the time information and the position information,
wherein displaying the first image indicating the transceived call further includes displaying a first copy of the first image within the displayed route of travel indicating a geographic position where a corresponding call was initiated, and displaying a second copy of the first image indicating a second geographic position where the corresponding call was terminated.

4. The method of claim 1, wherein the plurality of images are arranged such that the generated content includes one or more groups, each group including one or more images of the plurality of images.

5. The method of claim 4, wherein the displaying of the plurality of images are grouped according to at least one of the time, the geographic location, a schedule, a user input, information, an event, and a function.

6. The method of claim 1, wherein display of the generated content comprises displaying the plurality of images according to priorities of the generated content.

7. The method of claim 1, wherein the content are generated according to a preset time period or in response to detecting and recording the executed operations.

8. The method of claim 7, wherein when the content is generated according to the preset time period, the plurality of images are displayed for the preset time period and are removed from display when the preset time period expires, and
when the content are generated in response to detecting and recording the executed operations, the plurality of images are displayed in response to detecting and recording the executed operations.

9. The method of claim 8, further comprising removing the generated content when the preset time period lapses.

10. The method of claim 1, further comprising storing the generated content in response to detecting at least one user input.

11. The method of claim 10, wherein the at least one user input includes at least one of a command for adding content, editing the generated content, removing one or more of the generated content, modifying an arrangement of the generated content, adding comments to one or more of the generated content, sharing one or more of the generated content, exporting one or more of the generated content, and storing the generated content.

12. The method of claim 10, wherein the storing of the generated content comprises combining content selected for storage with tag information indicating a function executed in relationship to the content selected for storage in response to the at least one user input, and storing the content selected for storage with the tag information.

13. The method of claim 12, further comprising outputting additional information related to one or more of the generated contents by at least one of playing a sound, altering a color of an image of the plurality of images, altering a shape of an image of the plurality of images, the output additional information based on at least a portion of the tag information.

14. The method of claim 13, wherein the outputting the additional information comprises displaying context information indicating an environmental context in which the content is generated, including at least one of the time and the geographical location.

15. The method of claim 10, wherein the at least one user input is received before a predetermined time passes, and
the generated content when displayed on the display is arranged according to the time, such that the display is divided into a first time region and a second time region, and first images of the plurality of images corresponding to detected operations occurring within the first time are displayed in the first time region, and second images of the plurality of images corresponding to the detected operations occurring within the second time are displayed in the second time region.

16. The method of claim 1, wherein the at least the description, the time, and the geographical location is recorded periodically or aperiodically.

17. The method of claim 1, wherein when the generated content includes a group object representing a plurality of objects, displaying group object as part of the generated content comprises detecting a representative object from among the represented plurality of objects.

18. The method of claim 12, further comprising generating tag information for every detected operation utilized to generate the content.

19. An electronic device, comprising:
a display; and
a processor, configured to:
detect executed operations of the electronic device and record at least a description, a time and a geographic location for each of the detected operations, the detected operations including at least one operation corresponding to a first type of operation, and at least one operation corresponding to a second type of operation, generate content including a plurality of images for display based on one or more of the detected operations, the plurality of images each respectively representing one type of operation, the plurality of images arranged according to a preset condition, and control the display to display the generated plurality of images on a displayed geographic map according to the preset condition, the displayed plurality of images including a first image representing operations of the first type and a second image representing operations of the second type, wherein a copy of the first image is displayed at a first location within the geographic map corresponding to a detected geographic location where a user activated an operation of the first type, and a copy of the second image is displayed at a second location within the geographic map corresponding to a detected geographic location where the user activated an operation of the second type.

20. A non-transitory computer-readable recording medium recording a program including operations, the operations executable by a processor of an electronic device to:

detect, by the processor, operations executed by the electronic device and recording at least a description, a time and a geographic location for each of the detected operations, the detected operations including at least one operation corresponding to a first type of operation, and at least one operation corresponding to a second type of operation;

generate content including a plurality of images for display based on one or more of the detected operations, the plurality of images each respectively representing one type of operation, the plurality of images arranged according to a preset condition; and control, by the processor, a display to display the generated plurality of images on a displayed geographic map according to the preset condition, the displayed plurality of images including a first image representing operations of the first type and a second image representing operations of the second type, wherein a copy of the first image is displayed at a first location within the geographic map corresponding to a detected geographic location where a user activated an operation of the first type, and a copy of the second image is displayed at a second location within the geographic map corresponding to a detected geographic location where the user activated an operation of the second type.

* * * * *